US012495834B2

(12) United States Patent
Minskoff

(10) Patent No.: US 12,495,834 B2
(45) Date of Patent: Dec. 16, 2025

(54) PERSONAL VAPORIZING UNIT

(71) Applicant: Aether Innovations, LLC, Boise, ID (US)

(72) Inventor: Noah Mark Minskoff, Boise, ID (US)

(73) Assignee: Aether Innovations, LLC, Boise, ID (US)

( * ) Notice: Subject to any disclaimer, the term of this patent is extended or adjusted under 35 U.S.C. 154(b) by 368 days.

(21) Appl. No.: 18/093,742

(22) Filed: Jan. 5, 2023

(65) Prior Publication Data

US 2024/0225110 A1 Jul. 11, 2024

(51) Int. Cl.

| | |
|---|---|
| ***A24F 40/465*** | (2020.01) |
| ***A24F 40/10*** | (2020.01) |
| ***A24F 40/485*** | (2020.01) |
| ***A24F 40/50*** | (2020.01) |
| ***H05B 6/10*** | (2006.01) |

(52) U.S. Cl.

CPC ............ *A24F 40/465* (2020.01); *A24F 40/10* (2020.01); *A24F 40/485* (2020.01); *A24F 40/50* (2020.01); *H05B 6/105* (2013.01)

(58) Field of Classification Search

CPC ..................................................... A24F 40/465

See application file for complete search history.

(56) References Cited

U.S. PATENT DOCUMENTS

| | | | | |
|---|---|---|---|---|
| 9,993,602 | B2 * | 6/2018 | Davidson | A61P 17/02 |
| 10,328,443 | B2 * | 6/2019 | Ricketts | A24F 40/42 |
| 10,440,993 | B2 * | 10/2019 | Minskoff | H05B 1/0244 |
| 10,973,259 | B2 * | 4/2021 | Reevell | H05B 3/44 |
| 11,700,674 | B2 * | 7/2023 | Bleloch | A24F 40/65 307/104 |
| 11,707,583 | B2 * | 7/2023 | Garcia | A61M 15/0065 128/200.23 |
| 2006/0196968 | A1 * | 9/2006 | Rabin | A61M 15/00 239/136 |
| 2014/0041658 | A1 * | 2/2014 | Goodman | F22B 1/282 128/203.14 |
| 2017/0055582 | A1 * | 3/2017 | Blandino | H05B 6/105 |
| 2025/0098760 | A1 * | 3/2025 | McEvoy | A24F 40/44 |

FOREIGN PATENT DOCUMENTS

| | | | | |
|---|---|---|---|---|
| DE | 10022795 B4 | * | 4/2005 | A61M 11/06 |

OTHER PUBLICATIONS

Machine Translation of DE 10022795 (Year: 2025).*

* cited by examiner

*Primary Examiner* — Russell E Sparks

(74) *Attorney, Agent, or Firm* — The Neudeck Law Firm, LLC

(57) ABSTRACT

A personal vaporizing unit that includes a reservoir to contain a substance to be vaporized. The substance to be vaporized is pressurized to force the substance into a capillary channel. While in the capillary channel, the substance may be heated using an inductive heater configuration. After heating, the substance is expelled into a low-pressure chamber that is at a gas pressure that is lower than ambient pressure chamber. While in the low-pressure chamber, the substance is irradiated with infrared radiation (light) and ultraviolet radiation (light). The infrared radiation further heats the substance to improve vapor characteristics. The ultraviolet radiation improves the sterilization of the substance.

11 Claims, 85 Drawing Sheets

PERSONAL VAPORIZING UNIT

DETAILED DESCRIPTION OF THE EMBODIMENTS

Figure 1A:
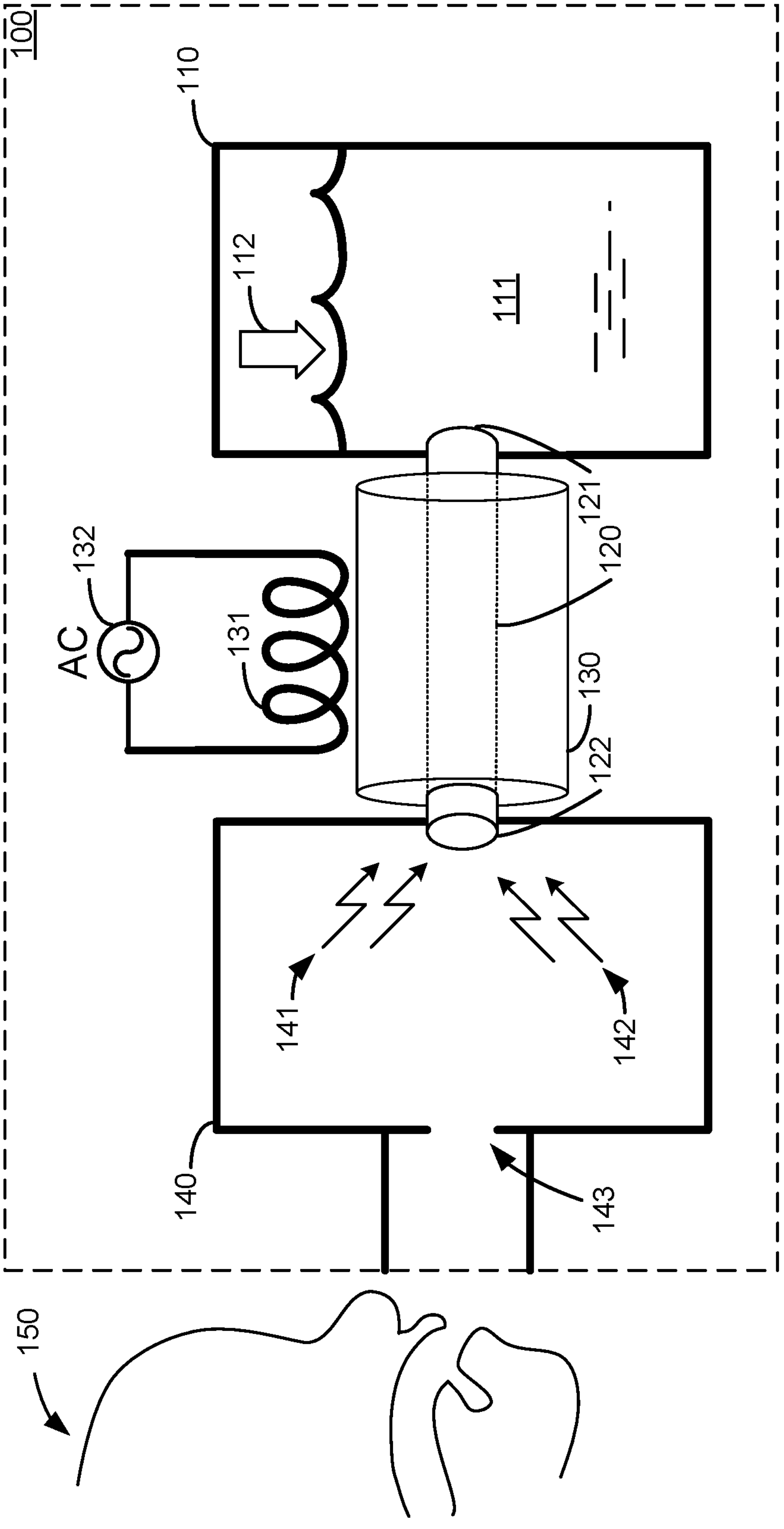
FIGS. 1A-1G are diagrams illustrating personal vaporizing units.

FIGS. 1A-1D are diagrams illustrating personal vaporizing units. In FIGS. 1A-1D, vaporizing device 100 comprises reservoir 110, capillary tube 120, inductive target 130, inductive heater coil 131, alternating current (AC) source 132, low-pressure chamber 140, infrared radiation 141, sterilizing light 142, and vapor exit 143. Reservoir 110 contains substance 111 (e.g., liquid) under pressure 112. A first end 121 of capillary tube 120 in contact with and interfaces with substance 111. A second end 122 of capillary tube 120 is disposed to open into low-pressure chamber 140. A vapor exit 143 from low-pressure chamber 140 allows vapors and other gases (e.g., air) to exit low-pressure chamber 140 to be inhaled by a user 150. Substance 111 may be, for example, an e-liquid, vape juice, vape oil, etc.

Capillary tube 120 is disposed adjacent to, or surrounded by, an inductive target 130. Inductive target 130 may comprise any material that, when stimulated by an alternating magnetic field, is heated. Metals, for example, may be heated via electromagnetic induction that results in heat generated in the object by eddy currents. Ferromagnetic (and ferrimagnetic) materials like iron may be heated by heat generated by magnetic hysteresis losses.

Inductive target 130, inductive heater coil 131, alternating current source 132 form an inductive heater to heat capillary tube 120 and the contents of capillary tube 120. In an embodiment, capillary tube 120 may be physically interfaced to inductive target 130 by a material to facilitate heat transfer from inductive target 130 to capillary tube 120. For example, capillary tube 120 may be physically interfaced to inductive target 130 by a thermal grease or a PVD (physical vapor deposition) coating.

When selectively activated, AC source 132 passes a high-frequency current through inductive heater coil 131. This causes inductive heater coil 131 to generate a corresponding alternating magnetic field. If inductive target 130 is a non-ferrous metal, the alternating magnetic field penetrates inductive target 130, generating eddy currents inside inductive target 130. The eddy currents flowing through the resistance of inductive target 130 heat it by Joule heating. If inductive target 130 is a ferromagnetic (or ferrimagnetic) material like iron, the alternating magnetic field penetrates inductive target 130 to generate heat from magnetic hysteresis losses.

The second end 122 of capillary tube 120 is disposed to open into low-pressure chamber 140. Thus, capillary tube 120 may serve as a conduit for substance 111 to pass from reservoir 110 to low-pressure chamber 140. Substance 111 passing from reservoir 110 to low-pressure chamber 140 via capillary tube 120 may be heated by inductive target 130 as it passes through capillary tube 120. Substance 111 passing from reservoir 110 to low-pressure chamber 140 via capillary tube 120 may be heated to near substance 111's vaporization temperature, to substance 111's vaporization temperature, and/or above substance 111's vaporization temperature.

Substance 111 exits capillary tube 120 into low-pressure chamber 140 via the second end 122 of capillary tube 120. In an embodiment, substance 111 exits capillary tube 120 at or near substance 111's vaporization temperature. In other words, substance 111 is at or near substance 111's saturation temperature for the conditions inside capillary tube 120.

Low-pressure chamber 140 is negatively pressured relative to the ambient air pressure, the pressure within capillary tube 120, and/or the pressure 112 of reservoir 110. Low-pressure chamber 140 may be negatively pressured by, for example, a mechanical device such as a piston. In an embodiment, low-pressure chamber 140 may be negatively pressured as a result of an inhalation by user 150.

In an embodiment, as substance 111 exits capillary tube 120 at or near substance 111's vaporization temperature, heated substance 111 is exposed to at least two environmental changes. A first environmental change is the reduction of pressure between capillary tube 120 and low-pressure chamber 140. This reduction in pressure reduces the vaporization (boiling) point of substance 111 when compared to the vaporization temperature of substance 111 while substance 111 was inside of capillary tube 120.

A second environmental change is the irradiation of substance 111 by at least infrared radiation 141. Irradiation of substance 111 by infrared radiation 141 heats substance 111. Thus, as substance 111 exits capillary tube 120, the vaporization temperature of substance 111 is reduced by the low-pressure of low-pressure chamber 140 while substance 111 is concurrently heated thereby raising the temperature of substance 111. These changes in environment allow substance 111 to rapidly convert to a vapor (i.e., boil). In an embodiment, substance 111 may comprise an infrared absorptive (e.g., infrared opaque) substance to facilitate the heating of substance 111 by infrared radiation 141.

In an embodiment, as substance 111 exits capillary tube 120, substance 111 is irradiated by sterilizing light 142. For example, substance 111 (now a gas) may be irradiated by ultraviolet wavelength light. Sterilized and vaporized substance 111 may then exit low-pressure chamber 140 via vapor exit 143 to be inhaled by user 150.

Figure 1B:
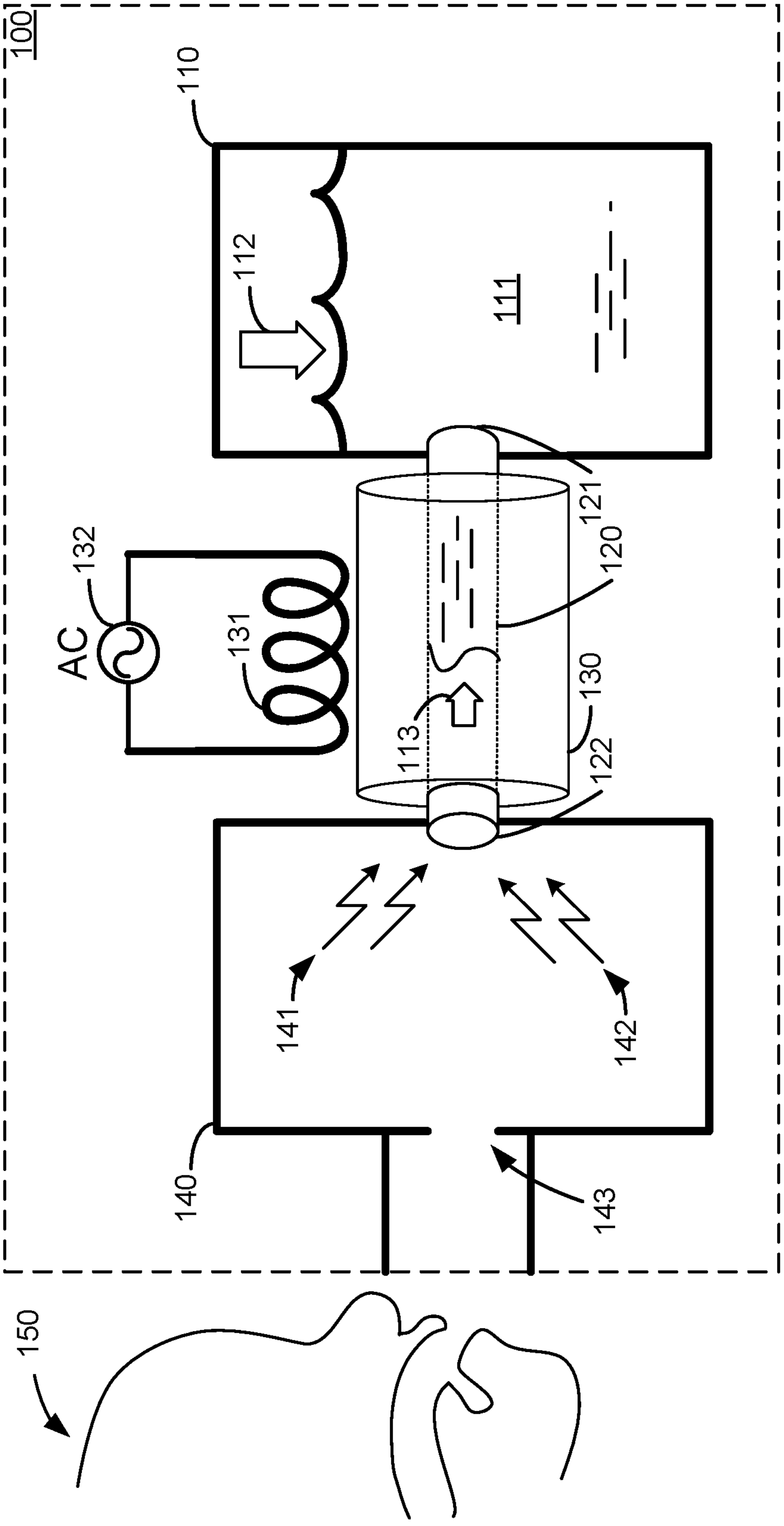
Figure 1C:
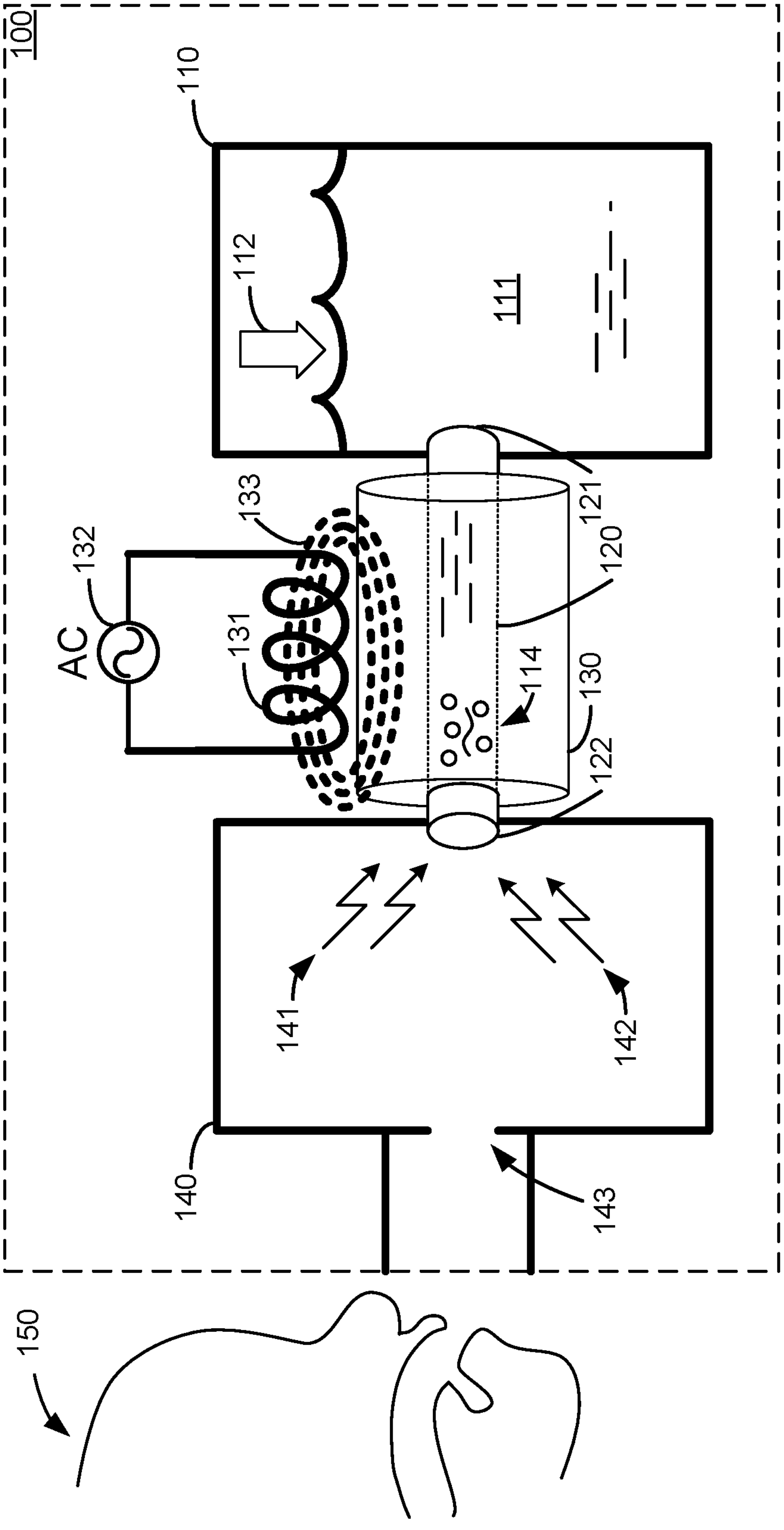
Figure 1D:
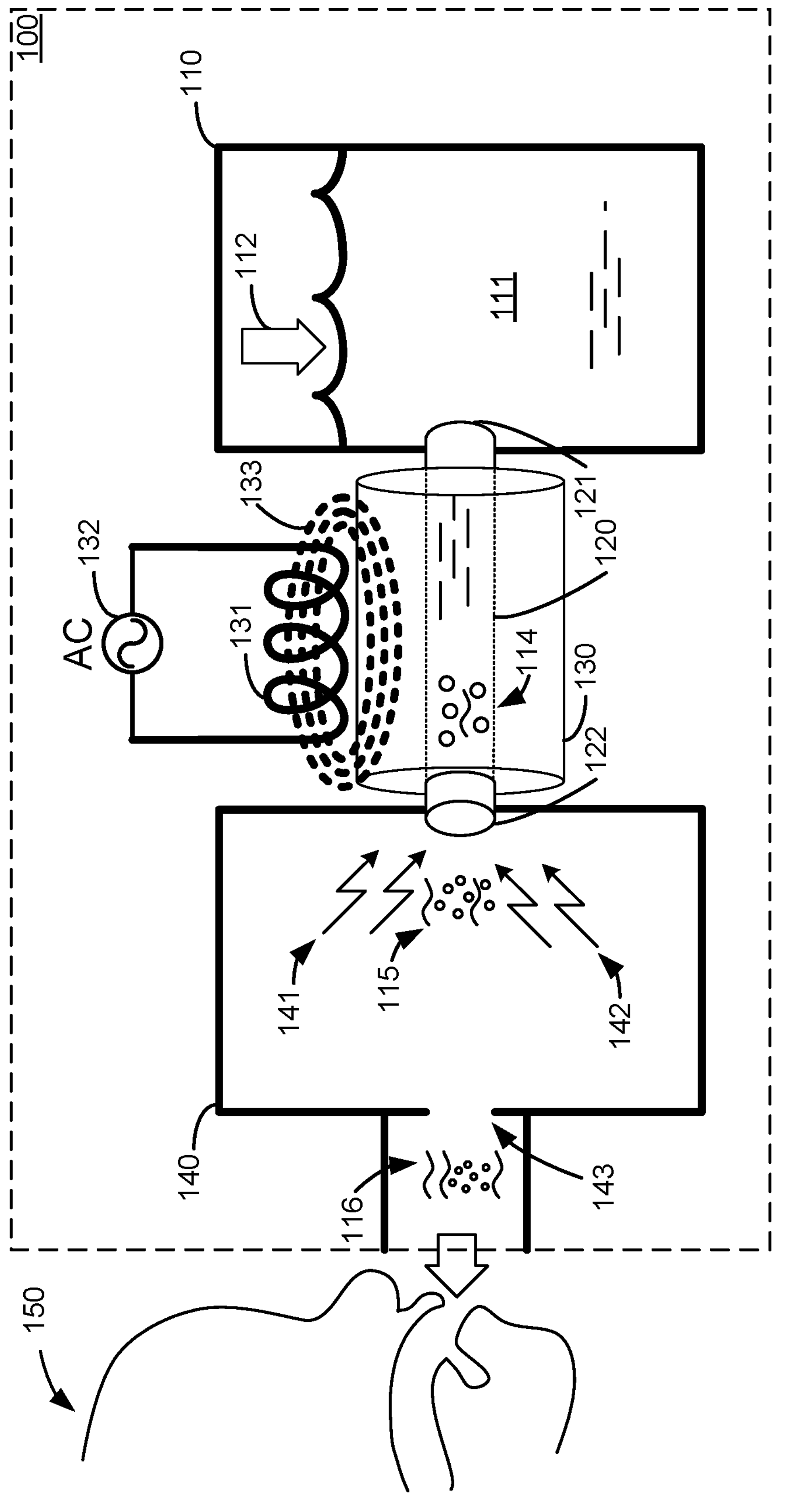

Operation of vaporizing device 100 is further explained with reference to FIGS. 1B-1D. Before actuation (i.e., before user 150 activates vaporizing device 100 to inhale vaporized substance 111) capillary tube 120 and substance 111 are at an ambient temperature. Pressure 112 forces at least some of substance 111 part-way into capillary tube 120. In an embodiment, the viscosity of substance 111 is such that, at reasonable ambient temperatures (e.g., standardized commercial device operating temperature ranges—up to 40° C.), substance 111 does not flow completely through capillary tube 120 to end 122. This is illustrated in FIG. 1B by the viscous resistance force 113 in capillary tube 120 stopping the flow of substance 111 through capillary tube 120. In another embodiment, a cooling device (e.g., Peltier cooler) may cool or freeze a section of capillary tube 120 to increase the viscosity of substance 111 to the point substance 111 does not flow and exit capillary tube 120 via end 122.

When vaporizing device 100 is actuated (e.g., by user 150 pressing a button and/or user 150 initiating an inhale to pull vapor from low-pressure chamber 140), AC source 132 is activated causing inductive heater coil 131 to pass an alternating magnetic field through inductive target 130. This is illustrated in FIG. 1C by the magnetic field lines 133.

Passing an alternating magnetic field through inductive target 130 causes inductive target 130 to rapidly heat. Heat from inductive target 130 is transferred to capillary tube 120. Heat from capillary tube 120 is transferred to substance 111 thereby raising the temperature of substance 111. The raised temperature of substance 111 reduces the viscosity of substance 111 to at least to the point where substance 111, under the influence of the difference in pressure between pressure 112 of reservoir 110 and low-pressure chamber 140, flows through capillary tube 120 towards low-pressure chamber 140. This is illustrated in FIG. 1B by flowing substance 114. In an embodiment, portions of flowing substance 114 may be partially in a vapor or near vaporized (i.e., saturated) state while still in capillary tube 120. In an embodiment, inductive target 130 heats end 121 which is in physical contact with substance 111. This may cause localized heating of substance 111 near end 121 that mobilizes substance 111 to enter end 121 of capillary tube 120 more easily 121.

Heated flowing substance 114 exits capillary tube 120 at end 122. In an embodiment, flowing substance 114 exits capillary tube 120 when flowing substance 114 is at or near flowing substance 114's vaporization temperature. As heated flowing substance 114 exits capillary tube 120, flowing substance 114 is exposed to a reduction of pressure between capillary tube 120 and low-pressure chamber 140 and is exposed to infrared radiation 141. The reduction in pressure reduces the vaporization (boiling) point of flowing substance 114 when compared to the vaporization temperature of flowing substance 114 while flowing substance 114 was inside of capillary tube 120. The exposure to infrared radiation 141 increases the temperature of flowing substance 114. In an embodiment, flowing substance 114 is also exposed to sterilizing light 142 such as ultraviolet (UV) light. One or more of infrared radiation 141 and sterilizing light 142 may be coherent light (e.g., from a laser), incoherent light, or a mixture of both coherent and incoherent light.

The concurrent exposure to the lower pressure of low-pressure chamber 140 and heating by infrared radiation 141 helps create an aerosol-vapor mix 115 with a droplet size distribution. This is illustrated in FIG. 1D by mix 115. As mix 115 passes through low-pressure chamber 140, the droplet size distribution may become a more normalized (i.e., gaussian) distribution. This distribution is illustrated in FIG. 1D by mix 116. Normalized mix 116 exits low-pressure chamber 140 via vapor exit 143 to be inhaled by user 150.

Figure 1E:
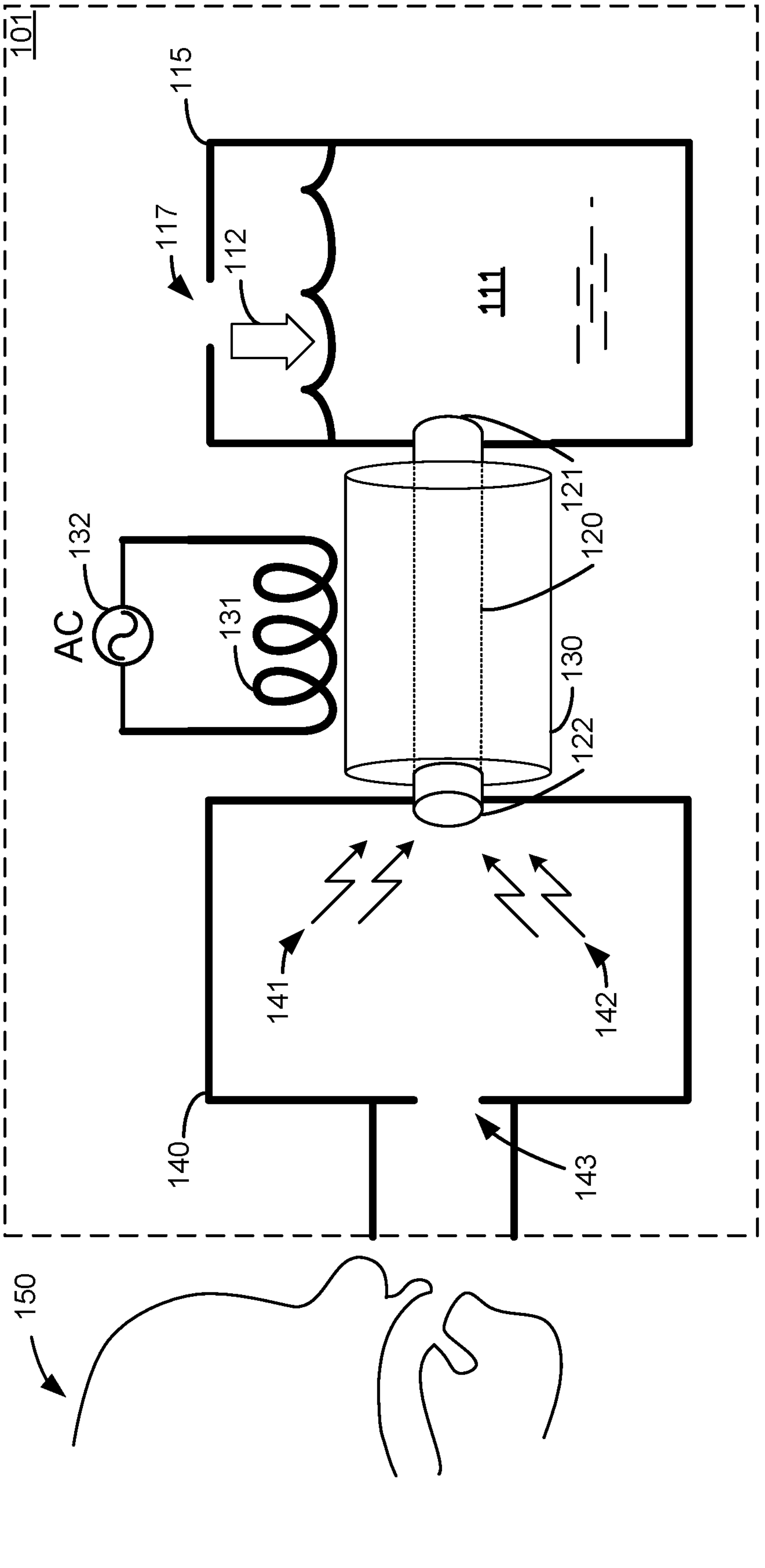

FIG. 1E is a block diagram illustrating an alternative embodiment of a personal vaporizing unit. In FIG. 1E, vaporizing device 101 is substantially the same, and functions substantially the same, as vaporizing device 100 with the exception that substance 111 in reservoir 110 is at atmospheric pressure rather than pressure 112. Vent 117 in reservoir 110 maintains the equilibrium of pressure between the atmosphere and substance 111 in reservoir 110. Thus, it should be understood that with vaporizing device 101, negative pressure (relative to atmospheric pressure) or suction provided by user 150 at vapor exit 143 is used to propel substance 111 into capillary tube 120, etc.

Figure 1F:
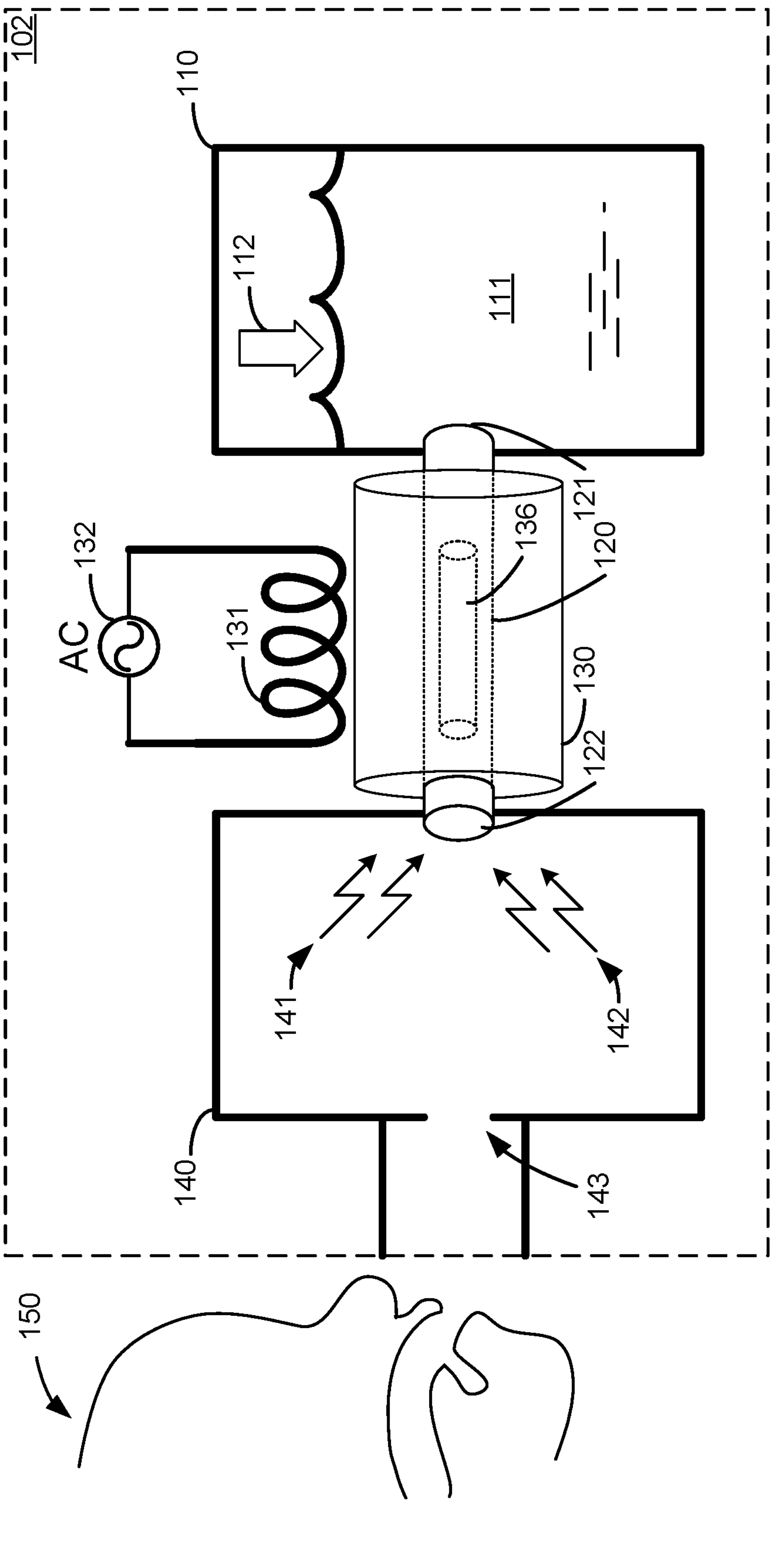

FIG. 1F is a block diagram illustrating an alternative embodiment of a personal vaporizing unit. In FIG. 1E, vaporizing device 102 is substantially the same, and functions substantially the same, as vaporizing device 100 with the exception that vaporizing device 102 includes an additional inductive target 136 disposed within the capillary tube 120. Thus, substance 111, as it flows through capillary tube 120, flows around and/or in contact with inductive target 136. Like inductive target 130, the alternating magnetic field generated by inductive heater coil 131 through inductive target 136 causes inductive target 136 to rapidly heat. In this manner, more heated surface area may be in contact with substance 111 thereby heating substance 111 faster and/or to higher temperatures.

Figure 1G:
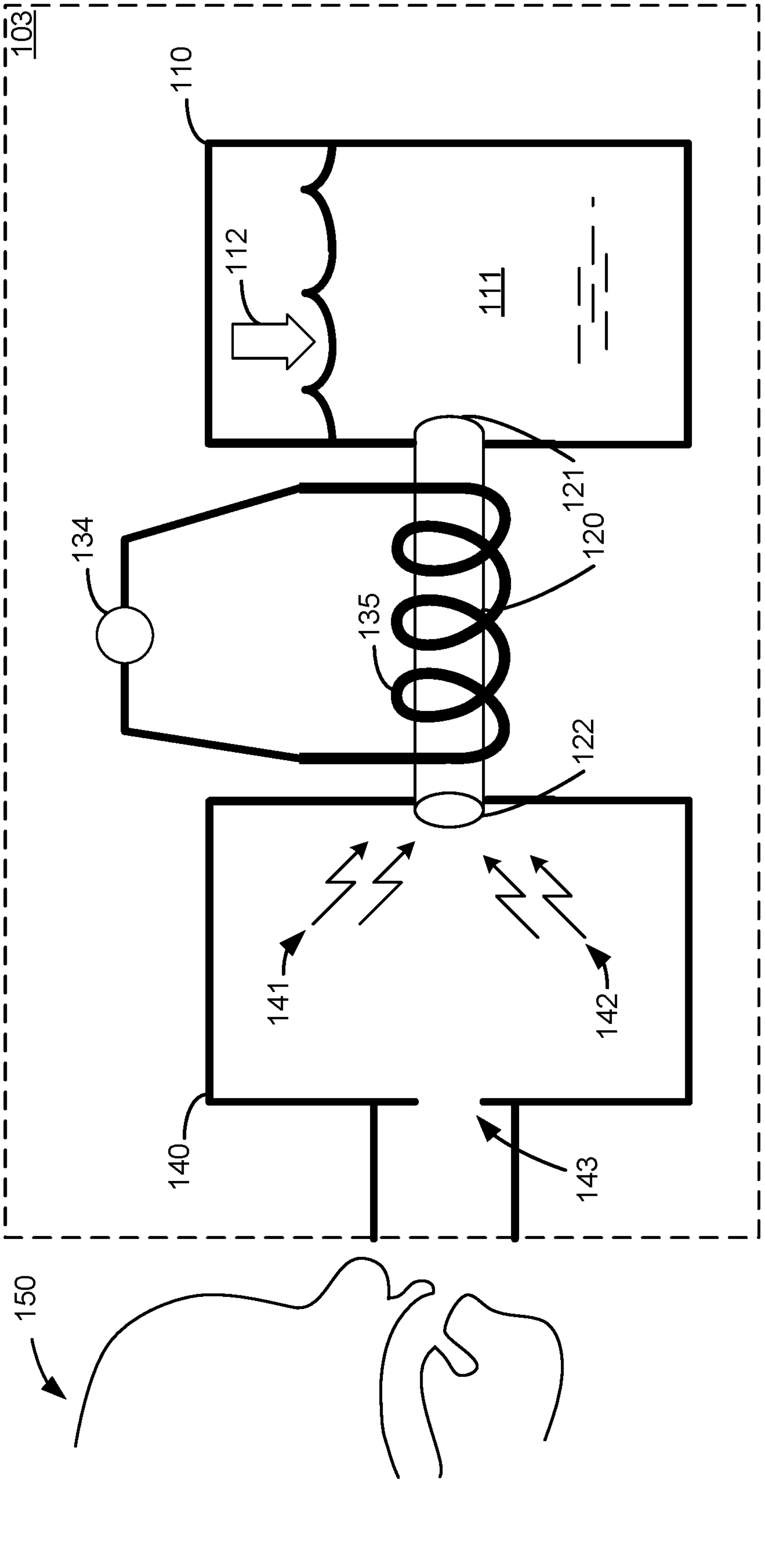

FIG. 1G is a block diagram illustrating an alternative embodiment of a personal vaporizing unit. In FIG. 1G, vaporizing device 103 is substantially the same, and functions substantially the same, as vaporizing device 100 with the exception that vaporizing device 102 uses a resistive heating element 135 to heat capillary tube 120. When selectively activated, source 134 passes a current (either AC, DC, or both) through resistive heating element 135. This causes resistive heating element 135 to generate heat thereby heating substance 111 in capillary tube 120.

Figure 2A:
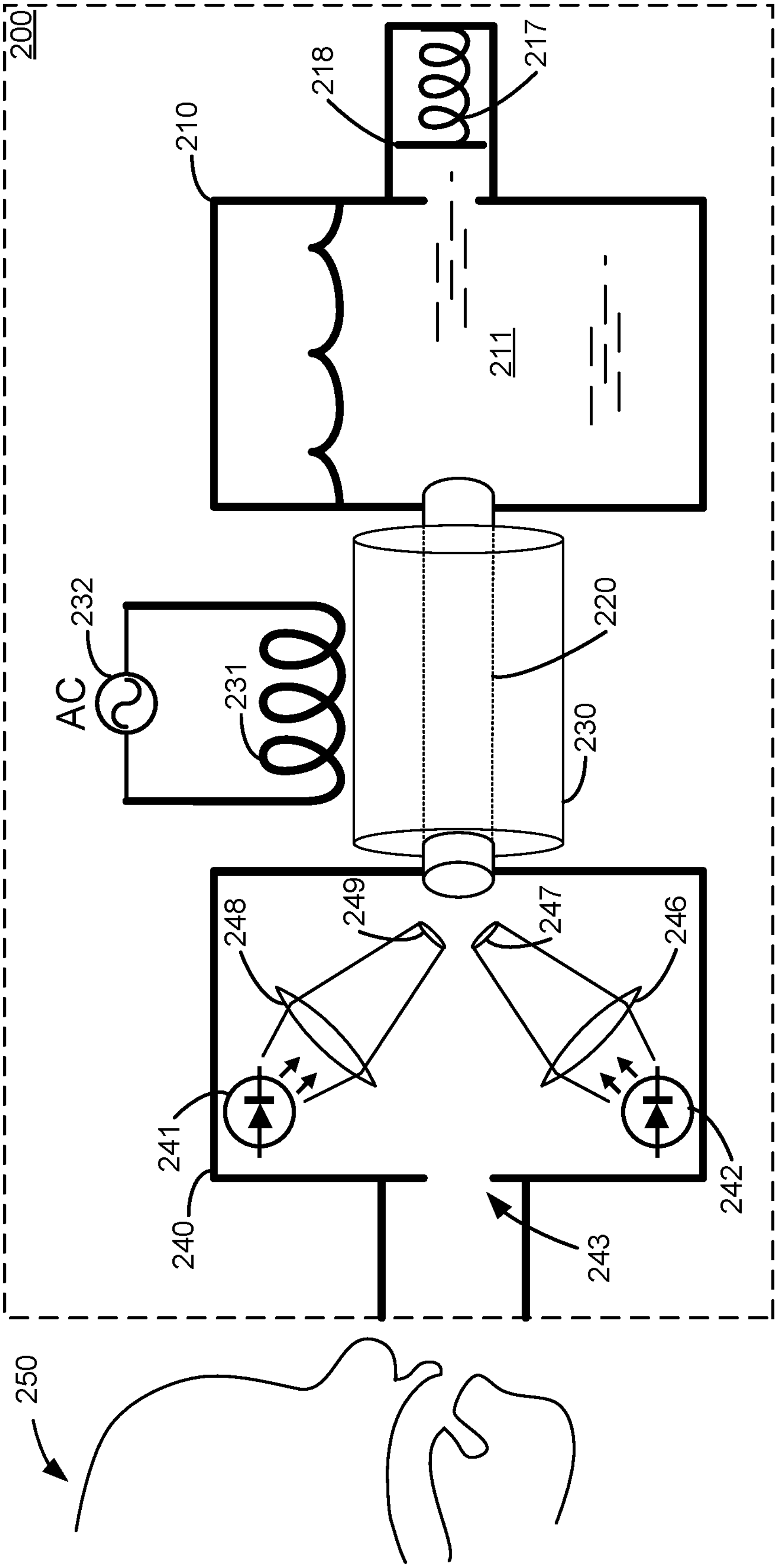
FIG. 2A is a diagram illustrating a personal vaporizing unit with solid-state light sources.

FIG. 2A is a diagram illustrating a personal vaporizing unit with solid-state light sources. In FIG. 2A, vaporizing device 200 comprises reservoir 210, spring 217, piston 218, capillary tube 220, inductive target 230, inductive heater coil 231, alternating current (AC) source 232, low-pressure chamber 240, infrared light source 241, sterilizing light source 242, lens 246, lens 248 and vapor exit 243. Reservoir 210 contains substance 211 to be vaporized. Substance 211 to be vaporized is pressurized by piston 218 being biased by compressed spring 217. In an embodiment, substance 211 is pressurized to a level where air bubbles that may form as substance 211 flows through capillary tube 220 are driven out. In an embodiment, substance 211 is pressurized to a level where substance 211 cannot, under normal use conditions, be driven backwards from low-pressure chamber 240 and/or capillary tube 220 into reservoir 210.

A first end 221 of capillary tube 220 is in contact with, and interfaces with, substance 211. A second end 222 of capillary tube 220 opens into low-pressure chamber 240. A vapor exit 243 from low-pressure chamber 240 allows vapors, aerosols, and other gases (e.g., air) to exit low-pressure chamber 240 to be inhaled by a user 250.

Capillary tube 220 is disposed adjacent to, or surrounded by, an inductive target 230. Inductive target 230, inductive heater coil 231, alternating current source 232 form an inductive heater to heat capillary tube 220 and the contents of capillary tube 220. In an embodiment, capillary tube 220 may be physically interfaced to inductive target 230 by a material to facilitate heat transfer from inductive target 230 to capillary tube 220.

The second end 222 of capillary tube 220 is open to low-pressure chamber 240. Thus, capillary tube 220 may serve as a conduit for substance 211 to pass from reservoir 210 to low-pressure chamber 240. Substance 211 passing from reservoir 210 to low-pressure chamber 240 via capillary tube 220 may be heated by inductive target 230 as substance 211 passes through capillary tube 220. Substance 211 passing from reservoir 210 to low-pressure chamber 240 via capillary tube 220 may be heated to near substance 211's vaporization temperature, to substance 211's vaporization temperature, and/or above substance 211's vaporization temperature.

Substance 211 exits capillary tube 220 into low-pressure chamber 240 via the second end 222 of capillary tube 220. In an embodiment, substance 211 exits capillary tube 220 at or near substance 211's vaporization temperature. In other words, substance 211 is at or near substance 211's saturation temperature for the conditions inside capillary tube 220.

Low-pressure chamber 240 is negatively pressured relative to the ambient air pressure, the pressure within capillary tube 220, and/or the pressure of reservoir 210. Low-pressure chamber 240 may be negatively pressured by, for example, a mechanical device such as a piston. In an embodiment, low-pressure chamber 240 may be negatively pressured as a result of an inhalation by user 250.

As heated flowing substance 211 exits capillary tube 220, flowing substance 211 is exposed to a reduction of pressure between capillary tube 220 and low-pressure chamber 240. Concurrently, as heated flowing substance 211 exits capillary tube 220, flowing substance 211 is exposed to a focused spot 249 of infrared light produced by infrared light source 241. Spot 249 may be produces by lens 248 focusing the infrared light produced by infrared light source 241. In an embodiment, infrared light source 241 is an infrared wavelength specific light source such as an infrared light emitting diode (LED) or an infrared wavelength solid-state laser.

The reduction in pressure reduces the vaporization (boiling) point of flowing substance 211 when compared to the vaporization temperature of flowing substance 211 while flowing substance 211 was inside of capillary tube 220. The exposure to the focused spot 249 of infrared light/radiation increases the temperature of flowing substance 211.

In an embodiment, as heated flowing substance 211 exits capillary tube 220, flowing substance 211 is exposed to a focused spot 247 of sterilizing light produced by sterilizing light source 242. Spot 247 may be produced by lens 246 focusing the light produced by sterilizing light source 242. In an embodiment, sterilizing light source 242 is an ultraviolet (UV) wavelength specific light source such as UV light emitting diode (LED).

The concurrent exposure to the lower pressure of low-pressure chamber 240 and heating by spot 249 helps create an aerosol-vapor mix with a droplet size distribution. As this mix passes through low-pressure chamber 240, the droplet size distribution may become a more normalized (i.e., gaussian) distribution. A normalized mix of substance 211 exits low-pressure chamber 240 via vapor exit 243 to be inhaled by user 250.

Figure 2B:
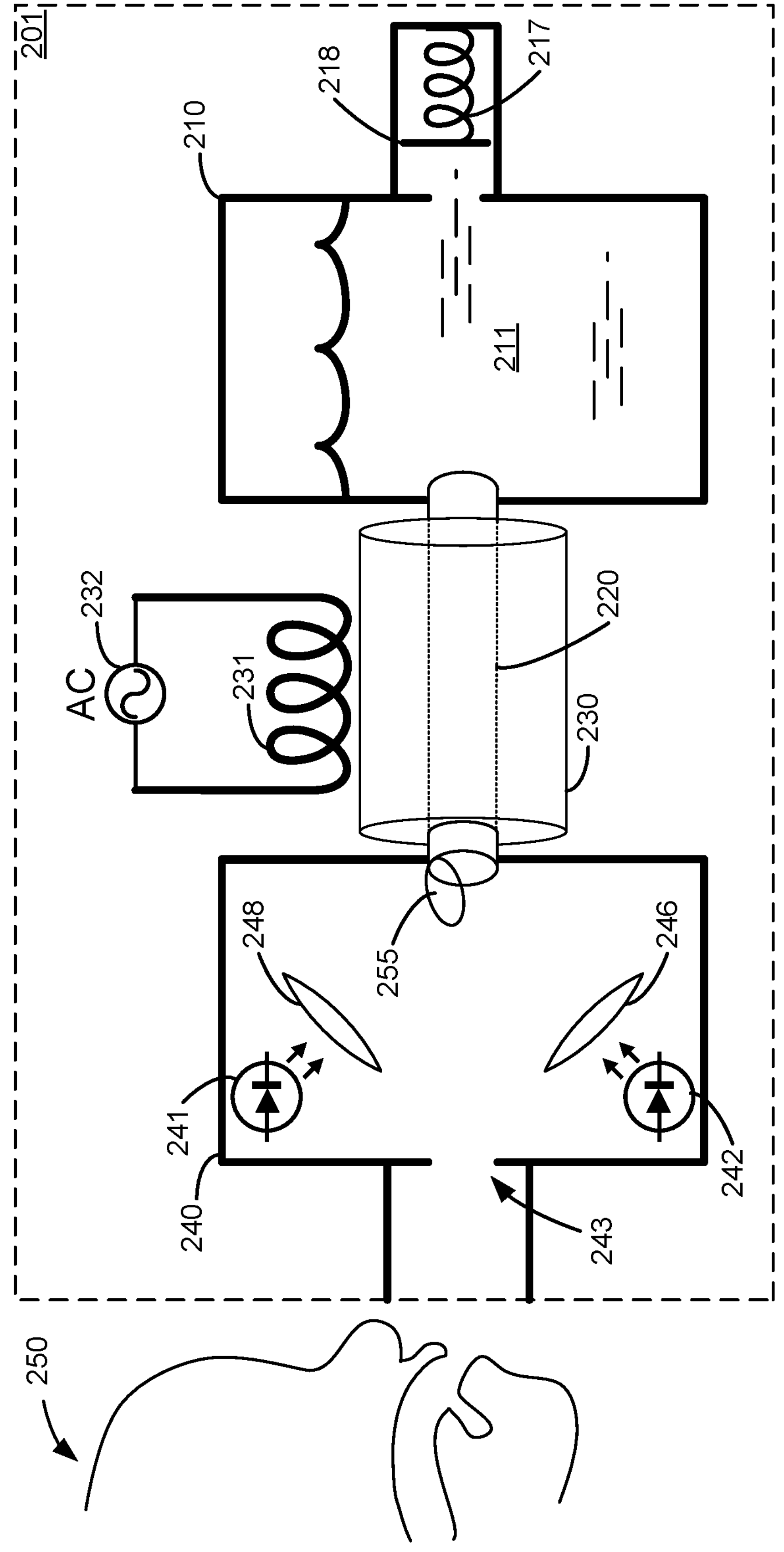
FIG. 2B is a diagram illustrating a personal vaporizing unit with a face valve.

FIG. 2B is a diagram illustrating a personal vaporizing unit with a face valve. In FIG. 2B, vaporizing device 201 comprises reservoir 210, spring 217, piston 218, capillary tube 220, inductive target 230, inductive heater coil 231, alternating current (AC) source 232, low-pressure chamber 240, infrared light source 241, sterilizing light source 242, lens 246, lens 248, vapor exit 243, and valve 255. Vaporizing device 201 operates in substantially the same manner as vaporizing device 200 except that rather than rely on the temperature dependent viscosity of substance 211 to prevent flow from reservoir 210 to low-pressure chamber 240, vaporizing device 201 relies on valve 255 to prevent flow from reservoir 210 to low-pressure chamber 240. Thus, for the sake of brevity, the operation of reservoir 210, spring 217, piston 218, capillary tube 220, inductive target 230, inductive heater coil 231, alternating current (AC) source 232, low-pressure chamber 240, infrared light source 241, sterilizing light source 242, lens 246, lens 248, and vapor exit 243 will not be repeated.

Figure 3:
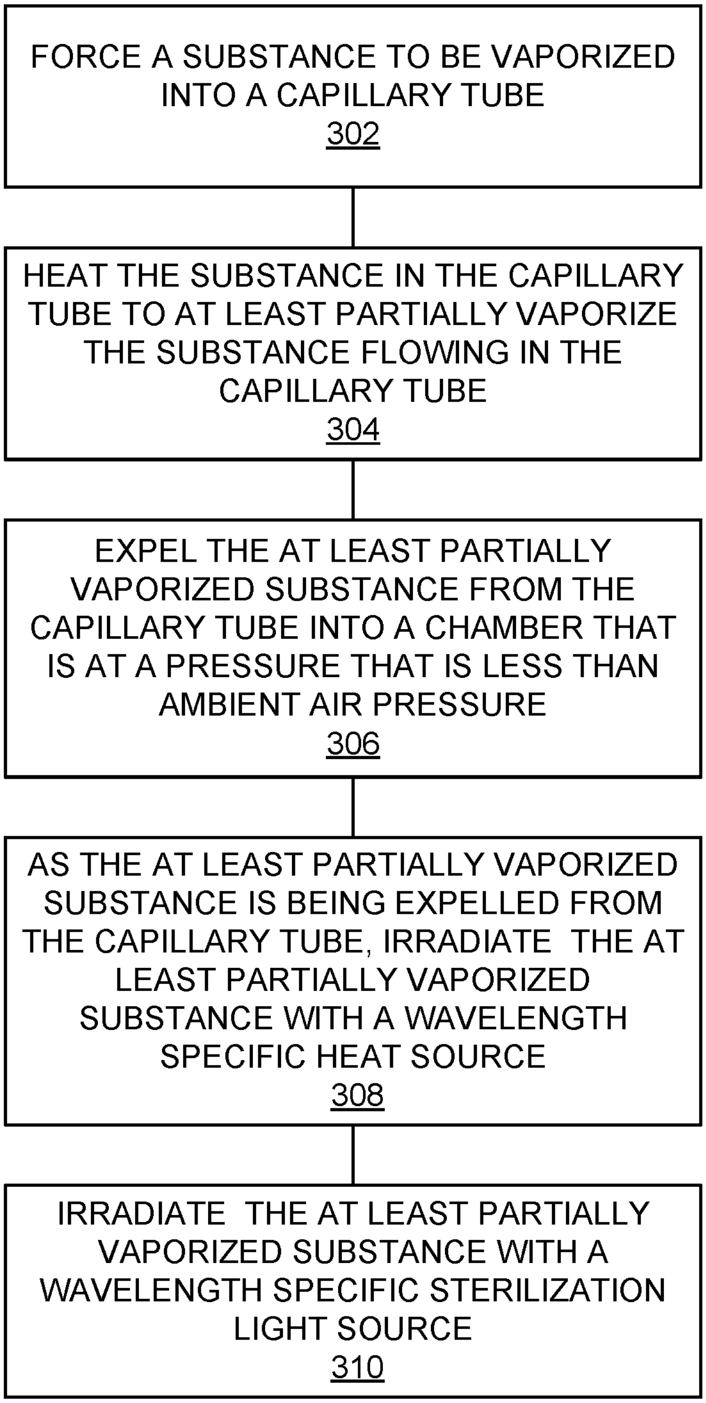
FIG. 3 is a flowchart illustrating a method of vaporizing a liquid.

FIG. 3 is a flowchart illustrating a method of vaporizing a liquid. One or more steps illustrated in FIG. 3 may be performed by, for example, vaporizing device 100, vaporizing device 200, vaporizing device 201, and/or their components. A substance to be vaporized is forced into a capillary tube (302). For example, pressure 112 in reservoir 210 may force substance 111 into end 121 of capillary tube 120. In another example, before actuation (i.e., before, for example, user 150 activates vaporizing device 100 to inhale vaporized substance 111) capillary tube 120 and substance 111 are at an ambient temperature. Pressure 112 forces at least some of substance 111 part-way into capillary tube 120. The viscosity of substance 111 may be such that, at reasonable ambient temperatures (e.g., standardized commercial device operating temperature ranges—up to 40° C.), substance 111 does not flow completely through capillary tube 120 to end 122.

The substance in the capillary tube is heated to at least partially vaporize the substance flowing in the capillary tube (304). For example, inductive target 130 may transfer enough heat to capillary tube 120 and thereon to substance 111 to at least partially vaporize substance 111 in capillary tube 120 while inductive target 130 is being heated by inductive heater coil 131 and AC source 132. In other words, for example, passing an alternating magnetic field through inductive target 130 causes inductive target 130 to rapidly heat. Heat from inductive target 130 is transferred to capillary tube 120. Heat from capillary tube 120 is transferred to substance 111 while substance 111 is in capillary tube 120 thereby raising the temperature of substance 111 that is in capillary tube 120. The raised temperature of substance 111 reduces the viscosity of substance 111 to at least to the point where substance 111 in capillary tube 120, under the influence of the difference in pressure between pressure 112 of reservoir 110 and low-pressure chamber 140, flows through capillary tube 120 towards low-pressure chamber 140. Portions of flowing substance 111 in capillary tube 120 may be partially in a vapor or near vaporized (i.e., saturated) state while still in capillary tube 120. Inductive target 130 may also, for example, heat end 121 of capillary tube 120 which is in physical contact with substance 111 that is in reservoir 110. This may cause, for example, a localized heating of substance 111 near end 121 that mobilizes substance 111 to enter end 121 of capillary tube 120 more easily 121.

The at least partially vaporized substance is expelled from the capillary tube into a chamber that is at a pressure that is less than ambient air pressure (306). For example, the at least partially vaporize substance 111 in capillary tube 120 being heated by inductive target 130 may flow out of end 122 of capillary tube under the influence of a pressure difference between reservoir 110 and low-pressure chamber 140.

As the at least partially vaporized substance is being expelled from the capillary tube, irradiate the at least partially vaporized substance with a wavelength specific heat source (308). For example, as heated flowing substance 111 exits capillary tube 120 via end 122 into low-pressure chamber 140, substance 111 may be exposed to infrared radiation 141. The exposure to infrared radiation 141 increases the temperature of substance 111 as it exits end 122 and traverses low-pressure chamber 140. In another example, as heated flowing substance 211 exits capillary tube 220, flowing substance 211 is exposed to a focused spot 249 of infrared light produced by infrared light source 241. Infrared light source 241 may be, for example, an infrared wavelength specific light source such as an infrared light emitting diode (LED) or an infrared wavelength solid-state laser.

The at least partially vaporized substance is irradiated with a wavelength specific sterilization light source (310). For example, as heated flowing substance 111 exits capillary tube 120 via end 122 into low-pressure chamber 140, substance 111 may be exposed to sterilizing light 142 such as ultraviolet (UV) light. In another example, as heated flowing substance 211 exits capillary tube 220, flowing substance 211 is exposed to a focused spot 247 of sterilizing light produced by sterilizing light source 242. Sterilizing light source 242 may be, for example, an ultraviolet (UV) wavelength specific light source such as UV light emitting diode (LED).

Figure 4A:
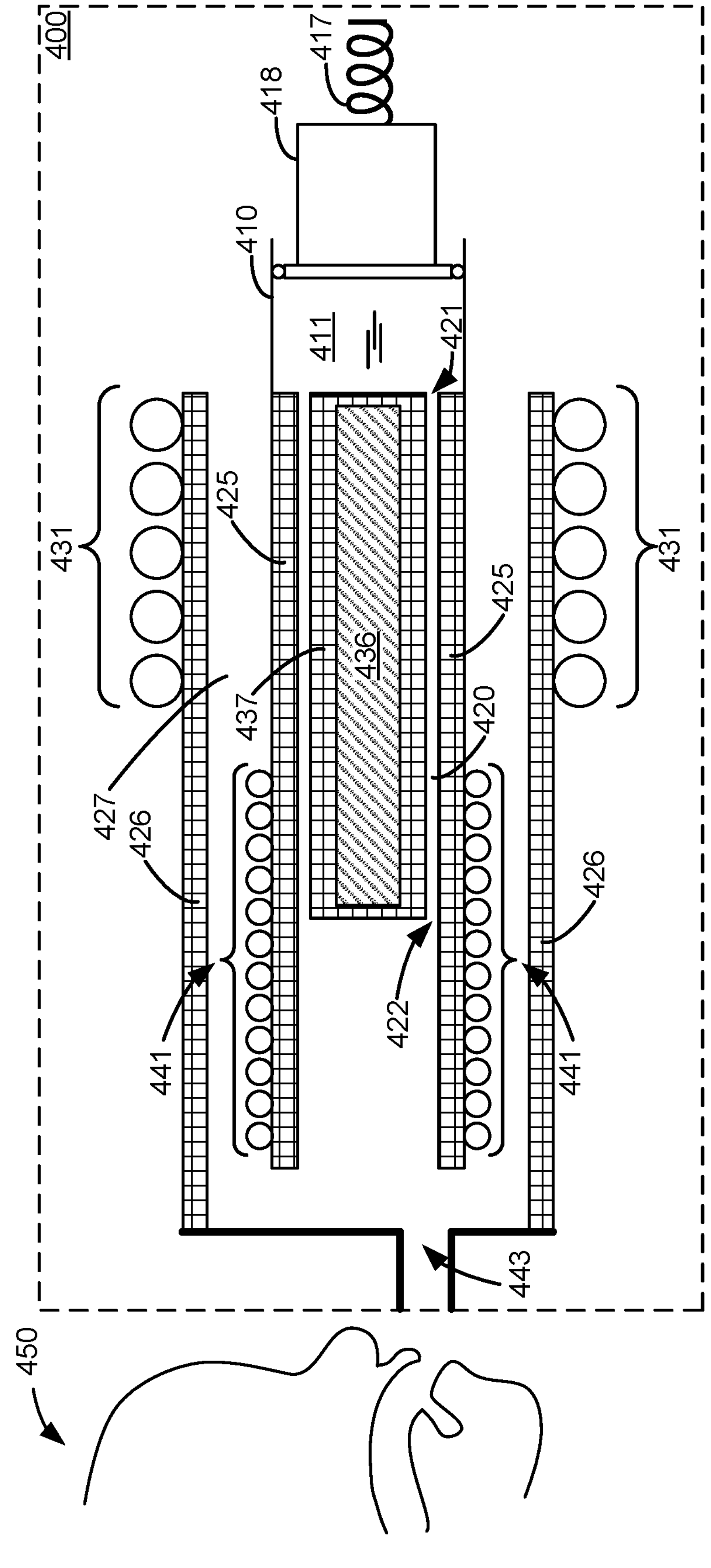
FIGS. 4A-4C are diagrams illustrating personal vaporizing units.
Figure 4B:
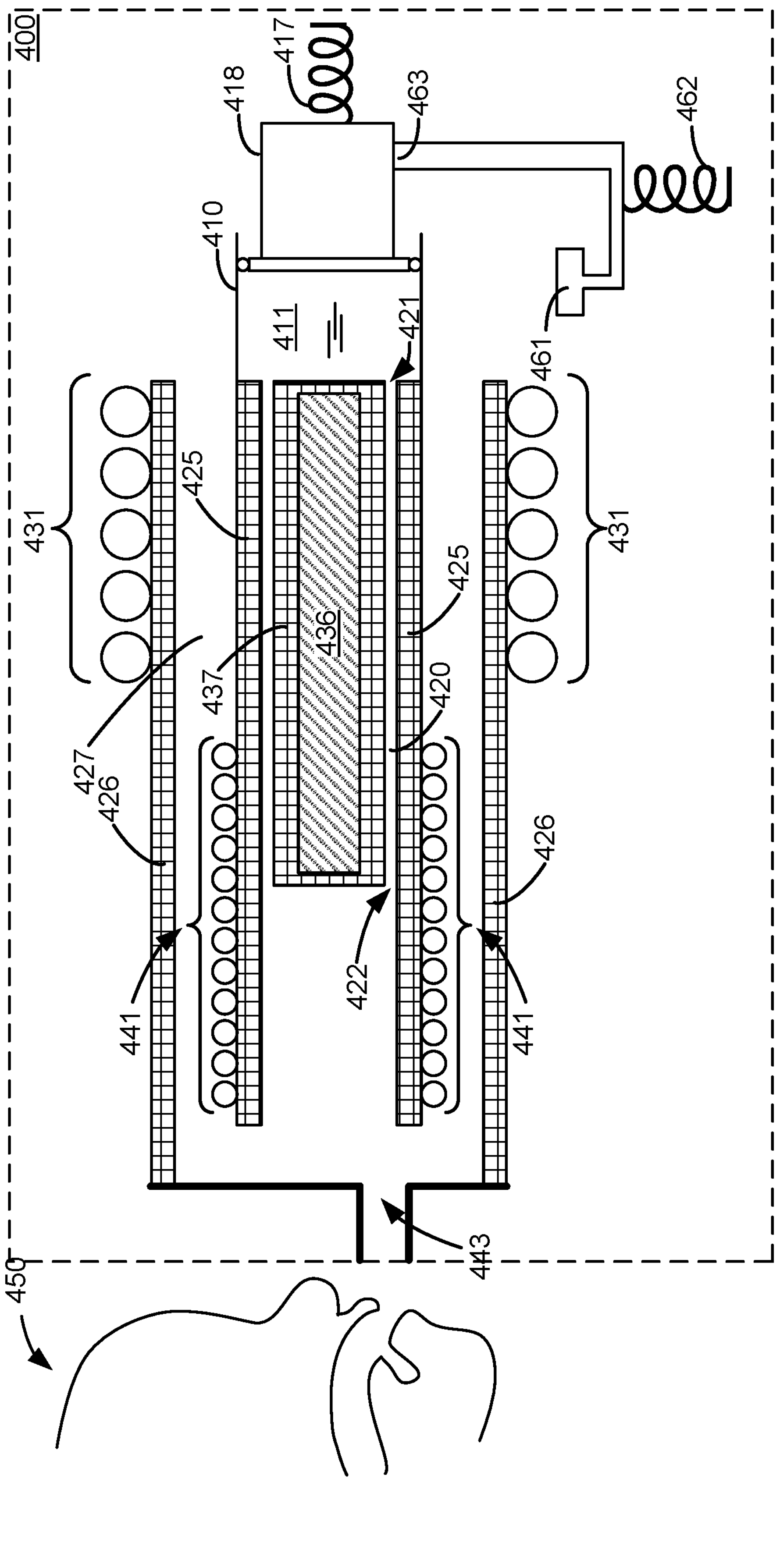
Figure 4C:
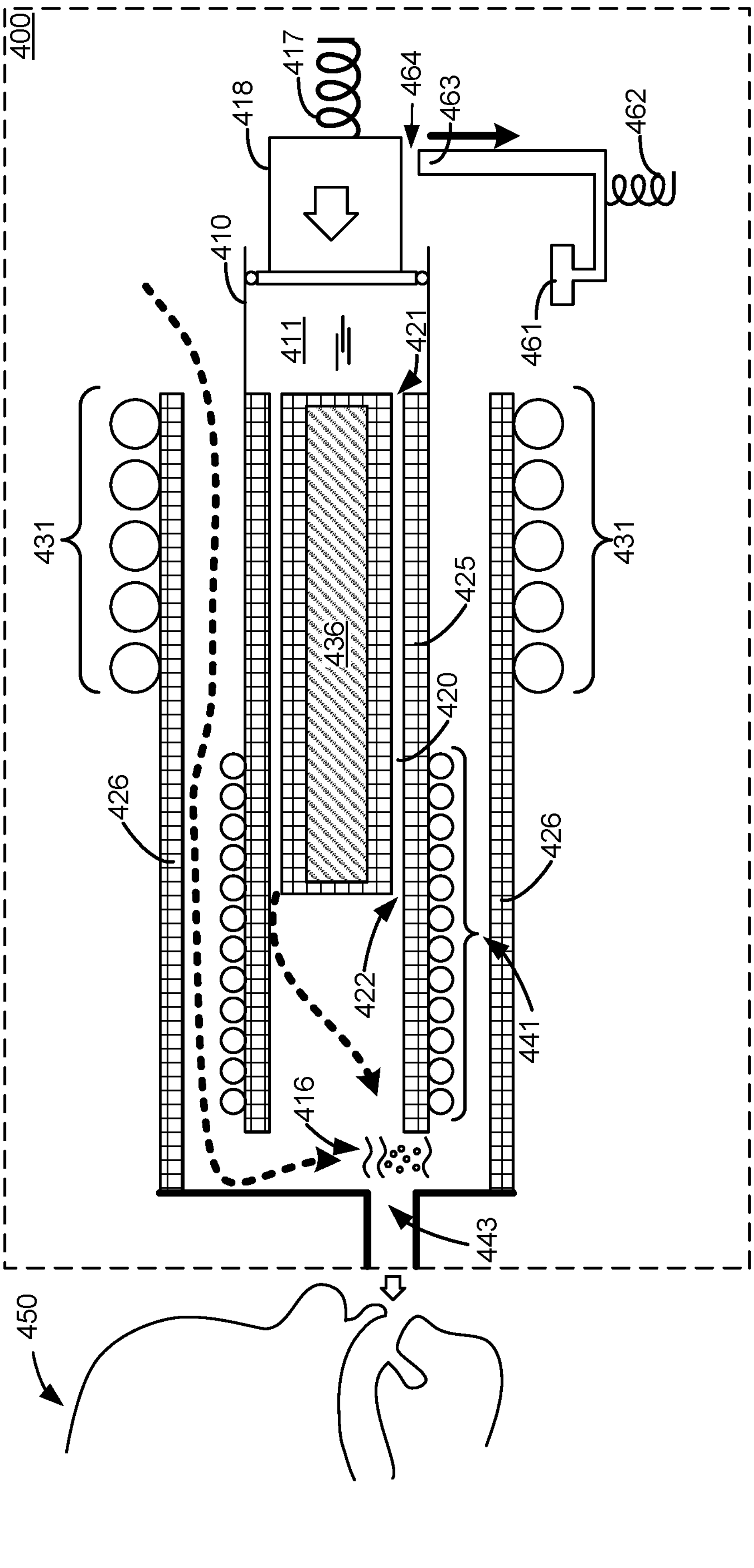

FIGS. 4A-4C are diagrams illustrating personal vaporizing units. In an embodiment, inner glass tube 437 encapsulates inductive target 436 thereby preventing any contact of substance 411, whether in a liquid or vapor form, from contacting inductive target 436. Outer glass tube 425 has an inner diameter that is slightly (e.g., 0.1 mm to 1 mm) larger than the outer diameter of inner glass tube 437. This slight difference in diameters forms capillary region 420 allowing substance 411 to, when vaporizing device 400 is activated, flow through capillary region 420 from a first end 421 of capillary region 420 to a second end 422 of capillary region 420. As substance 411 flows through capillary region 420, substance 411 may be heated by heat originating with inductive target 436 and flowing through inner glass tube 437. Substance 411 may be heated via contact with inner glass tube 437 when inner glass tube is heated by inductive target 436.

In an embodiment, shell 426 surrounds outer glass tube 425. Shell 426 also defines at least one passageway 427 to allow ambient air to flow through vaporizing device 400 and mix with substance 411 after substance 411 has exited capillary region 420. In an embodiment, air flowing in passageway 427 may be heated by heater coil 441. In an embodiment, shell 426 is a glass tube having an inner diameter that is larger than the outer diameter of outer glass tube 425 thereby defining passageway 427.

When plunger 418 is free to move, substance 411 is under pressure provided by plunger spring 417. The first end 421 of capillary region 420 is in contact with and interfaces with substance 411. The second end 422 of capillary region 20 is disposed to along a flowpath that end with vapor exit 443 and user 450. Vapor exit 143 allows vapors and other gases (e.g., air) to be inhaled by a user 450.

Inductive target 430 may comprise any material that, when stimulated by an alternating magnetic field applied by inductive heater coil 431, is heated. An inductive target 436 made of a metal, for example, may be heated via electromagnetic induction applied by inductive heater coil 431 that results in heat being generated in inductive target 436 by eddy currents. An inductive target 436 comprising ferromagnetic (and ferrimagnetic) material(s), for example, materials may be heated by heat generated by magnetic hysteresis losses in response to electromagnetic induction applied by inductive heater coil 431.

Inductive target 436, inductive heater coil 431, and an alternating current source (not shown in FIGS. 4A-4C) form an inductive heater to heat inner glass tube 437 which then, in turn, heats capillary region 420 and the contents of capillary region 420 (e.g., substance 411).

The second end 422 of capillary region 420 is disposed along a flowpath that ends with vapor exit 443 and user 450. Vapor exit 143 allows vapors and other gases (e.g., air) to be inhaled by a user 450. Thus, capillary region 420 may serve as a conduit for substance 411 to pass from reservoir 410 to vapor exit 443. As described herein, substance 411 passing from reservoir 410 to vapor exit 443 via capillary region 420 may be heated to near substance 411's vaporization temperature, to substance 411's vaporization temperature, and/or above substance 411's vaporization temperature.

Substance 411 exits capillary region 420 via the second end 422 of capillary region 420. In an embodiment, substance 411 exits capillary region 420 at or near substance 411's vaporization temperature. In other words, substance 411 is at or near substance 411's saturation temperature for the conditions inside capillary region 420.

In an embodiment, as substance 411 exits capillary region 420 at or near substance 411's vaporization temperature, heated substance 411 is exposed to at least two environmental changes. A first environmental change is the reduction of pressure between capillary region 420 and vapor exit 443. This reduction in pressure reduces the vaporization (boiling) point of substance 411 when compared to the vaporization temperature of substance 411 while substance 411 was inside of capillary region 420.

A second environmental change is the irradiation of substance 411 by at least infrared radiation provided by heater coil thereby heating substance 411. Thus, as substance 411 exits capillary region 420, the vaporization temperature of substance 411 is reduced while substance 411 is concurrently heated thereby raising the temperature of substance 411. These changes in environment allow substance 411 to rapidly convert to a vapor (i.e., boil). In an embodiment, substance 411 may comprise an infrared absorptive (e.g., infrared opaque) substance to facilitate the heating of substance 411 by heater coil 441.

In an embodiment, after or as substance 411 exits capillary region 420, substance 411 may be irradiated by a sterilizing light or other radiation. For example, substance 411 (now a gas or vapor) may be irradiated by ultraviolet wavelength light. Sterilized and vaporized substance 411 may then exit vaporizing device 400 via vapor exit 443 to be inhaled by user 450.

FIGS. 4B-4C illustrate activation mechanism for vaporizing device 400. FIG. 4B illustrates vaporizing device 400 in a deactivated state. In the deactivated state, spring force 462 engages a brake 463 with plunger 418 thereby preventing spring 417 from pressurizing substance 411. FIG. 4C illustrates vaporizing device 400 in an activated state. When a user 450 depresses button 461 spring force 462 is partially or completely counteracted by the force of the user 450 depressing button 461. This disengages brake 463 from plunger 418 thereby allowing spring 417 to pressurize substance 411. Allowing spring 417 to pressurize substance 411 allows substance 411 to flow through capillary region 420 (and optionally be heated by inductive target 436 and inner glass tube 437. Concurrently with depressing button 461, user 450 may inhale thereby drawing ambient air through passageway 427 to form a mix 416 with substance 411 (whether in liquid or vapor form, heated or at ambient temperature).

Figure 5A:
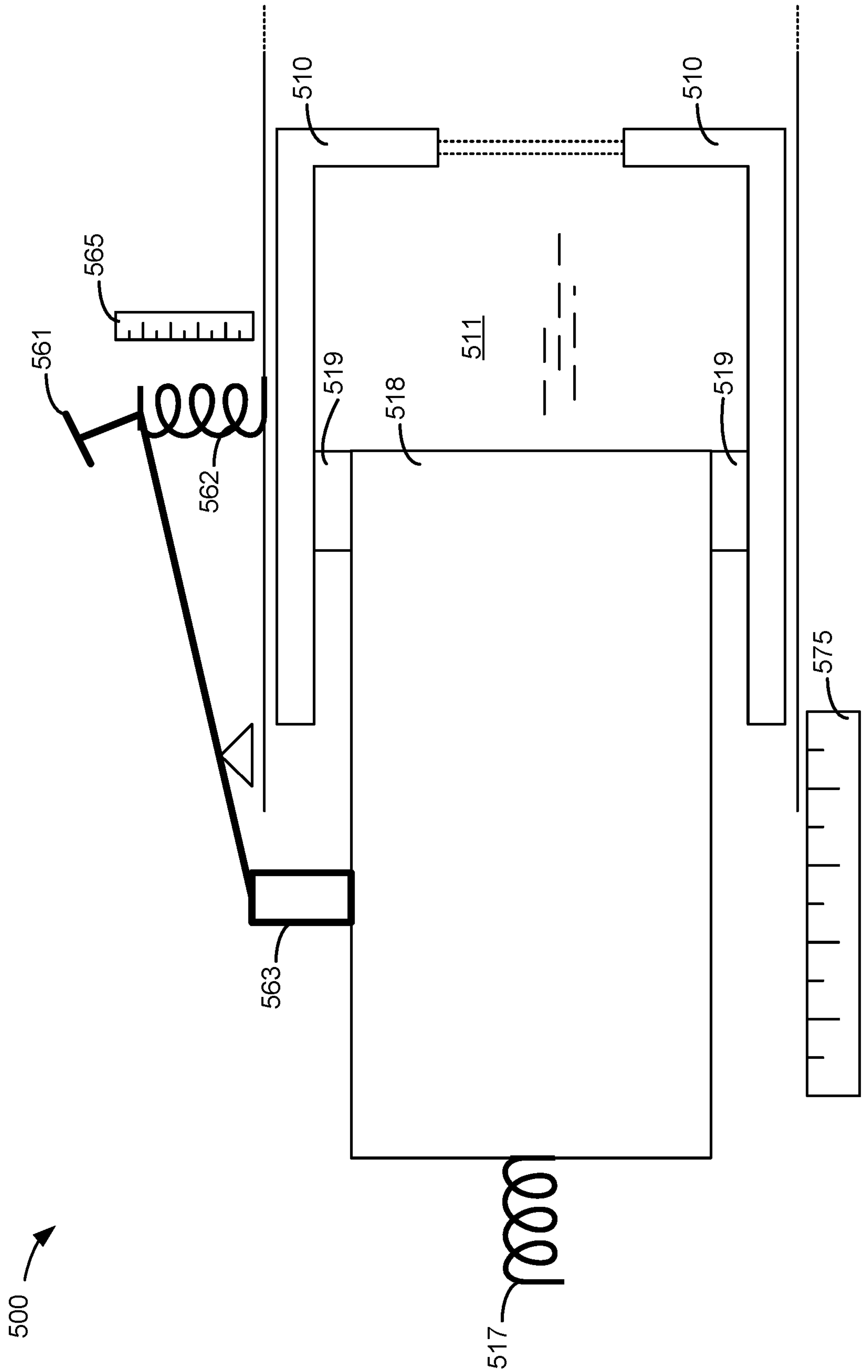
FIGS. 5A-5B are diagrams illustrating a personal vaporizing unit actuation system.
Figure 5B:
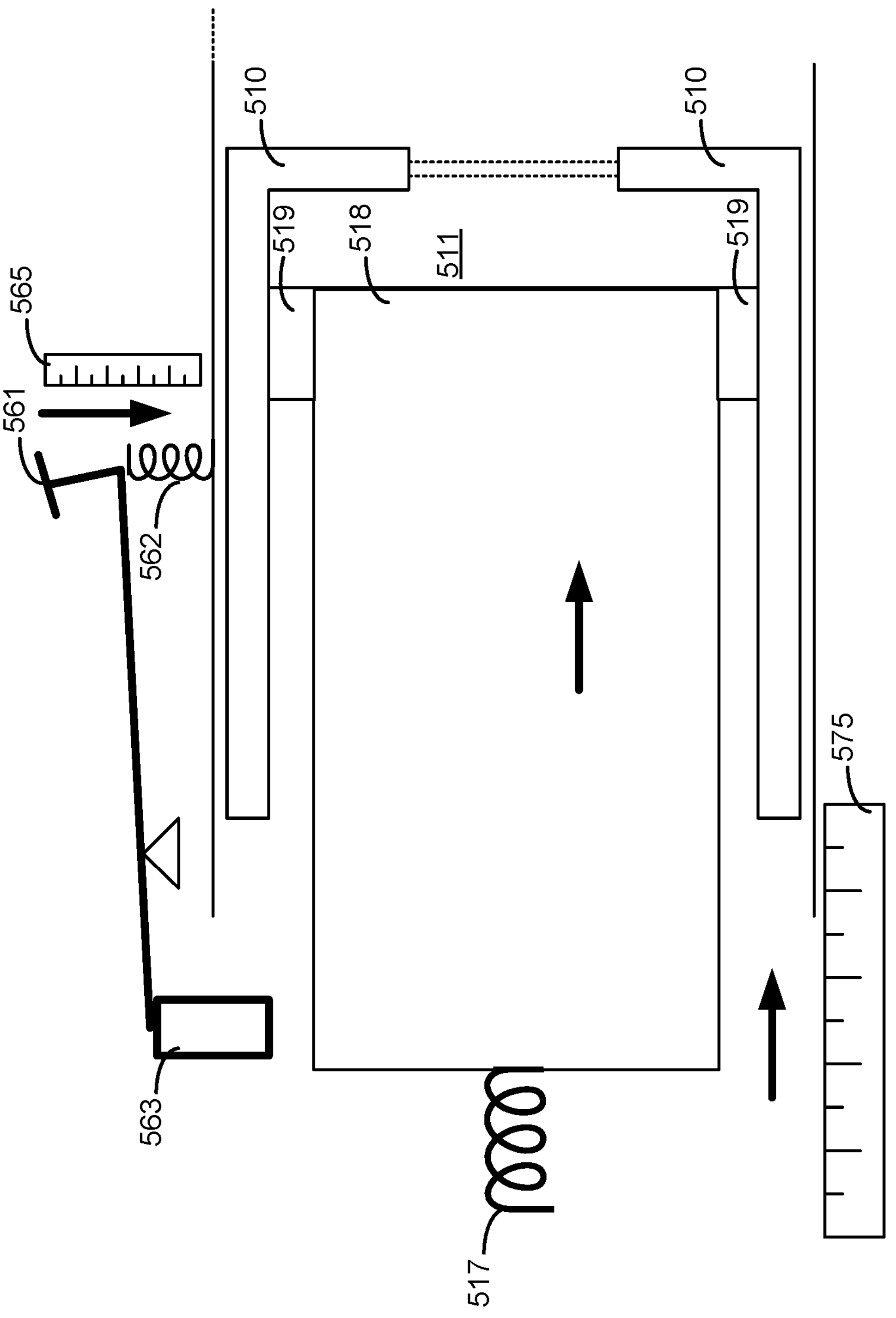

FIGS. 5A-5B are diagrams illustrating a personal vaporizing unit actuation system. In FIGS. 5A-5B, actuating system 500 comprises reservoir 510, substance 511, plunger spring 517, plunger 518, plunger seal 519, button 561, brake spring force 562, brake 563, button displacement sensor 565, and plunger displacement sensor 575. Reservoir 510 contains substance 511 (e.g., liquid). FIG. 5A illustrates actuating system 500 in a deactivated state. In the deactivated state, brake spring force 562 engages a brake 563 with plunger 518 thereby preventing plunger spring 517 from pressurizing substance 511. While deactivated, plunger displacement sensor 575 may measure a displacement of plunger 518. Plunger displacement sensor 575 may measure a displacement of plunger 518 relative to a reference (e.g., full reservoir 510). FIG. 5B illustrates actuating system 500 in an activated state. When a user depresses button 561 brake spring force 562 is partially or completely counteracted by the force of the user depressing button 561. This disengages brake 563 from plunger 518 thereby allowing plunger spring 517 to pressurize substance 511. As substance 511 is pushed out of reservoir 510 by plunger 518, plunger 518 is displaced. Plunger displacement sensor 575 measures the position and/or displacement of plunger 518. The position and/or displacement indicators measure by plunger displacement sensor 575 may correspond to, or be correlated to the amount of substance 511 that has exited reservoir 510, is present in reservoir 510, and/or the rate substance 511 is exiting reservoir 510. In an embodiment, one or more of button displacement sensor 565 and plunger displacement sensor 575 may be or comprise hall effect sensors.

As the user depresses button 561, button displacement sensor 565 measures an indicator of the displacement of button 561. This indicator may be provided to electronics that modulate or control other parts of the vaporizing unit. For example, the amount of heat and/or temperature imparted by inductive target 436, as heated by inductive heater coil 431, to substance 411 may be based on one or more (e.g., discrete time, continuous tie) button displacement indicators. In another example, the amount of heat and/or temperature imparted by heater coil 441 to mix 416 and/or incoming ambient air may be based on one or more (e.g., discrete time, continuous tie) button displacement indicators.

As the plunger displacement sensor 575 measures an indicator of the displacement of plunger 518. This indicator may be provided to electronics that modulate or control other parts of the vaporizing unit. For example, the amount of heat and/or temperature imparted by inductive target 436, as heated by inductive heater coil 431, to substance 411 may be based on one or more (e.g., discrete time, continuous tie) plunger displacement indicators. In another example, the amount of heat and/or temperature imparted by heater coil 441 to mix 416 and/or incoming ambient air may be based on one or more (e.g., discrete time, continuous tie) plunger displacement indicators. In an embodiment, the control of both inductive heater coil 431 and heater coil 441 may be based on a combination of button displacement indicators and plunger displacement indicators.

Figure 6A:
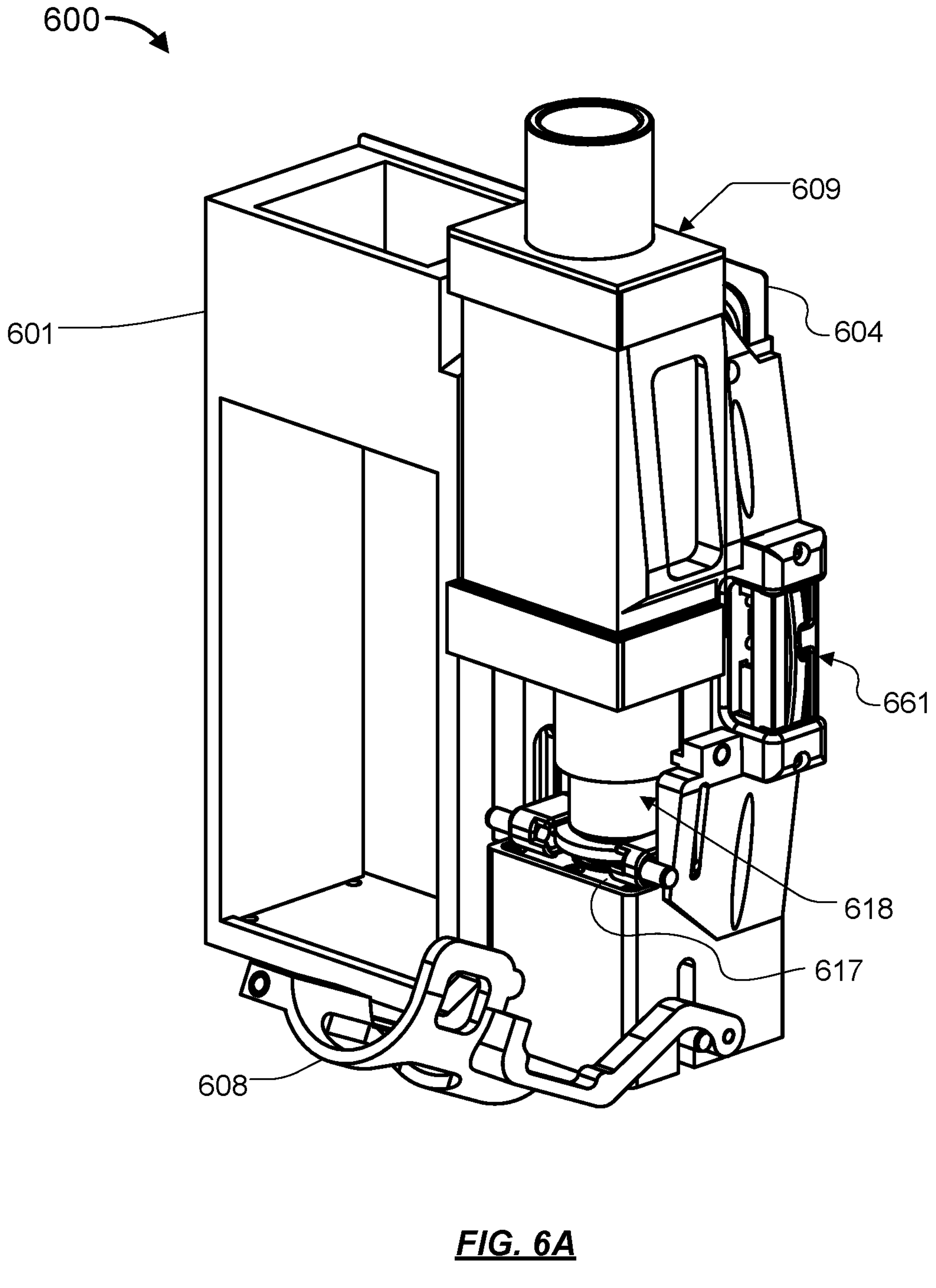
FIGS. 6A-6D illustrate an example personal vaporizing unit.
Figure 6B:
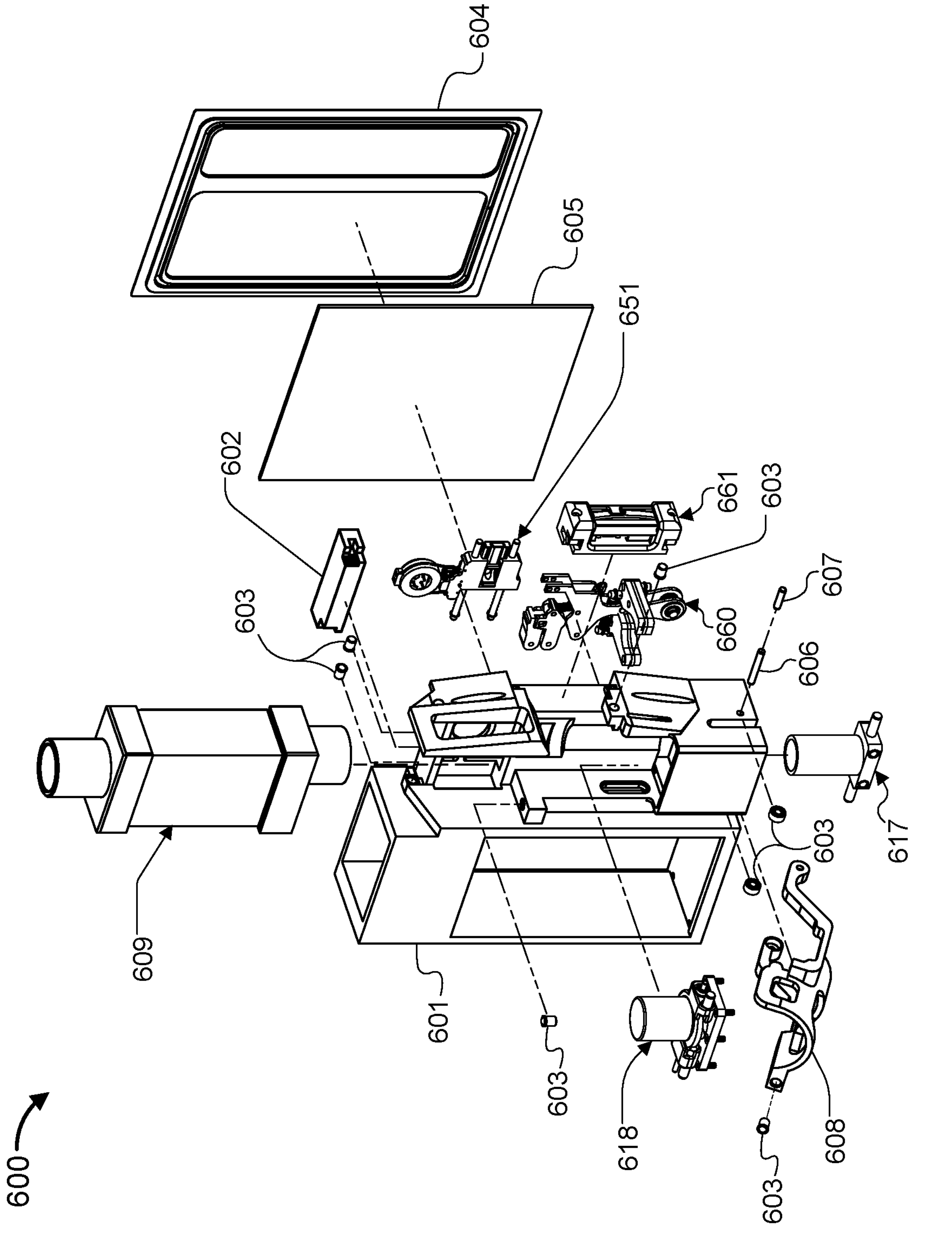
Figure 6C:
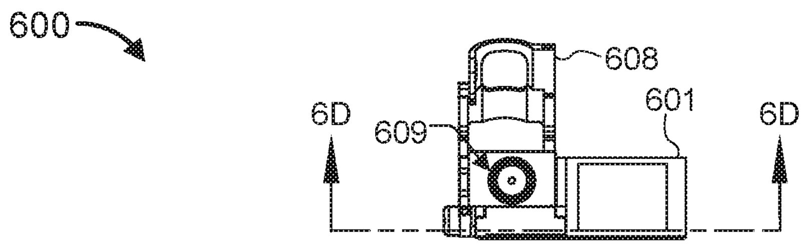
Figure 6D:
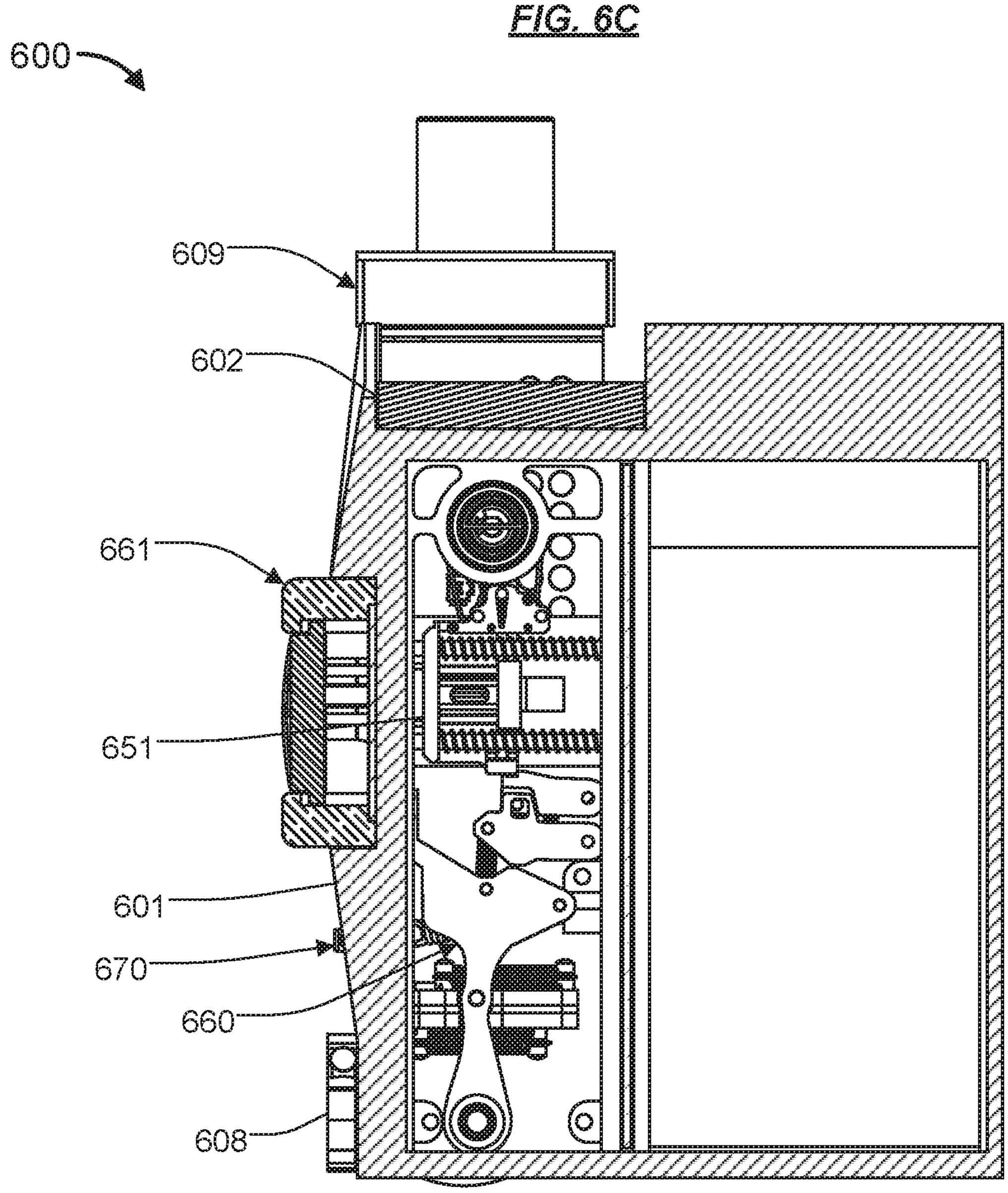

FIGS. 6A-6D illustrate an example personal vaporizing unit. FIG. 6A is an isometric view of the example personal vaporizing unit (PVU). FIG. 6B is an exploded view of the PVU. FIG. 6C is top view of the PVU that also illustrates the cut line of FIG. 6D. FIG. 6D is a cross-section of the PVU along the cutline illustrated in FIG. 6C. In FIG. 6A, the parts of vaporizing unit 600 illustrated include housing 601, window main frame 604, cartridge 609, spring assembly 617, and activation button assembly 661. In FIG. 6B, the parts of vaporizing unit 600 illustrated include housing 601, button lock 602, spring plunger 603, window main frame 604, window 605, pin 606, pin 607, spring plunger retractor 608, cartridge 609, spring assembly 617, piston assembly 618, power and airflow control 651, brake system 660, and activation button assembly 661. In FIG. 6C, the parts of vaporizing unit 600 illustrated include housing 601, spring plunger retractor 608 and cartridge 609. In FIG. 6D, the parts of vaporizing unit 600 illustrated include housing 601, button lock 602, spring plunger retractor 608, cartridge 609, power and airflow control 651, brake system 660, activation button assembly 661, syringe plunger assembly 670, and spring plunger assembly 680.

Figure 7A:
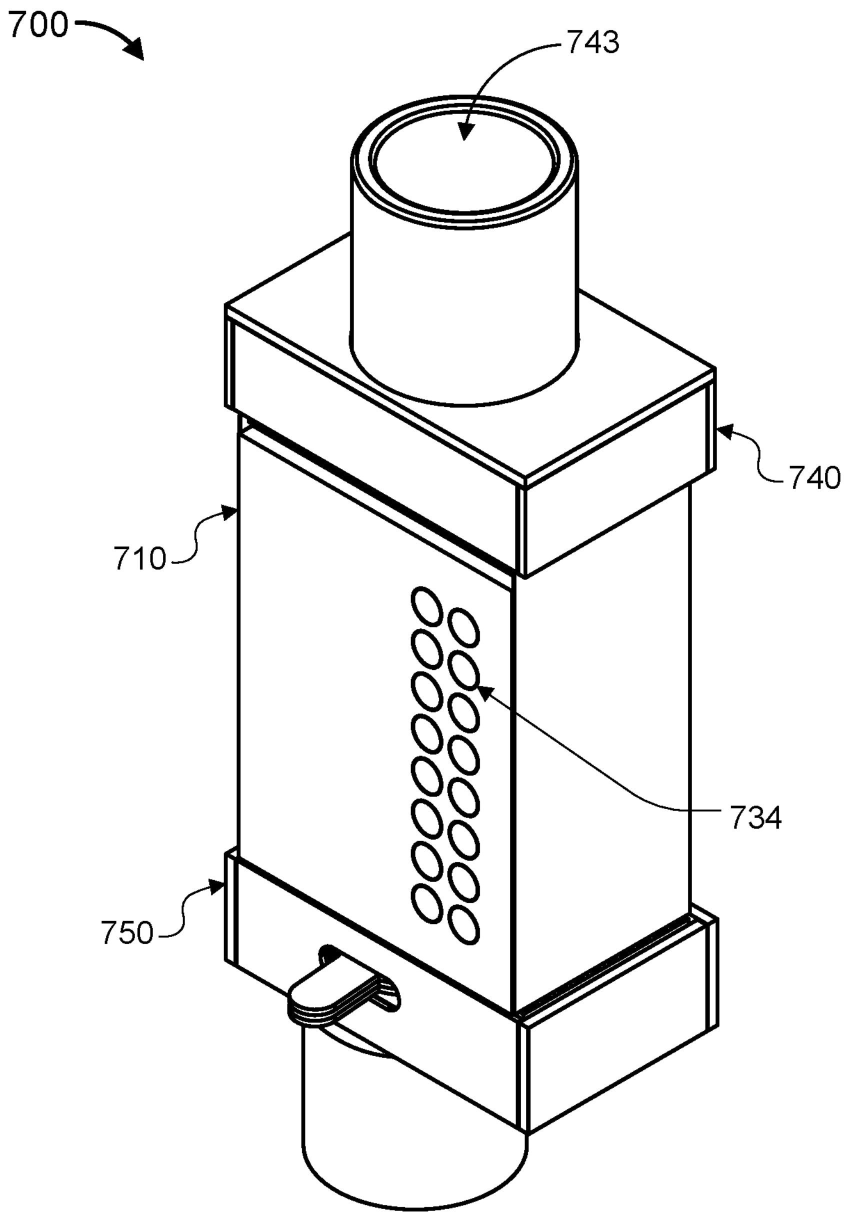
FIGS. 7A-7H illustrate an example cartridge assembly for a personal vaporizing unit.
Figure 7B:
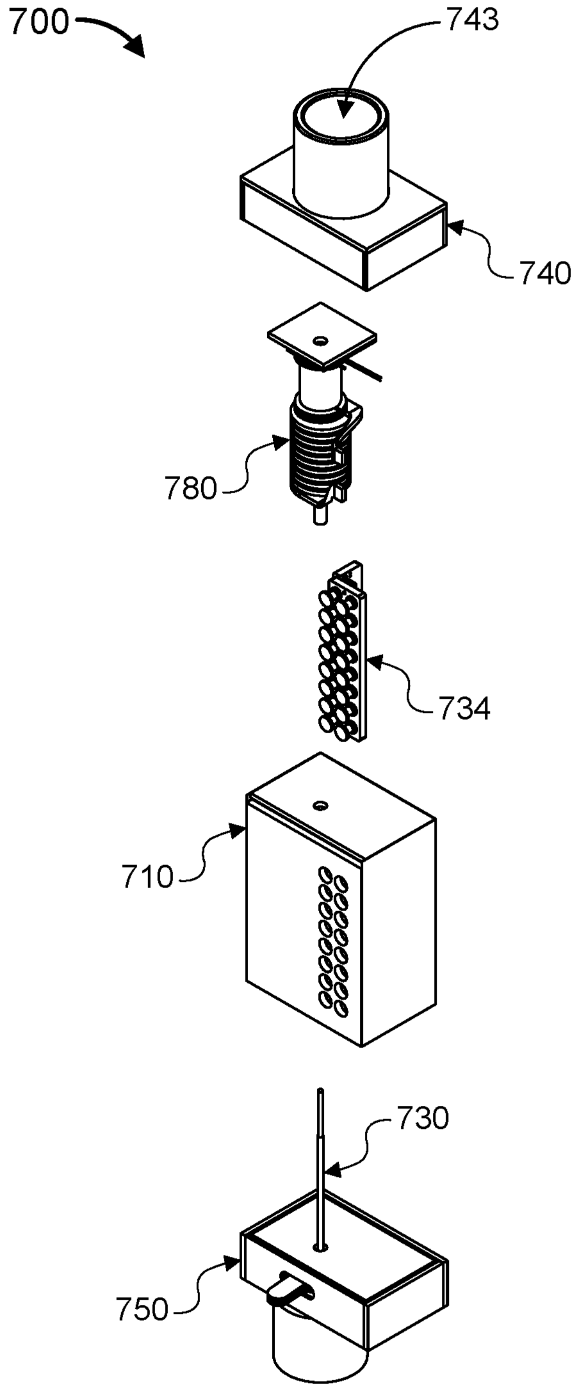
Figure 7C:
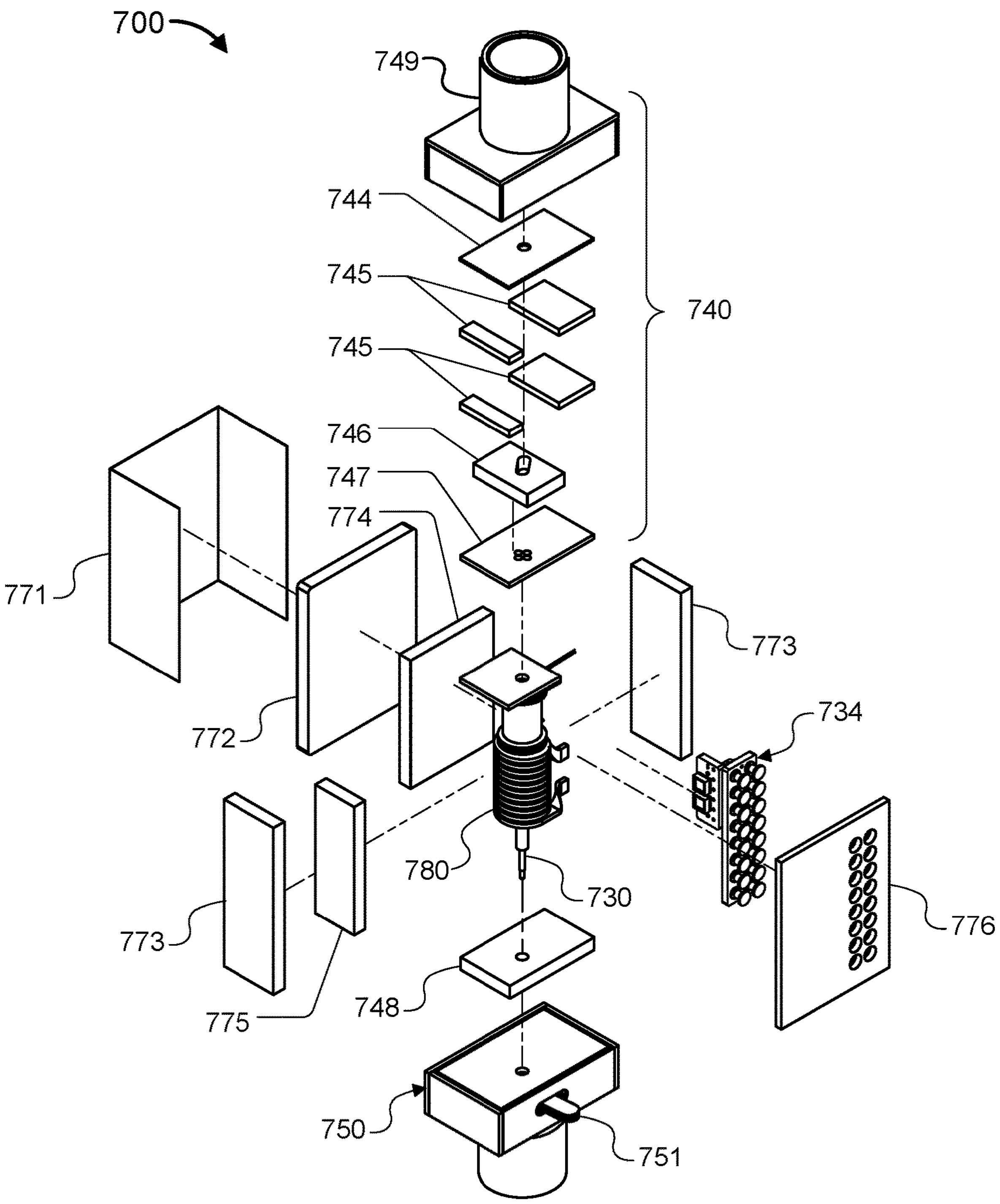
Figure 7D:
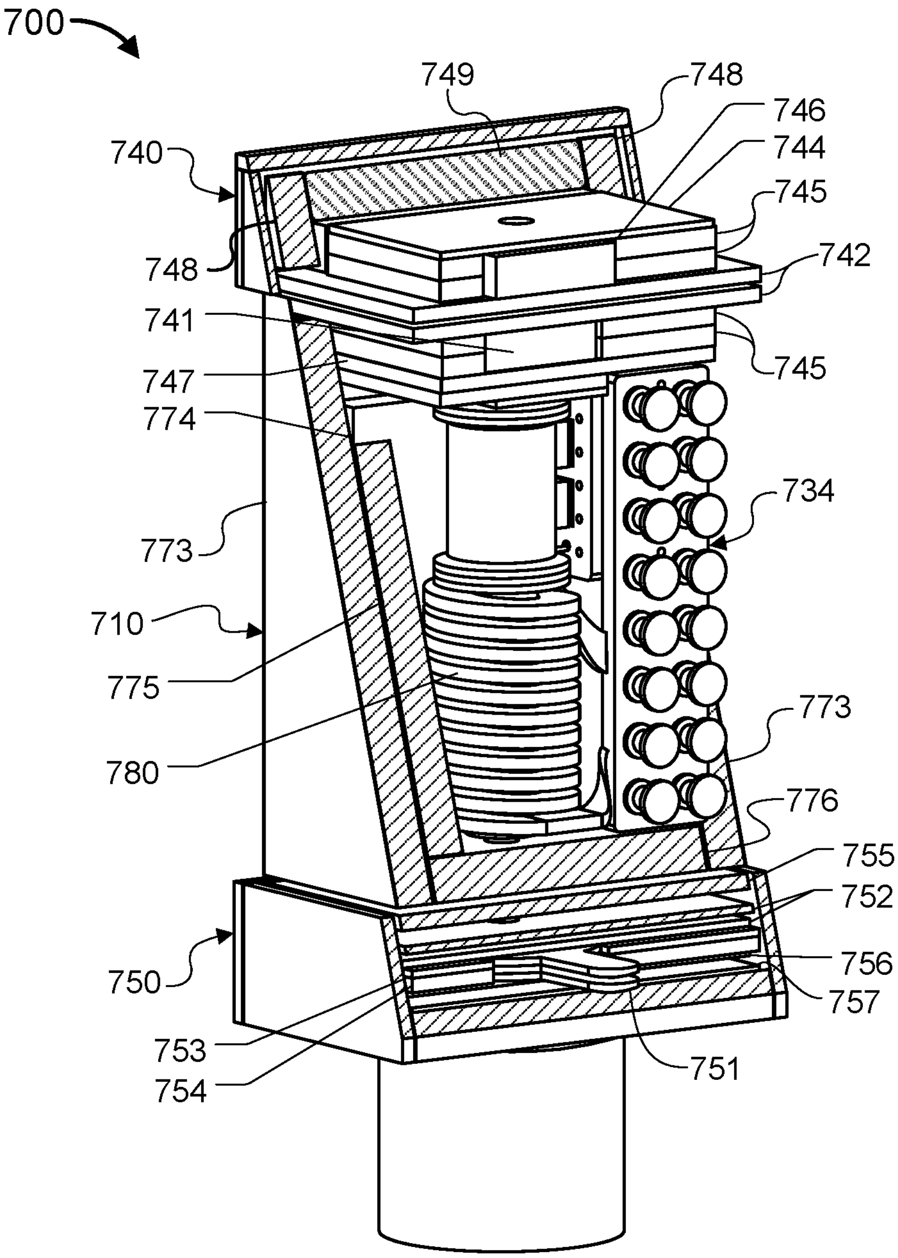
Figure 7E:
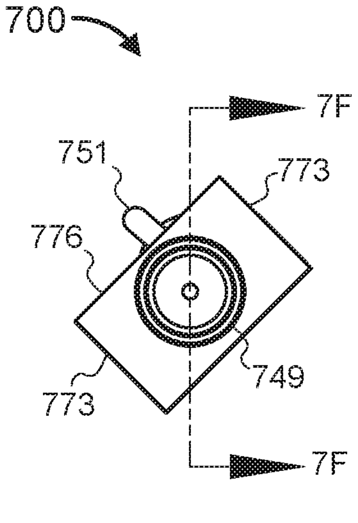
Figure 7F:
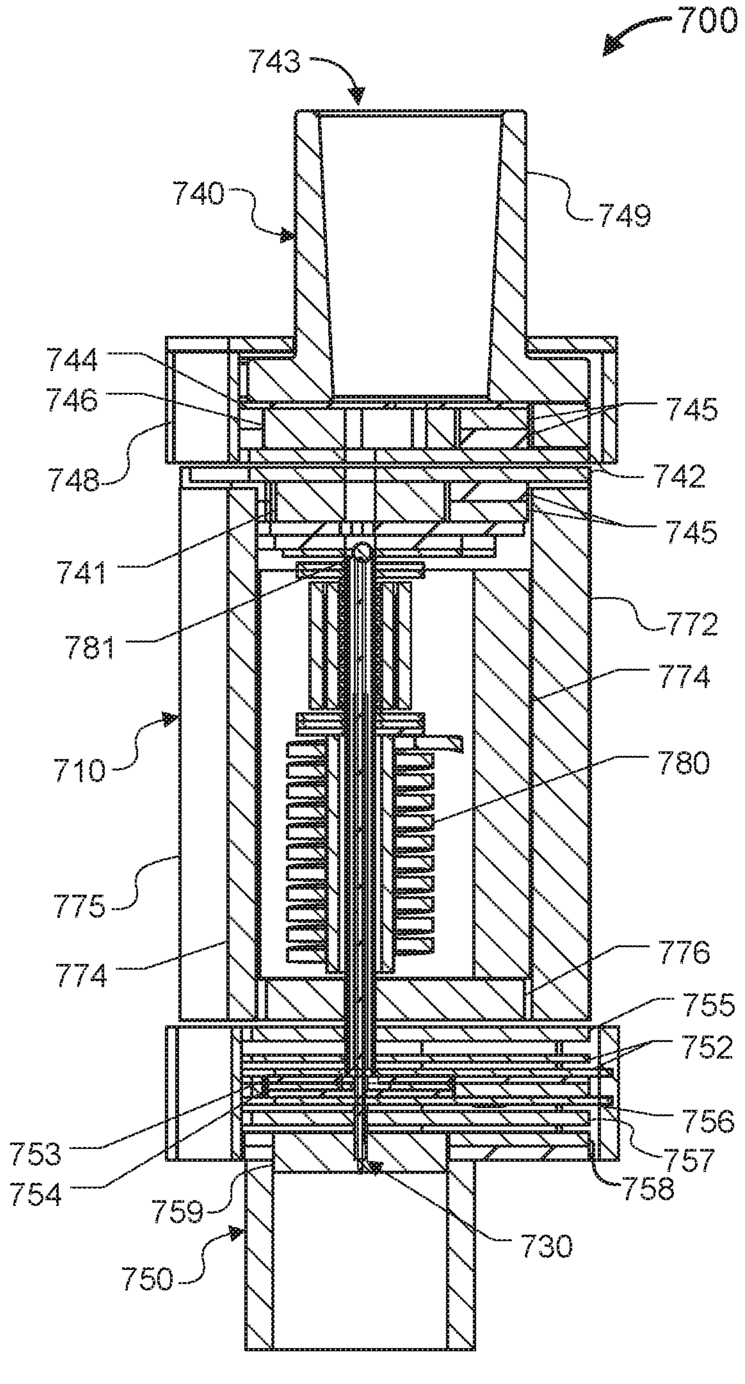
Figure 7G:
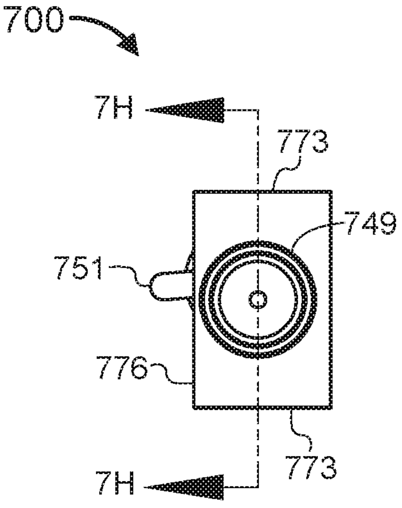
Figure 7H:
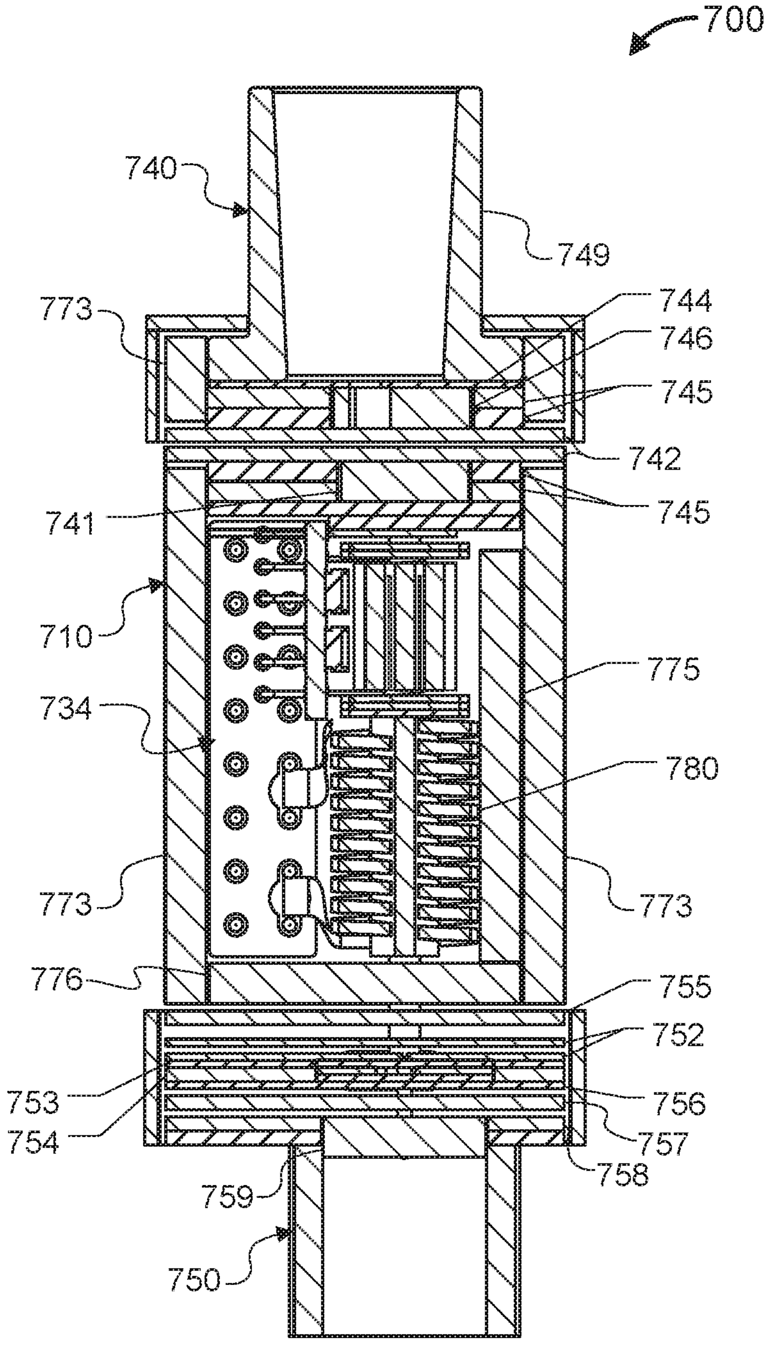

FIGS. 7A-7H illustrate an example cartridge assembly for a personal vaporizing unit. Cartridge 700 may be an example of cartridge 609 illustrated in FIGS. 6A-6D. FIG. 7A is an isometric view of a cartridge 700. FIG. 7B is a first exploded view of cartridge 700. FIG. 7C is a further exploded view of cartridge 700. FIG. 7D is a section view of cartridge 700. FIG. 7E is top view of cartridge 700 that also illustrates the cut line of FIG. 7F. FIG. 7F is a cross-section of cartridge along the cutline illustrated in FIG. 7E. FIG. 7G is top view of cartridge 700 that also illustrates the cut line of FIG. 7H. FIG. 7H is a cross-section of cartridge along the cutline illustrated in FIG. 7G.

In FIG. 7A, the parts of cartridge 700 illustrated include reservoir 710, printed circuit board (PCB) assembly 734, low pressure chamber 740, vapor exit 743, and flow control 751. In FIG. 7B, the parts of cartridge 700 illustrated include reservoir 710, inductive target 730, PCB assembly 734, low pressure chamber 740, vapor exit 743, flow control assembly 750, and coils and sensor assembly 780. In FIG. 7C, the parts of cartridge 700 illustrated include inductive target 730, PCB assembly 734, ISO floor 744, magnet 745, top panel 746, heating core stop 747, ground glass joint 749, flow control assembly 750, flow control 751, UV blocking film 771, window 772, side panel 773, vertical support 774, vertical support 775, back panel 776, and coils and sensor assembly 780. In FIG. 7D, the parts of cartridge 700 illustrated include reservoir 710, PCB assembly 734, low pressure chamber 740, flow deflector 741, top glass 742, ISO floor 744, magnet 745, top panel 746, heating core stop 747, back panel 776, ground glass joint 749, flow control assembly 750, flow control 751, upper flow capture 752, upper middle frame 753, middle frame 754, airflow top surface 755, lower flow capture 756, bottom mounting surface 757, side panel 773, vertical support 774, vertical support 775, floor 748, and coils and sensor assembly 780. In FIG. 7E, the parts of cartridge 700 illustrated include ground glass joint 749, flow control 751, side panel 773, and back panel 776. In FIG. 7F, the parts of cartridge 700 illustrated include reservoir 710, inductive target 730, low pressure chamber 740, flow deflector 741, top glass 742, iso floor 744, magnet 745, top panel 746, back panel 776, ground glass joint 749, flow control assembly 750, upper flow capture 752, upper middle frame 753, middle frame 754, airflow top surface 755, lower flow capture 756, bottom mounting surface 757, lower frame 758, insertion flow feature 759, vertical support 774, vertical support 775, floor 748, coils and sensor assembly 780, and thermistor 781. In FIG. 7G, the parts of cartridge 700 illustrated include ground glass joint 749, flow control 751, side panel 773, and, back panel 776. In FIG. 7H, the parts of cartridge 700 illustrated include reservoir 710, PCB assembly 734, low pressure chamber 740, flow deflector 741, top glass 742, iso floor 744, magnet 745, top panel 746, ground glass joint 749, flow control assembly 750, upper flow capture 752, upper middle frame 753, middle frame 754, airflow top surface 755, lower flow capture 756, bottom mounting surface 757, lower frame 758, insertion flow feature 759, side panel 773, vertical support 775, floor 748, and coils and sensor assembly 780.

Figure 8A:
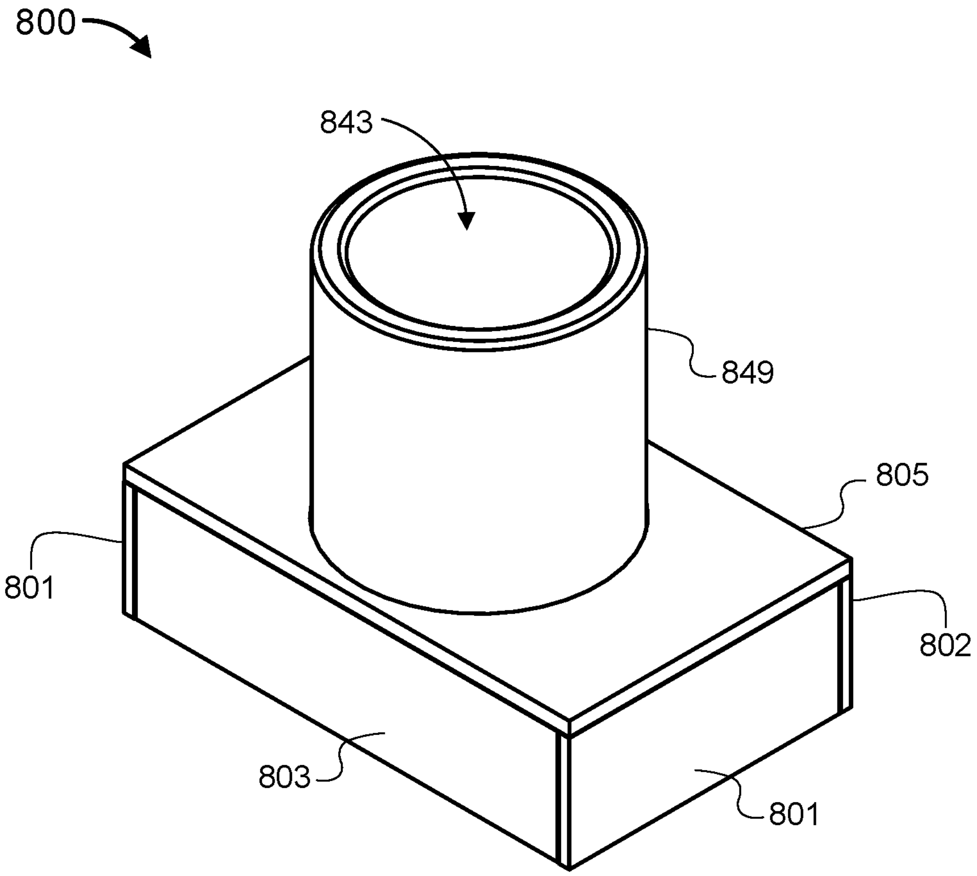
FIGS. 8A-8D illustrate an example low pressure chamber for a personal vaporizing unit.
Figure 8B:
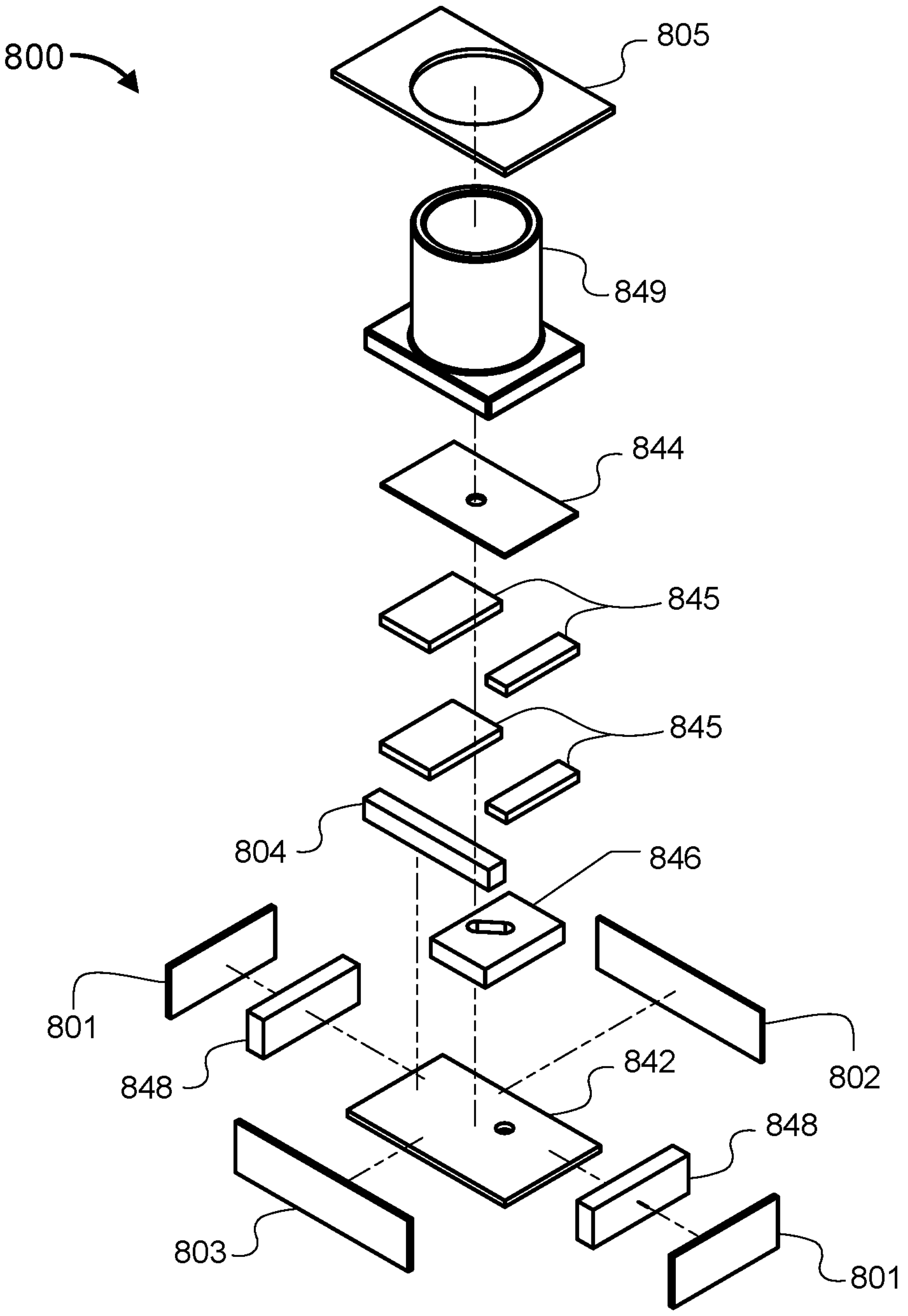
Figure 8C:
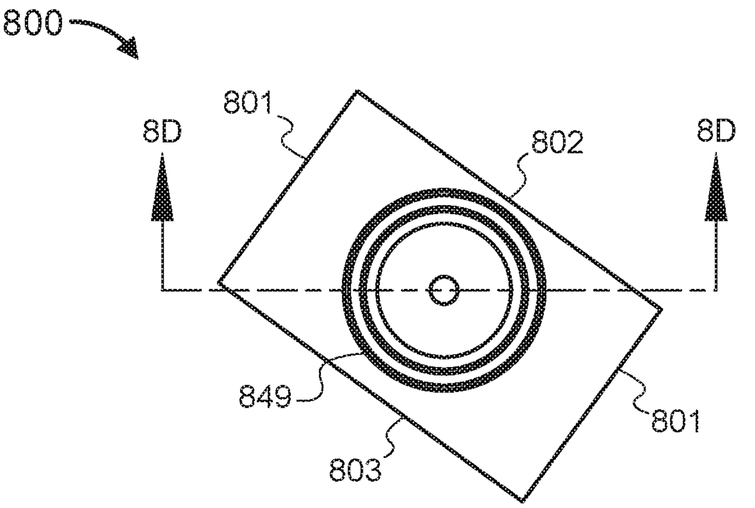
Figure 8D:
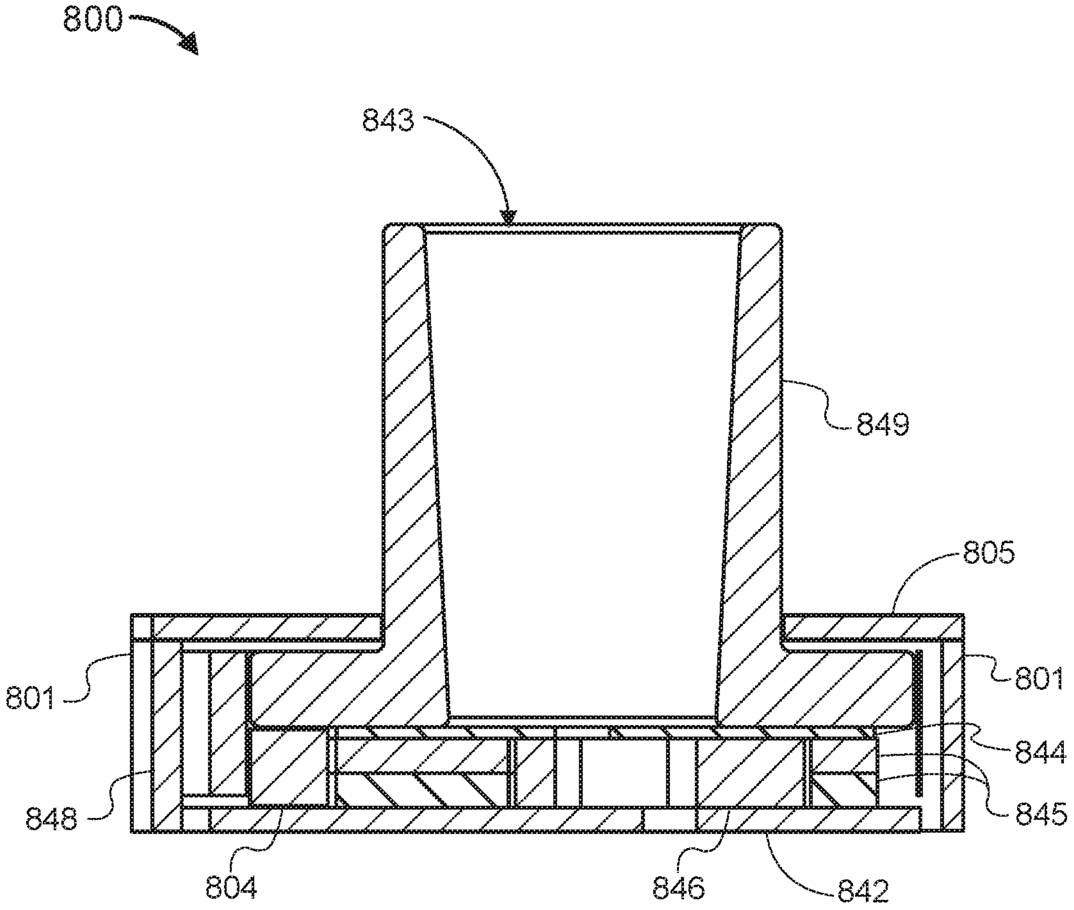

FIG. 8A-8D illustrate an example low pressure chamber for a personal vaporizing unit. Low pressure chamber 800 may be an example of low pressure chamber 740. FIG. 8A is an isometric view of a low pressure chamber 800. FIG. 8A is an is an exploded view of low pressure chamber 800. FIG. 8C is top view of low pressure chamber 800 that also illustrates the cut line of FIG. 8D. FIG. 8D is a cross-section of low pressure chamber 800 along the cutline illustrated in FIG. 8C.

In FIG. 8A, the parts of low pressure chamber 800 illustrated include side panel 801, back panel 802, front panel 803, cartridge top 805, vapor exit 843, and ground glass joint 849. In FIG. 8B, the parts of low pressure chamber 800 illustrated include side panel 801, back panel 802, front panel 803, front glass panel 804, cartridge top 805, top glass 842, iso floor 844, magnet 845, top panel 846, side panel 848, and ground glass joint 849. In FIG. 8C, the parts of low pressure chamber 800 illustrated include side panel 801, back panel 802, front panel 803, and ground glass joint 849. In FIG. 8D, the parts of low pressure chamber 800 illustrated include side panel 801, front glass panel 804, cartridge top 805, top glass 842, vapor exit 843, iso floor 844, magnet 845, side panel 848, and ground glass joint 849.

Figure 9A:
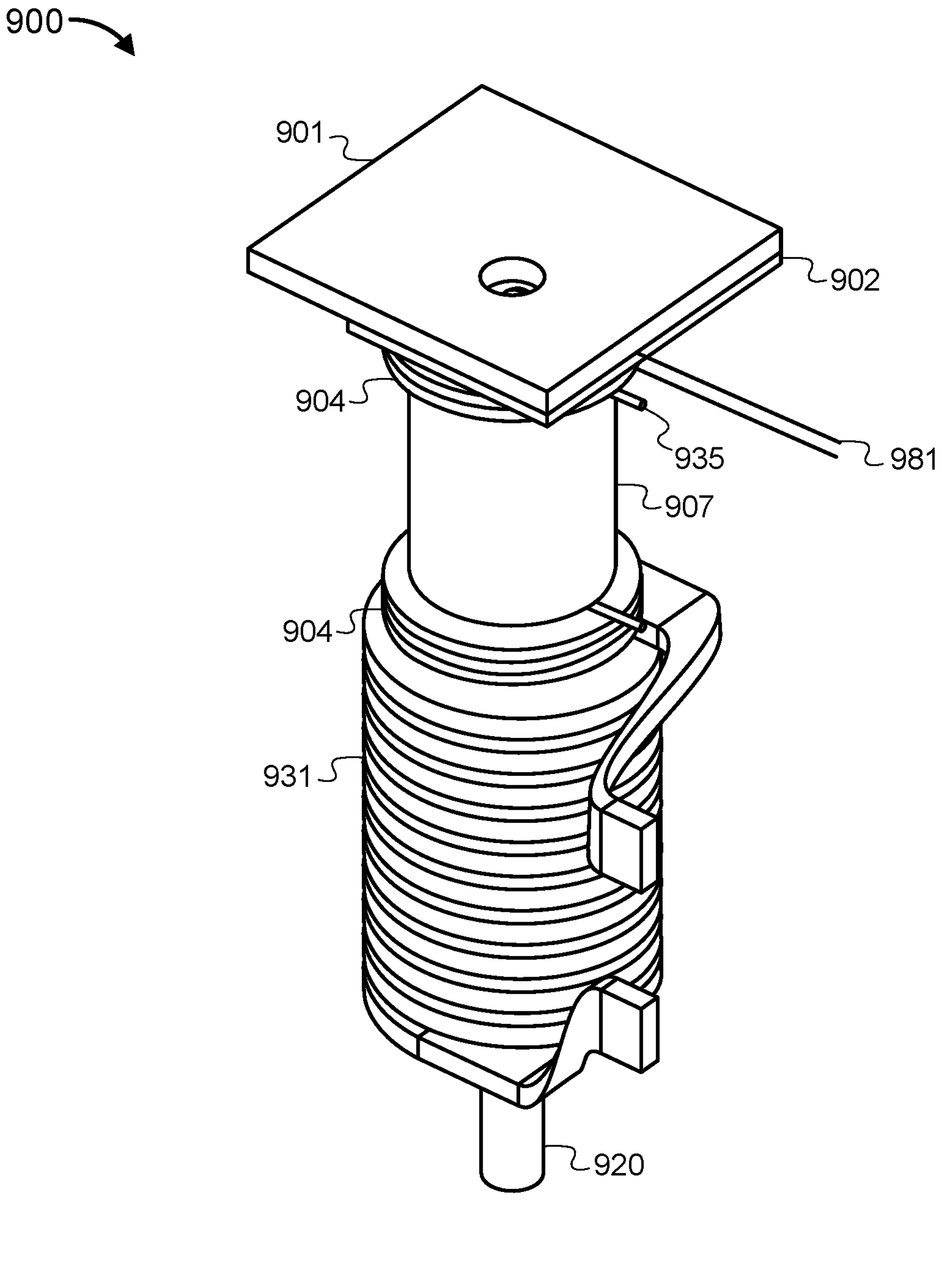
FIGS. 9A-9F illustrate an example coils and sensor assembly for a personal vaporizing unit.
Figure 9B:
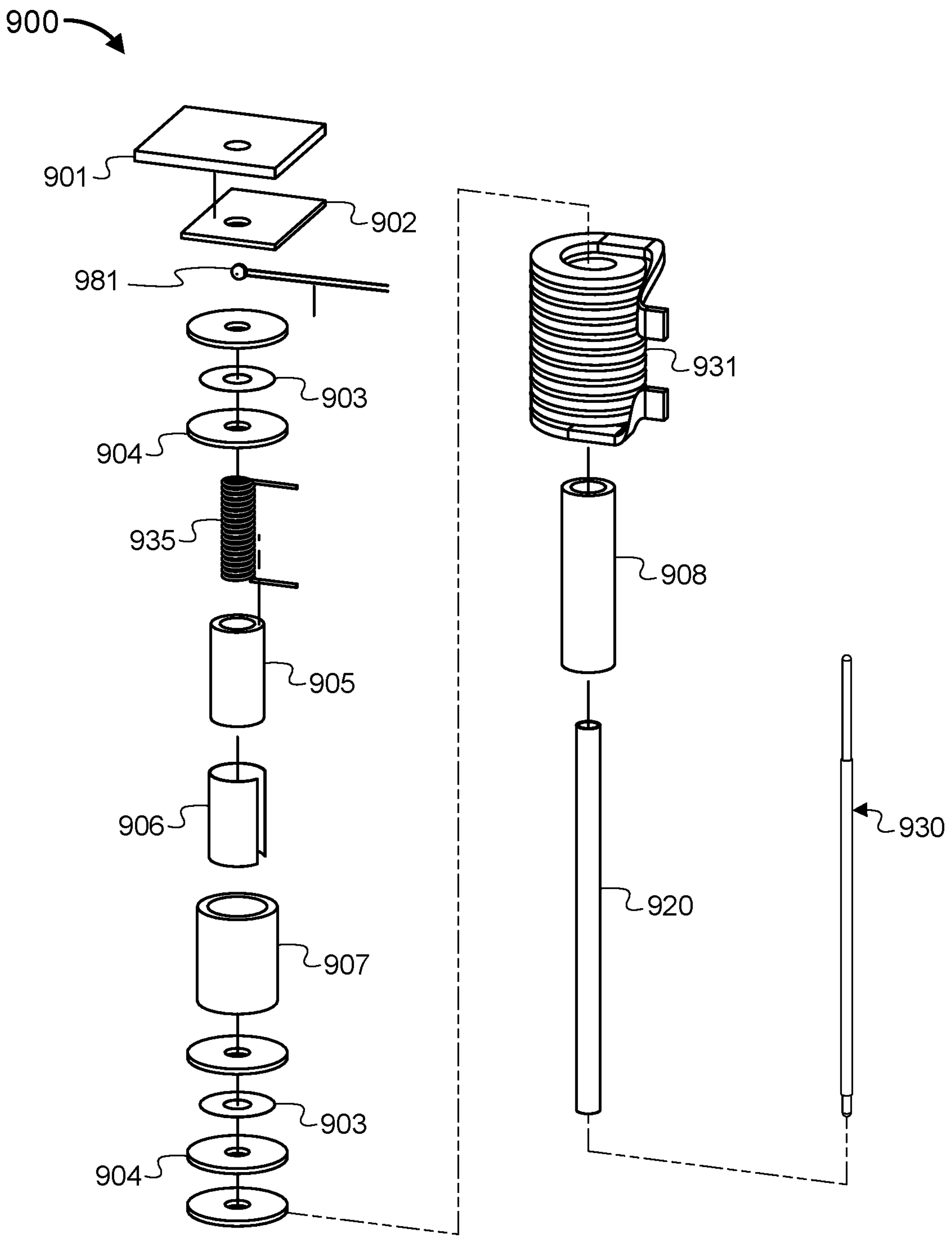
Figure 9C:
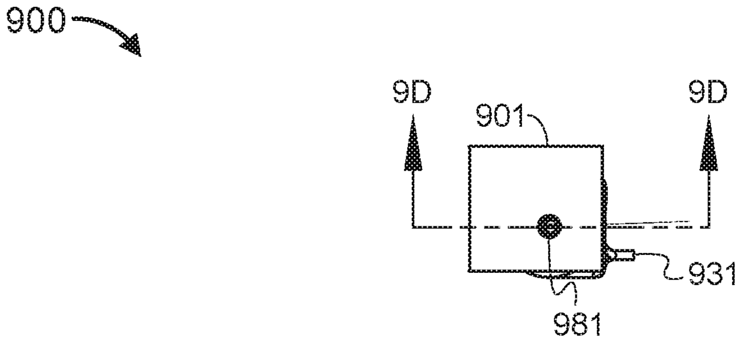
Figure 9D:
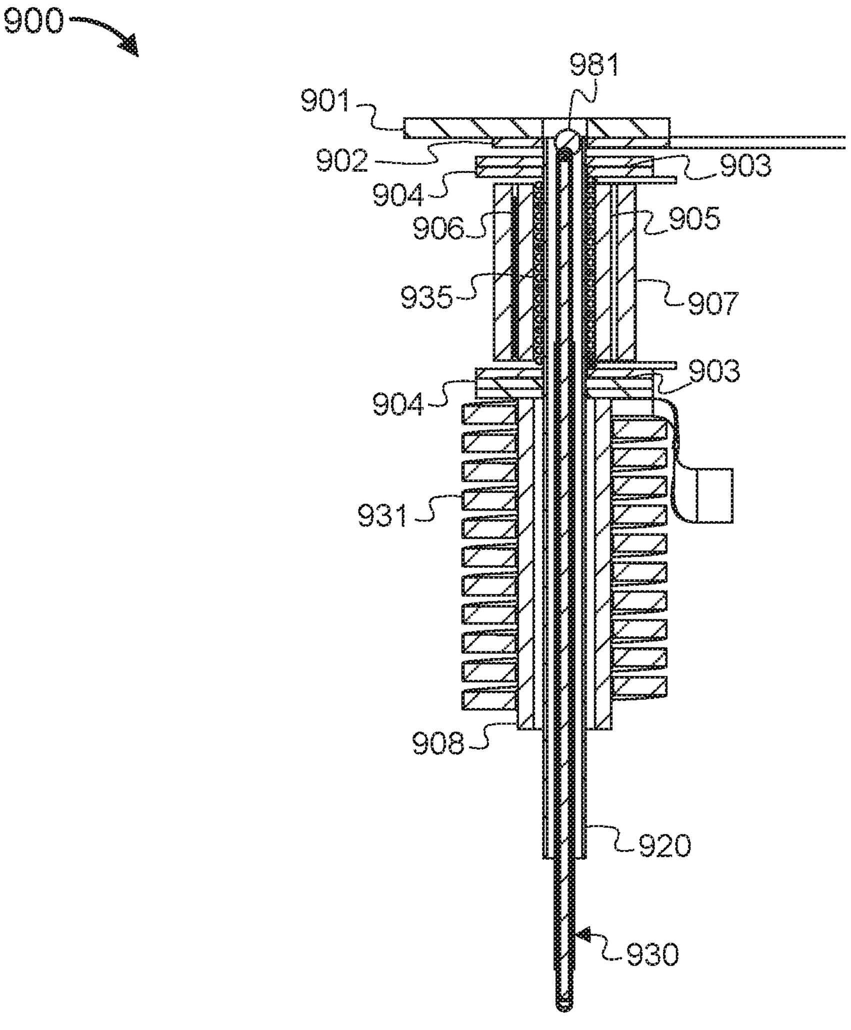
Figure 9E:
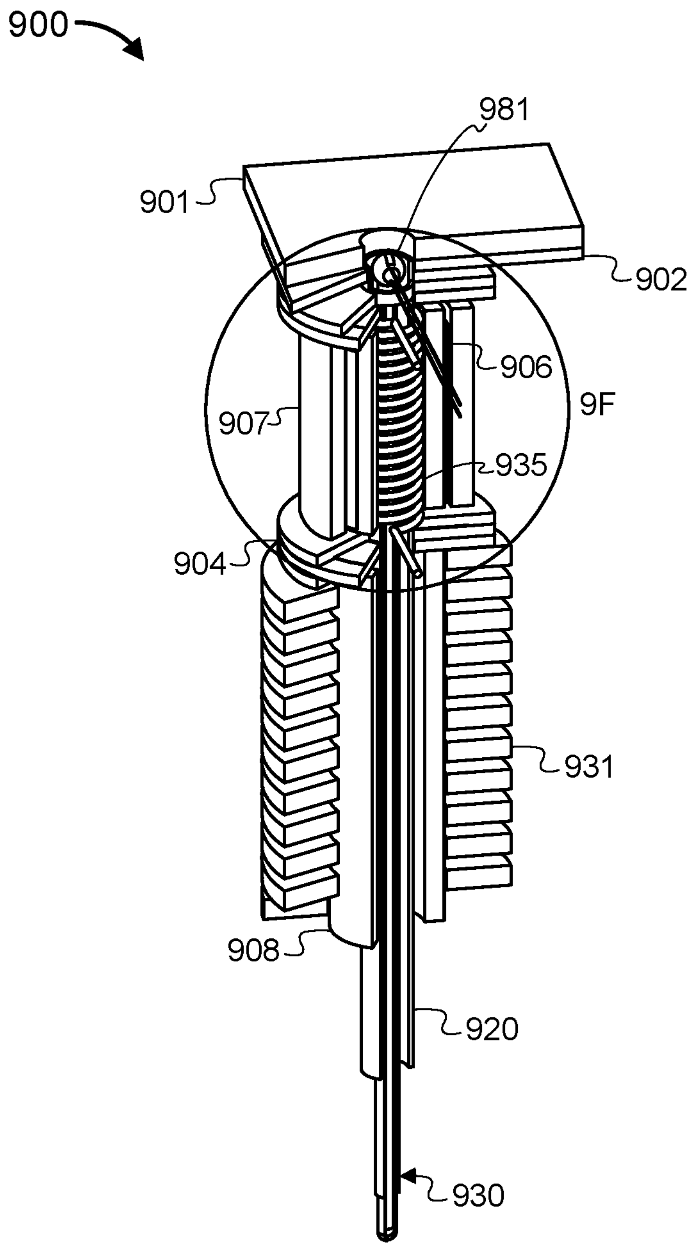
Figure 9F:
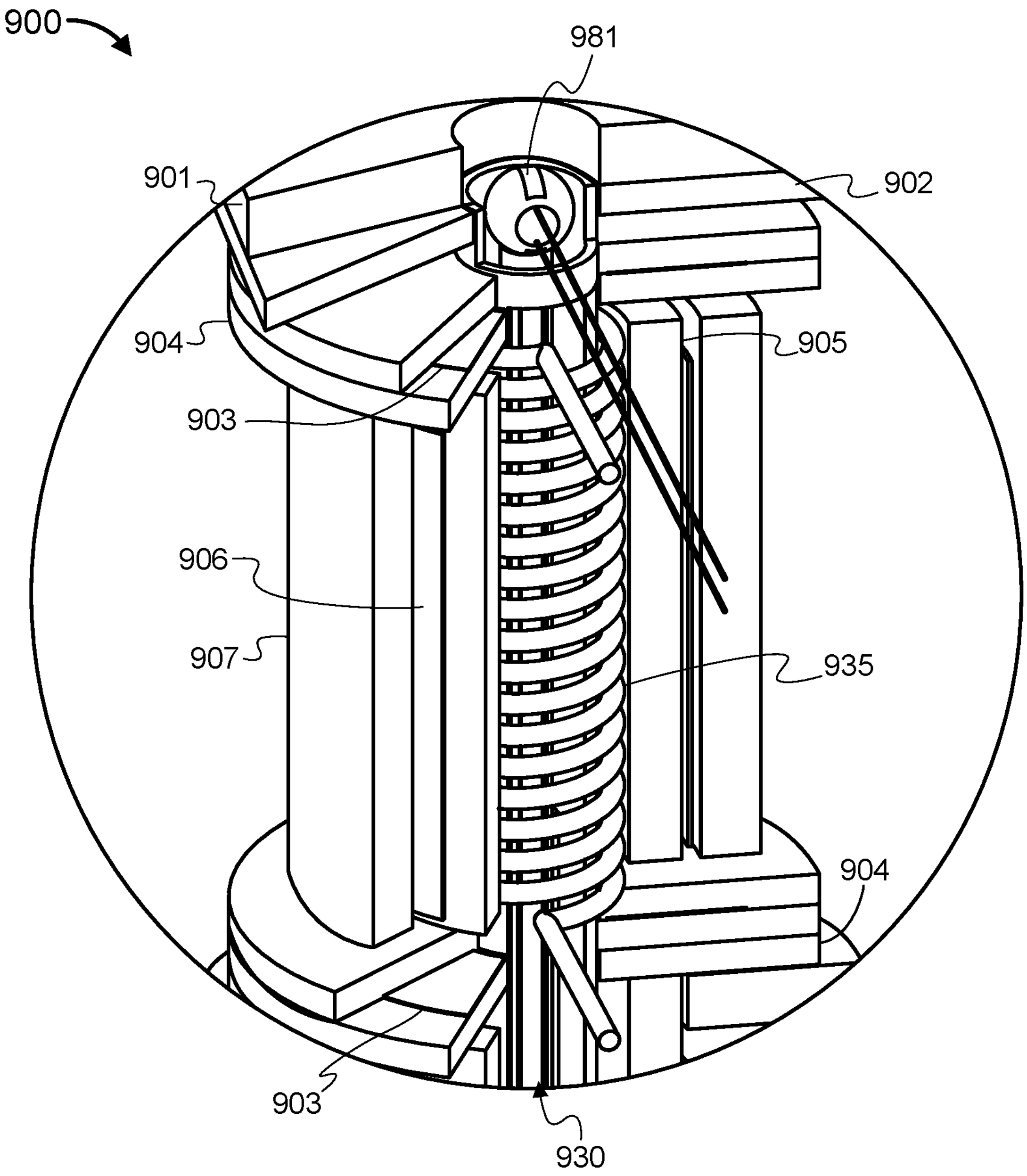

FIG. 9A-9F illustrate an example coils and sensor assembly for a personal vaporizing unit. Coils and sensor assembly 900 may be an example of coils and sensor assembly 780 illustrated in FIGS. 7A-7H. FIG. 9A is an isometric view of a coils and sensor assembly 900. FIG. 9B is an exploded view of coils and sensor assembly 900. FIG. 9C is top view of coils and sensor assembly 900 that also illustrates the cut line of FIG. 9D. FIG. 9E is a cutaway view of coils and sensor assembly 900. FIG. 9F is a detail view of a portion of coils and sensor assembly 900.

In FIG. 9A, the parts of coils and sensor assembly 900 illustrated include temp sensor floor 901, sensor support 902, upper IR reflector 904, glass cylinder 907, capillary tube 920, inductive heater coil 931, resistive heating element 935, and thermistor 981. In FIG. 9B, the parts of coils and sensor assembly 900 illustrated include temp sensor floor 901, sensor support 902, foil IR reflector 903, upper IR reflector 904, glass cylinder 905, foil cylinder 906, glass cylinder 907, work coil support 908, capillary tube 920, inductive target 930, inductive heater coil 931, resistive heating element 935, and thermistor 981. In FIG. 9C, the parts of coils and sensor assembly 900 illustrated include temp sensor floor 901, inductive heater coil 931, and thermistor 981. In FIG. 9D, the parts of coils and sensor assembly 900 illustrated include temp sensor floor 901, sensor support 902, foil IR reflector 903, upper IR reflector 904, glass cylinder 905, foil cylinder 906, glass cylinder 907, work coil support 908, capillary tube 920, inductive target 930, inductive heater coil 931, resistive heating element 935, and thermistor 981. In FIG. 9E, the parts of coils and sensor assembly 900 illustrated include temp sensor floor 901, sensor support 902, foil cylinder 906, glass cylinder 907, work coil support 908, capillary tube 920, inductive target 930, inductive heater coil 931, resistive heating element 935, and thermistor 981. In FIG. 9F, the parts of coils and sensor assembly 900 illustrated include temp sensor floor 901, sensor support 902, foil IR reflector 903, upper IR reflector 904, glass cylinder 905, foil cylinder 906, glass cylinder 907, inductive target 930, resistive heating element 935, and thermistor 981.

Figure 10A:
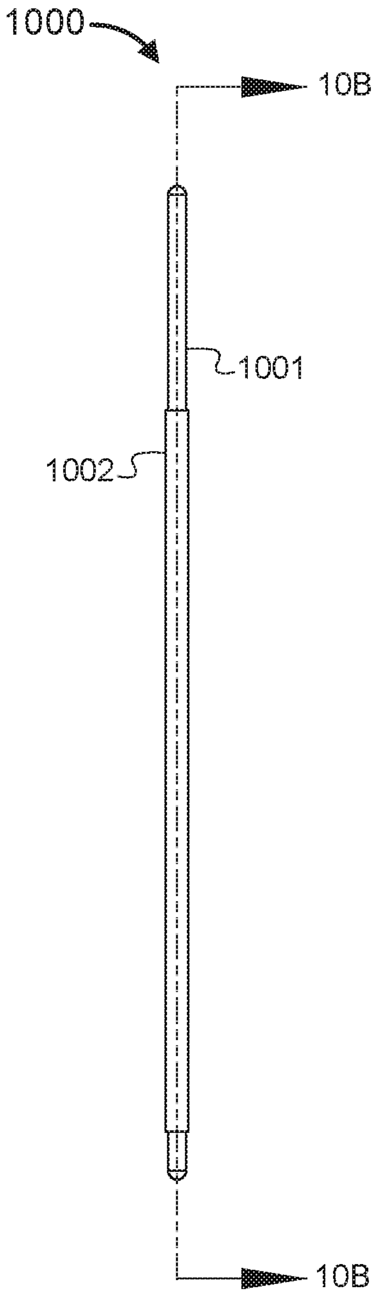
FIGS. 10A-10C illustrate an example inductive target assembly for a personal vaporizing unit.
Figure 10B:
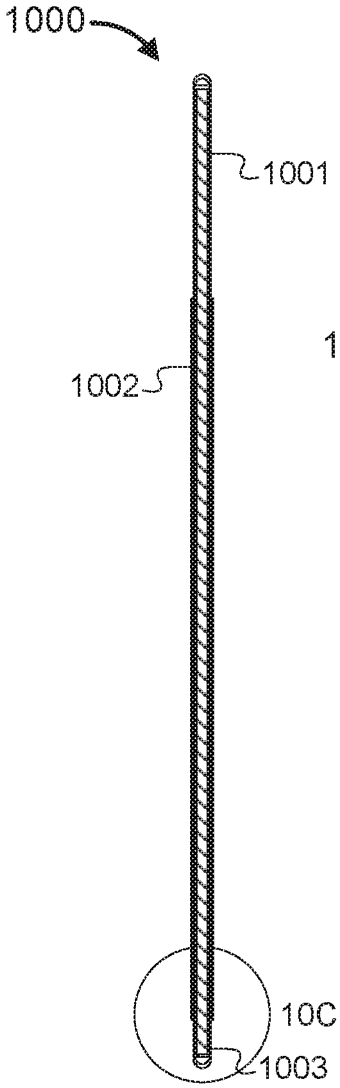
Figure 10C:
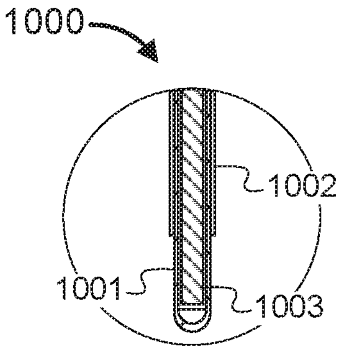

FIG. 10A-10C illustrate an example inductive target assembly for a personal vaporizing unit. Inductive target assembly 1000 may be an example of inductive target 930 illustrated in FIGS. 9A-9F. FIG. 10A is a side view of an inductive target assembly 1000 that also illustrates the cut line of FIG. 10B. FIG. 10C is a detail view of a portion of inductive target assembly 1000.

In FIG. 10A, the parts of inductive target assembly 1000 illustrated include inner quartz tube 1001, and outer quartz tube 1002. In FIG. 10B, the parts of inductive target assembly 1000 illustrated include inner quartz tube 1001, outer quartz tube 1002, and BAW 1003. In FIG. 10C, the parts of inductive target assembly 1000 illustrated include inner quartz tube 1001, outer quartz tube 1002, and BAW 1003. Note that the outer diameter of inner quartz tube 1001 is slightly smaller that the inner diameter of outer quartz tube 1002 so as to form a capillary region.

Figure 11A:
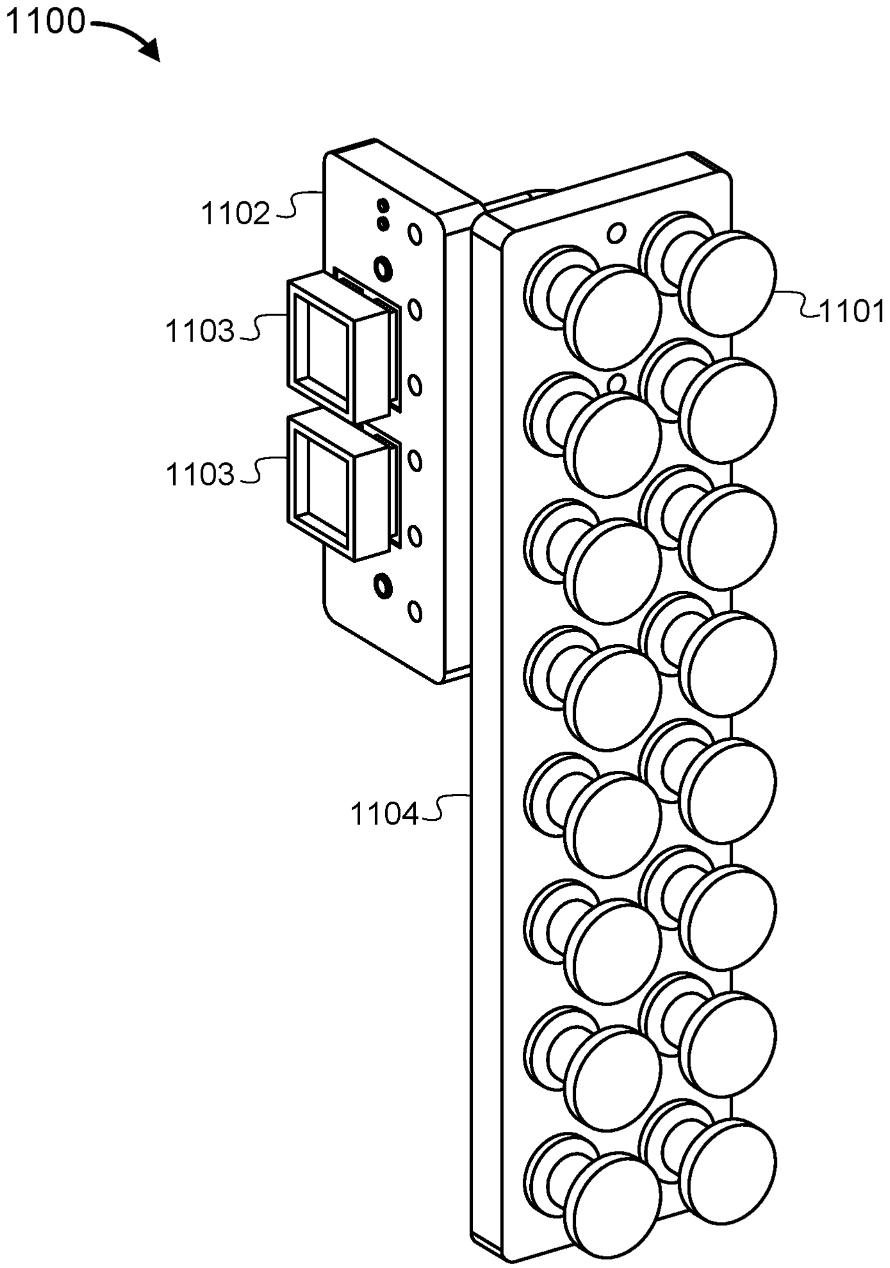
FIGS. 11A-11B illustrate an example PCB assembly for a personal vaporizing unit.
Figure 11B:
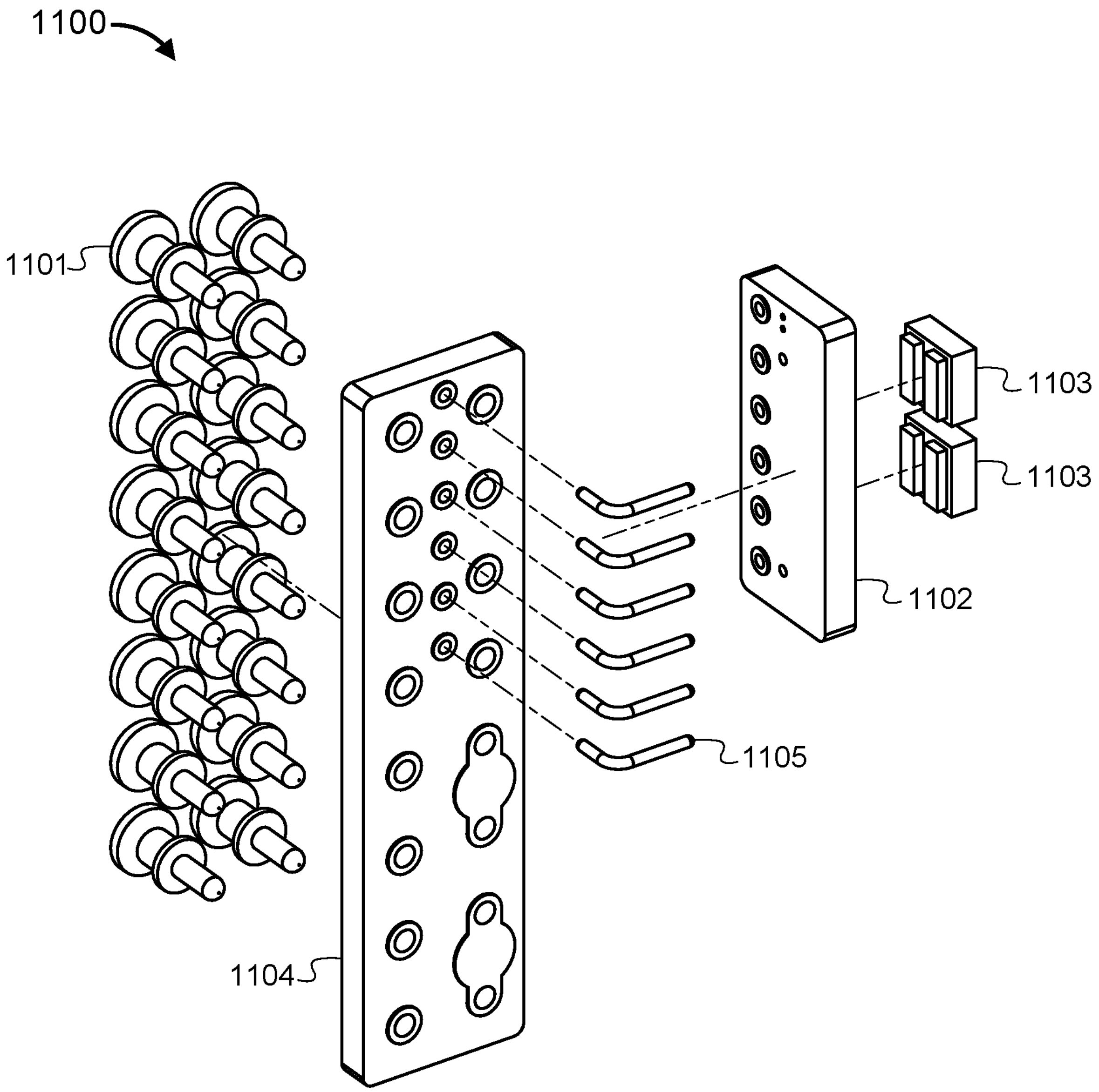

FIGS. 11A-11B illustrate an example PCB assembly for a personal vaporizing unit. PCB assembly 1100 may be an example of PCB assembly 734 illustrated in FIGS. 7A-7H. FIG. 11A is an isometric view of a PCB assembly 1100. FIG. 11B is an exploded view of PCB assembly 1100. PCB assembly 1100 may include a computer and/or microprocessor. PCB assembly 1100 may implement and/or control, for example, alternating current source 132 and/or alternating current source 232.

In FIG. 11A, the parts of PCB assembly 1100 illustrated include contact 1101, UV LED PCB 1102, UVC LED 1103, and PCB 1104. In FIG. 11B, the parts of PCB assembly 1100 illustrated include contact 1101, UV LED PCB 1102, UVC LED 1103, PCB 1104, and electrical coupling 1105.

Figure 12A:
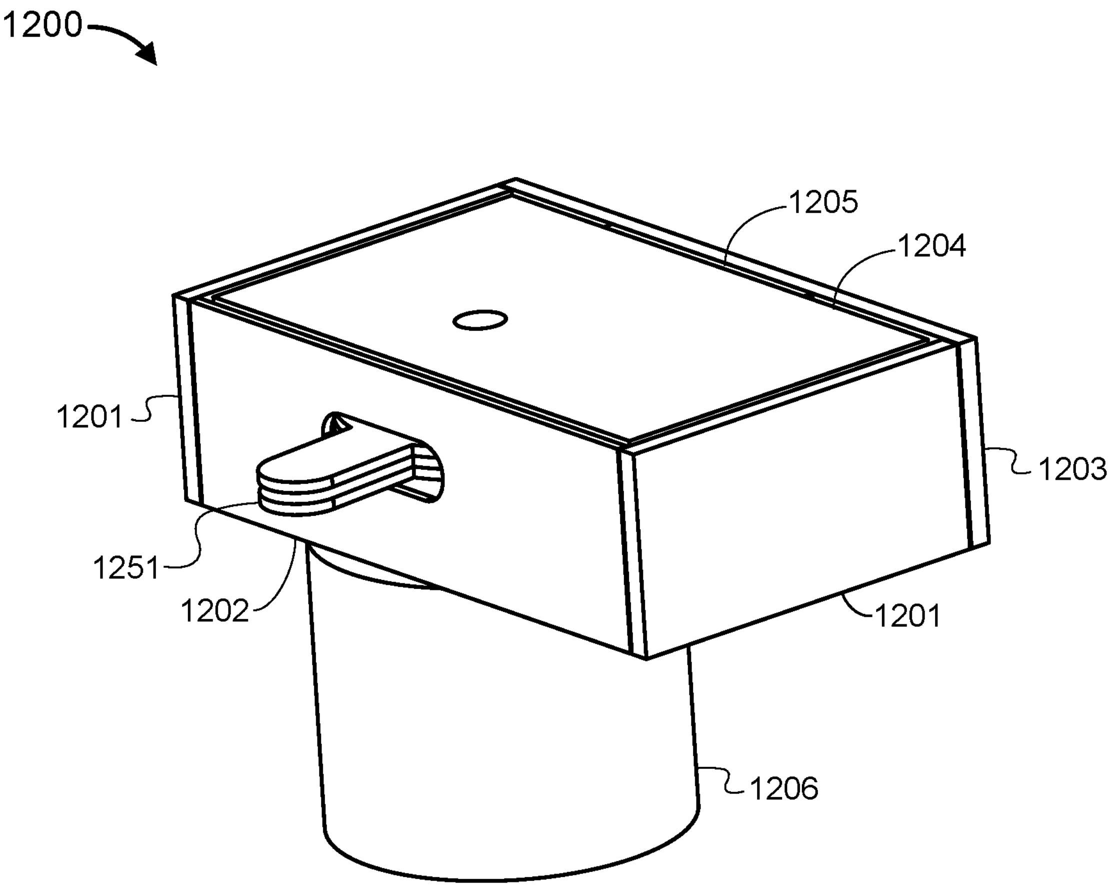
FIGS. 12A-12D illustrate an example flow control assembly for a personal vaporizing unit.
Figure 12B:
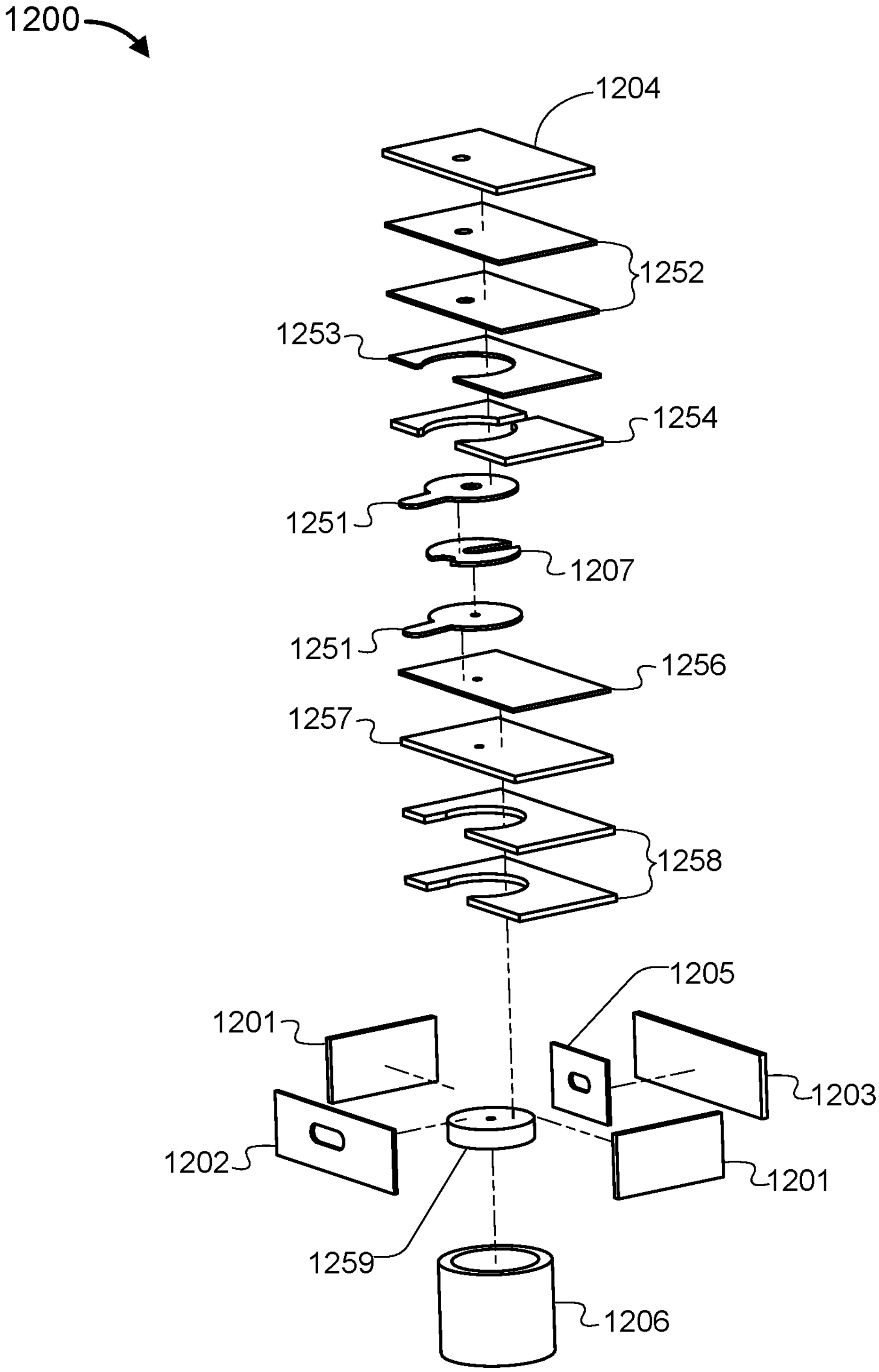
Figure 12C:
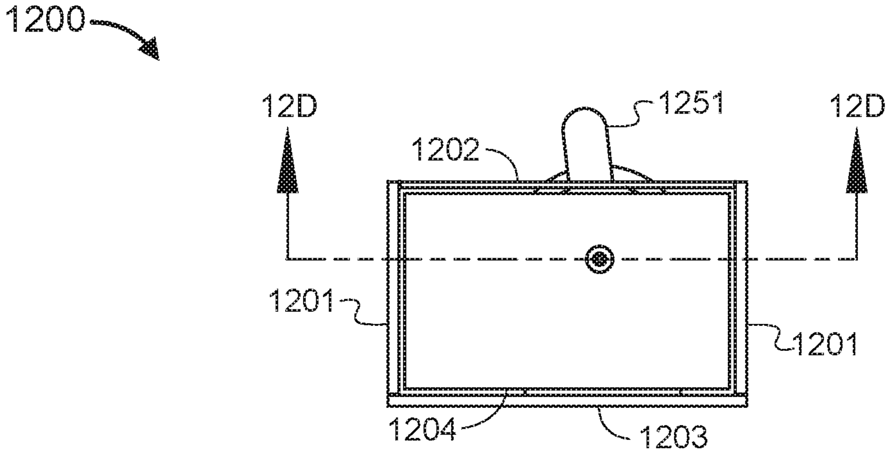
Figure 12D:
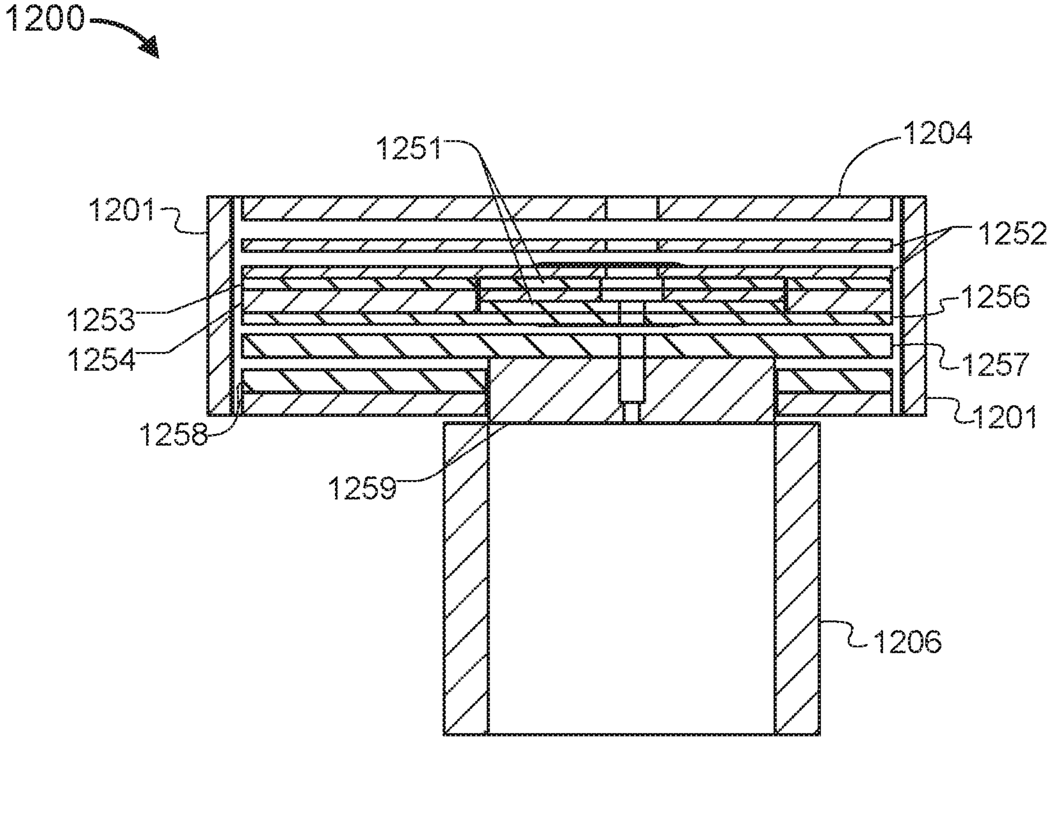

FIG. 12A-12D illustrate an example flow control assembly for a personal vaporizing unit. Flow control assembly 1200 may be an example of flow control assembly 750. FIG. 12A is an isometric view of a flow control assembly 1200. FIG. 12B is an is an exploded view of flow control assembly 1200. FIG. 12C is top view of flow control assembly 1200 that also illustrates the cut line of FIG. 12D. FIG. 12D is a cross-section of flow control assembly 1200 along the cutline illustrated in FIG. 12C.

In FIG. 12A, the parts of flow control assembly 1200 illustrated include side panel 1201, back panel 1202, front panel 1203, airflow top surface 1204, intake front window 1205, airflow coupling 1206, and flow control 1251. In FIG. 12B, the parts of flow control assembly 1200 illustrated include side panel 1201, back panel 1202, front panel 1203, airflow top surface 1204, intake front window 1205, airflow coupling 1206, flow disc 1207, flow control 1251, upper flow capture 1252, upper middle frame 1253, middle frame 1254, lower flow capture 1256, bottom mounting surface 1257, lower frame 1258, and insertion flow feature 1259. In FIG. 12C, the parts of flow control assembly 1200 illustrated include side panel 1201, back panel 1202, front panel 1203, airflow top surface 1204, and flow control 1251. In FIG. 12D, the parts of flow control assembly 1200 illustrated include side panel 1201, airflow top surface 1204, airflow coupling 1206, flow control 1251, upper flow capture 1252, upper middle frame 1253, middle frame 1254, lower flow capture 1256, bottom mounting surface 1257, lower frame 1258, and insertion flow feature 1259.

Figure 13A:
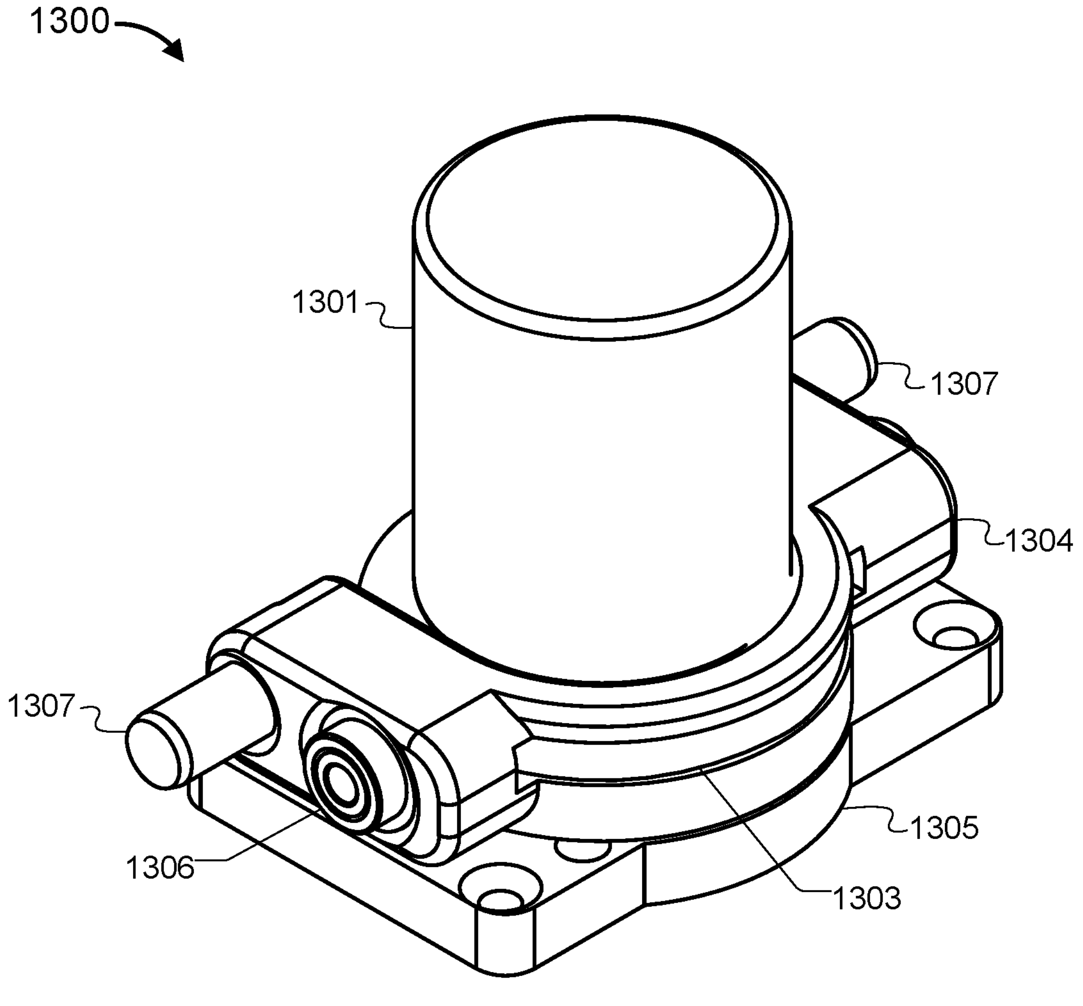
FIGS. 13A-13D illustrate an example syringe plunger assembly for a personal vaporizing unit.
Figure 13B:
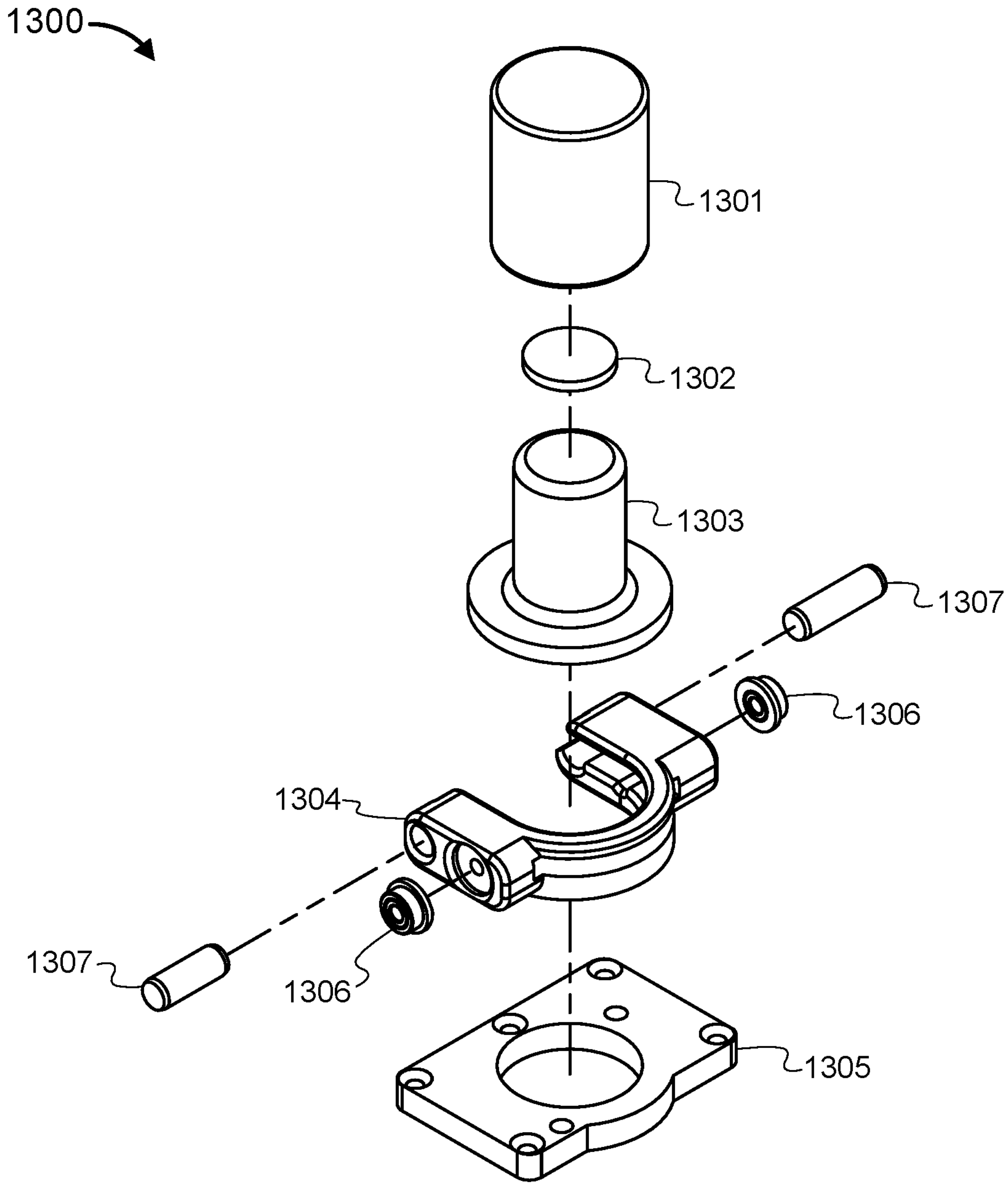
Figure 13C:
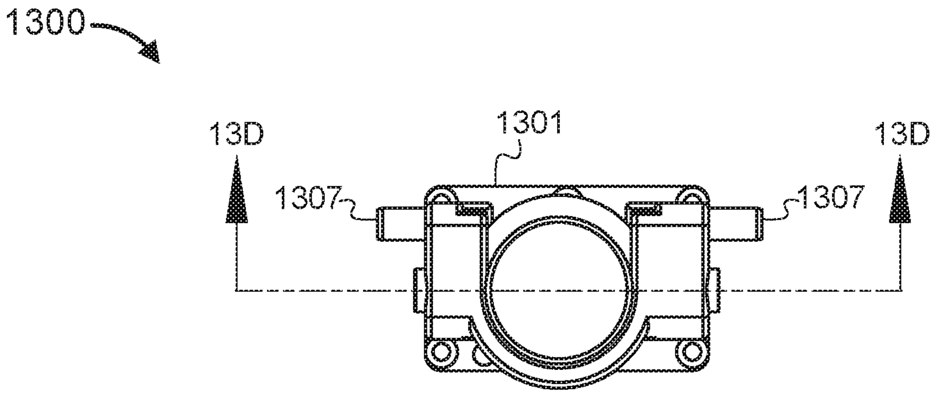
Figure 13D:
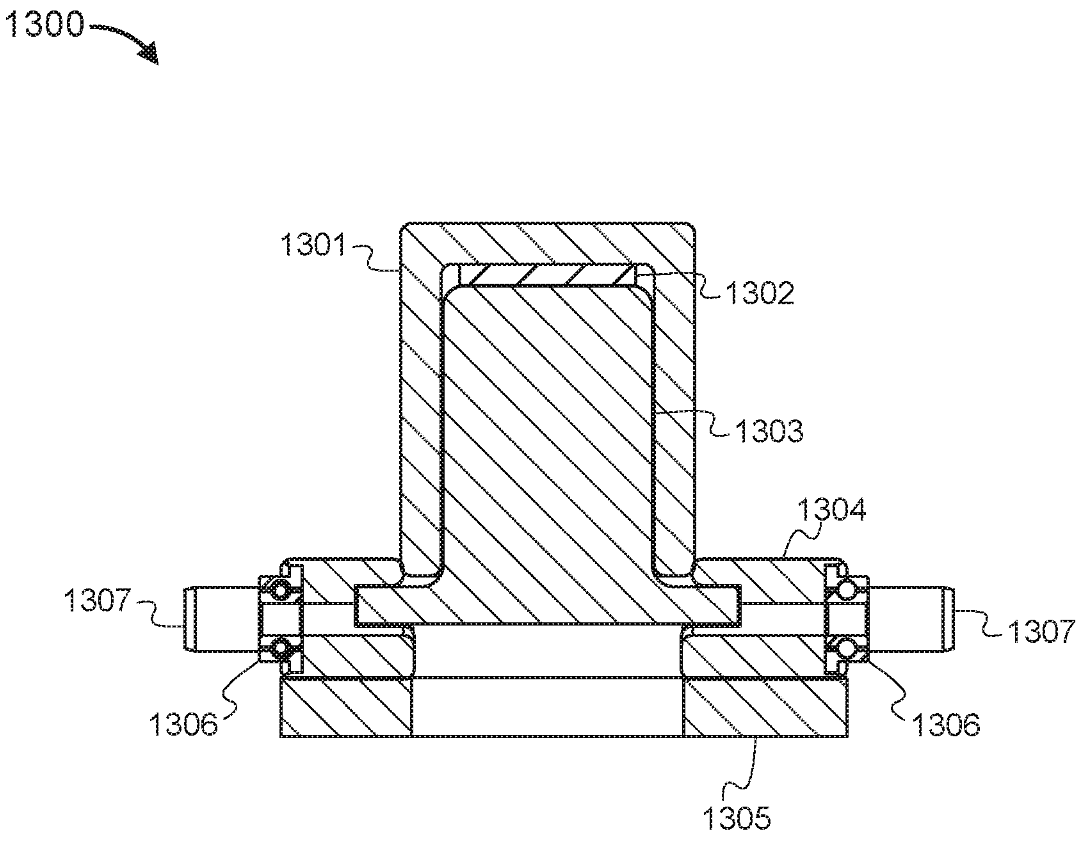

FIGS. 13A-13D illustrate an example syringe plunger assembly for a personal vaporizing unit. Syringe plunger assembly 1300 may be an example of syringe plunger assembly 670. FIG. 13A is an isometric view of a syringe plunger assembly 1300. FIG. 13B is an exploded view of syringe plunger assembly 1300. FIG. 13C is top view of syringe plunger assembly 1300 that also illustrates the cut line of FIG. 13D. FIG. 13D is a cross-section of syringe plunger assembly 1300 along the cutline illustrated in FIG. 13C.

In FIG. 13A, the parts of syringe plunger assembly 1300 illustrated include plunger 1301, reservoir plunger insert 1303, syringe plunger retractor 1304, break shoe cover 1305, ball bearing 1306, and dowel 1307. In FIG. 13B, the parts of syringe plunger assembly 1300 illustrated include plunger 1301, disc 1302, reservoir plunger insert 1303, syringe plunger retractor 1304, break shoe cover 1305, ball bearing 1306, and dowel 1307. In FIG. 13C, the parts of syringe plunger assembly 1300 illustrated include plunger 1301, and dowel 1307. In FIG. 13D, the parts of syringe plunger assembly 1300 illustrated include plunger 1301, disc 1302, reservoir plunger insert 1303, syringe plunger retractor 1304, brake shoe cover 1305, ball bearing 1306, and dowel 1307.

Figure 14A:
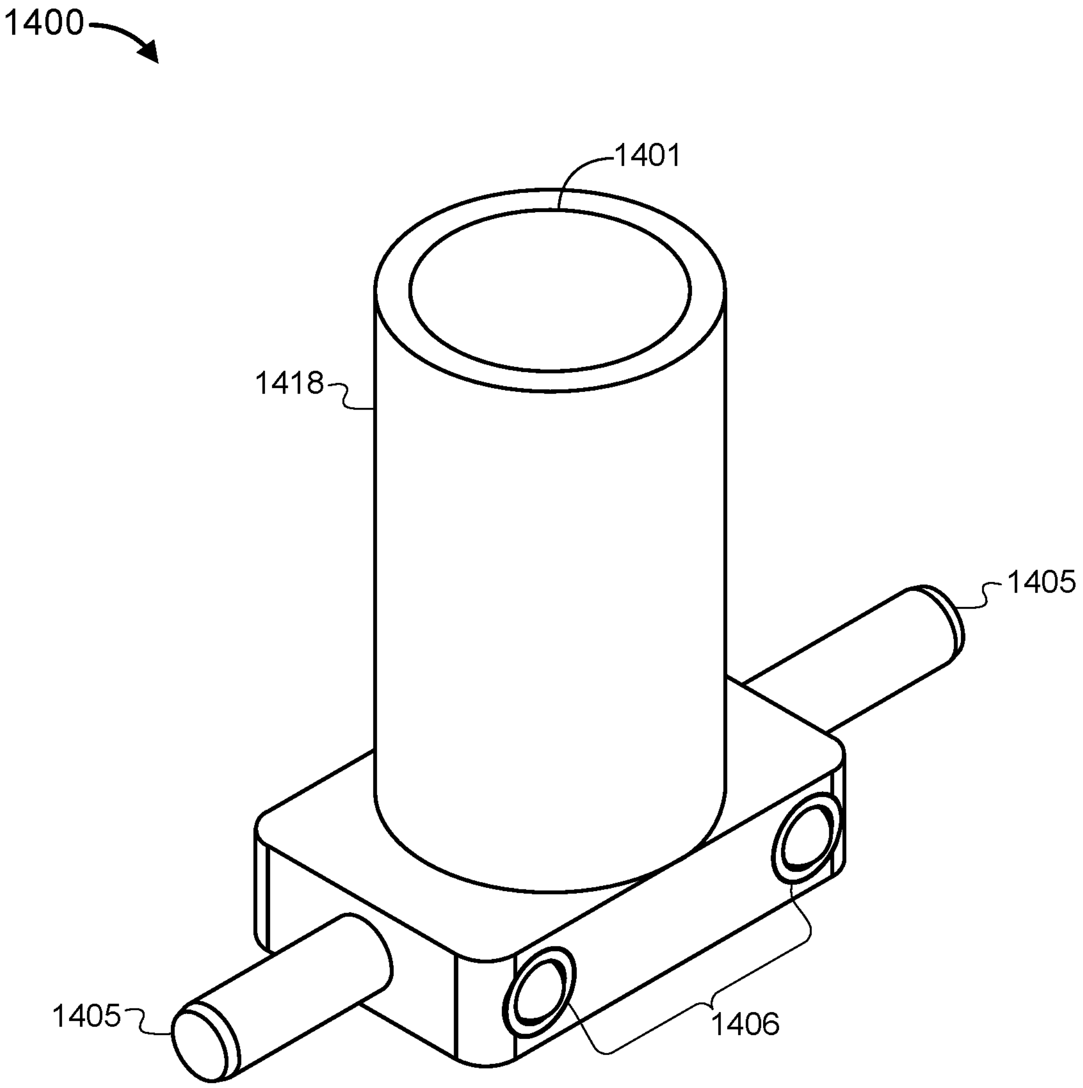
FIGS. 14A-14D illustrate an example spring assembly for a personal vaporizing unit.
Figure 14B:
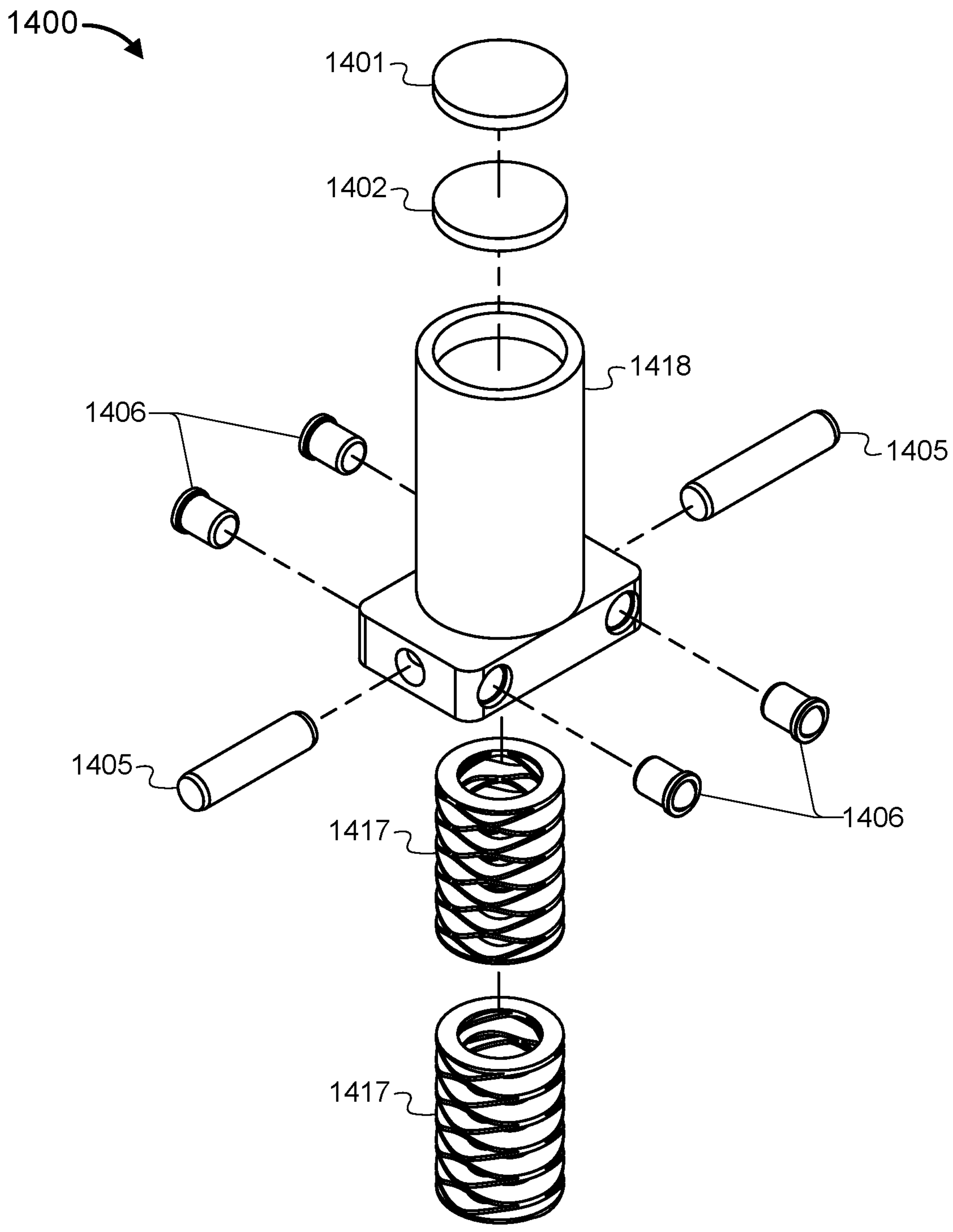
Figure 14C:
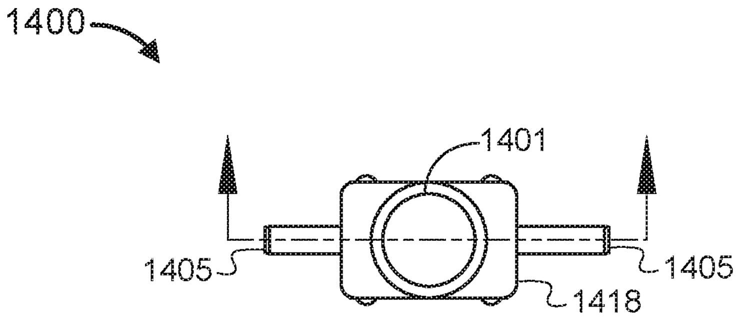
Figure 14D:
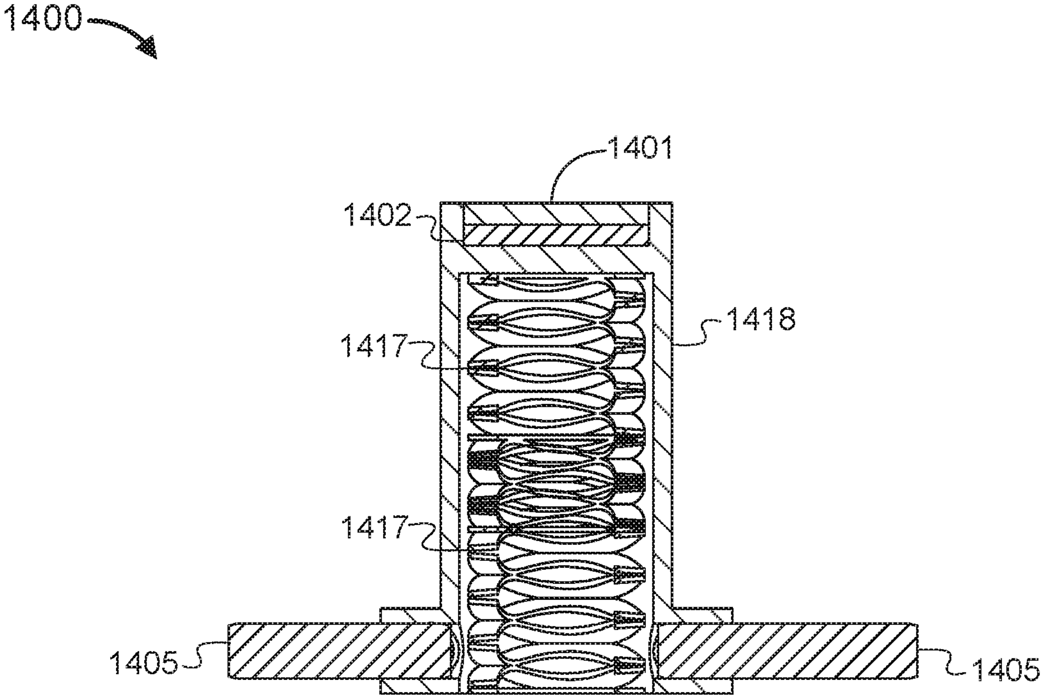

FIGS. 14A-14D illustrate an example spring assembly for a personal vaporizing unit. Spring assembly 1400 may be an example of spring assembly 617. FIG. 14A is an isometric view of a spring assembly 1400. FIG. 14B is an is an exploded view of spring assembly 1400. FIG. 14C is top view of spring assembly 1400 that also illustrates the cut line of FIG. 14D. FIG. 14D is a cross-section of spring assembly 1400 along the cutline illustrated in FIG. 14C.

In FIG. 14A, the parts of spring assembly 1400 illustrated include magnet 1401, dowel 1405, ball-nose spring plunger 1406, and pump piston 1418. In FIG. 14B, the parts of spring assembly 1400 illustrated include magnet 1401, mounting tape 1402, dowel 1405, ball-nose spring plunger 1406, spring 1417, and pump piston 1418. In FIG. 14C, the parts of spring assembly 1400 illustrated include magnet 1401, dowel 1405, and pump piston 1418. In FIG. 14D, the parts of spring assembly 1400 illustrated include magnet 1401, mounting tape 1402, dowel 1405, spring 1417, and pump piston 1418.

Figure 15A:
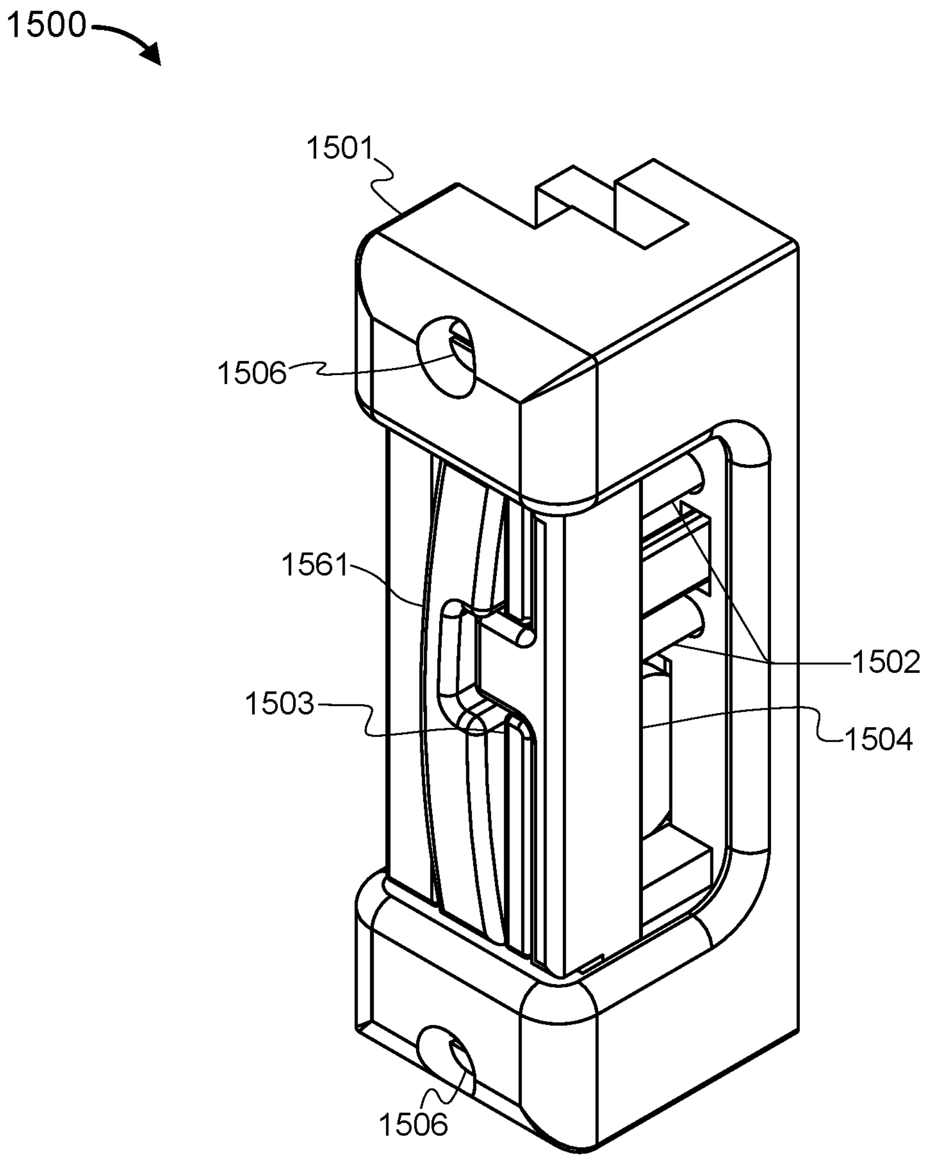
FIGS. 15A-15B illustrate an example activation button assembly for a personal vaporizing unit.
Figure 15B:
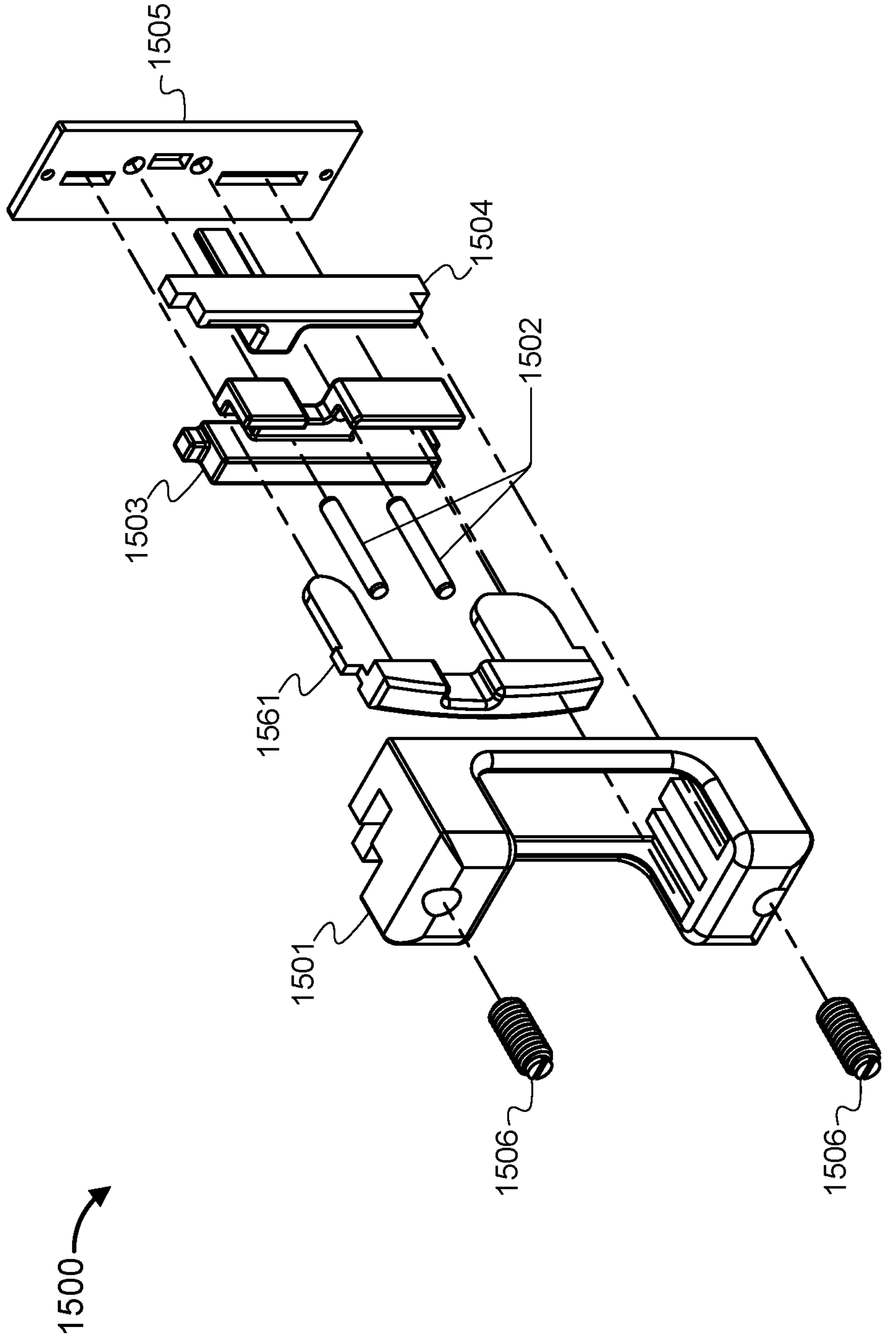

FIGS. 15A-15B illustrate an example activation button assembly for a personal vaporizing unit. Activation button assembly 1500 may be an example of activation button assembly 661. FIG. 15A is an isometric view of an activation button assembly 1500. FIG. 15B is an is an exploded view of activation button assembly 1500.

In FIG. 15A, the parts of activation button assembly 1500 illustrated include housing 1501, dowel 1502, button power key 1503, airflow key 1504, screw 1506, and interlock brake key 1561. In FIG. 15B, the parts of activation button assembly 1500 illustrated include housing 1501, dowel 1502, button power key 1503, airflow key 1504, housing panel 1505, screw 1506, and interlock brake key 1561.

Figure 16A:
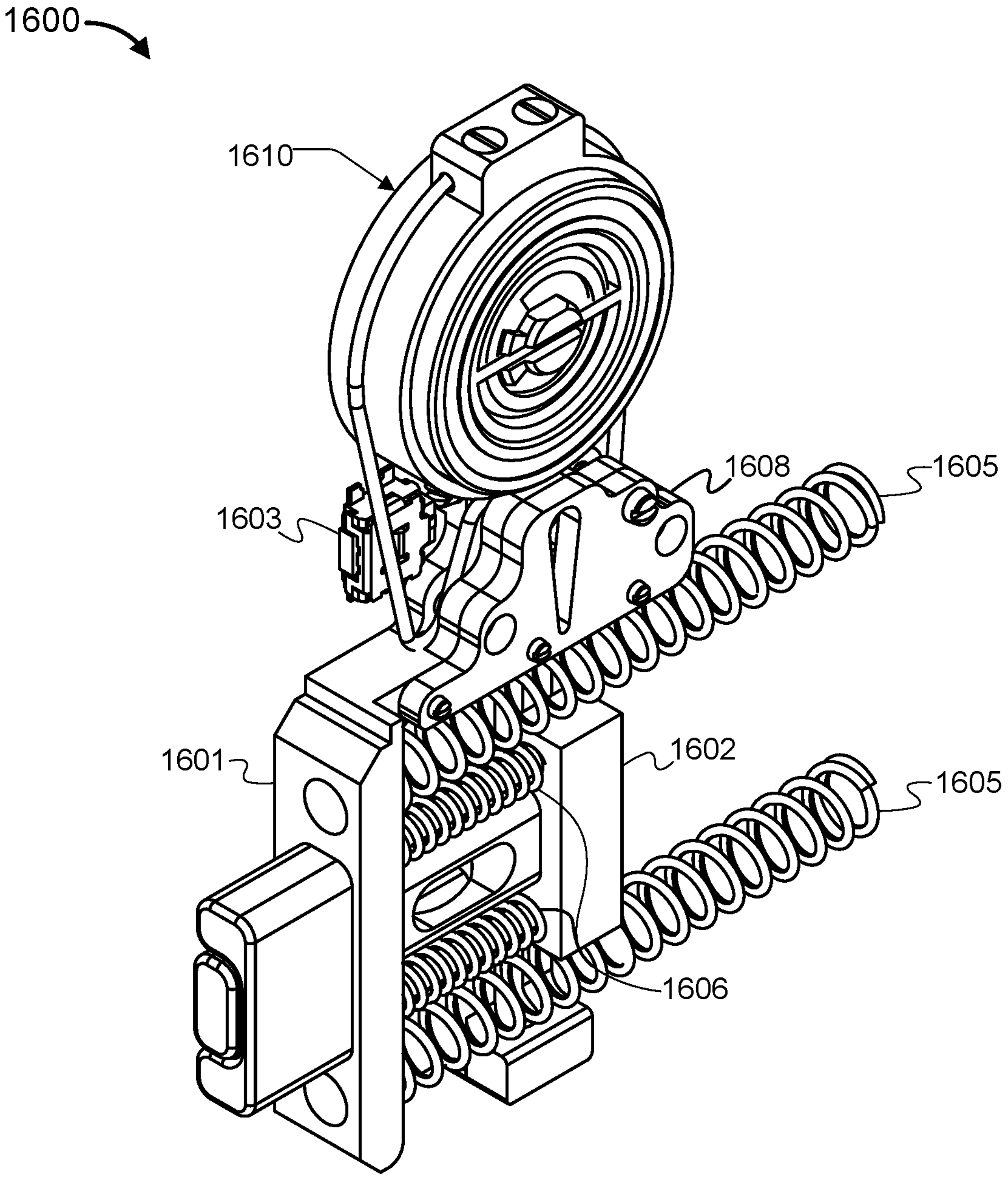
FIGS. 16A-16C illustrate an example power and airflow control assembly for a personal vaporizing unit.
Figure 16B:
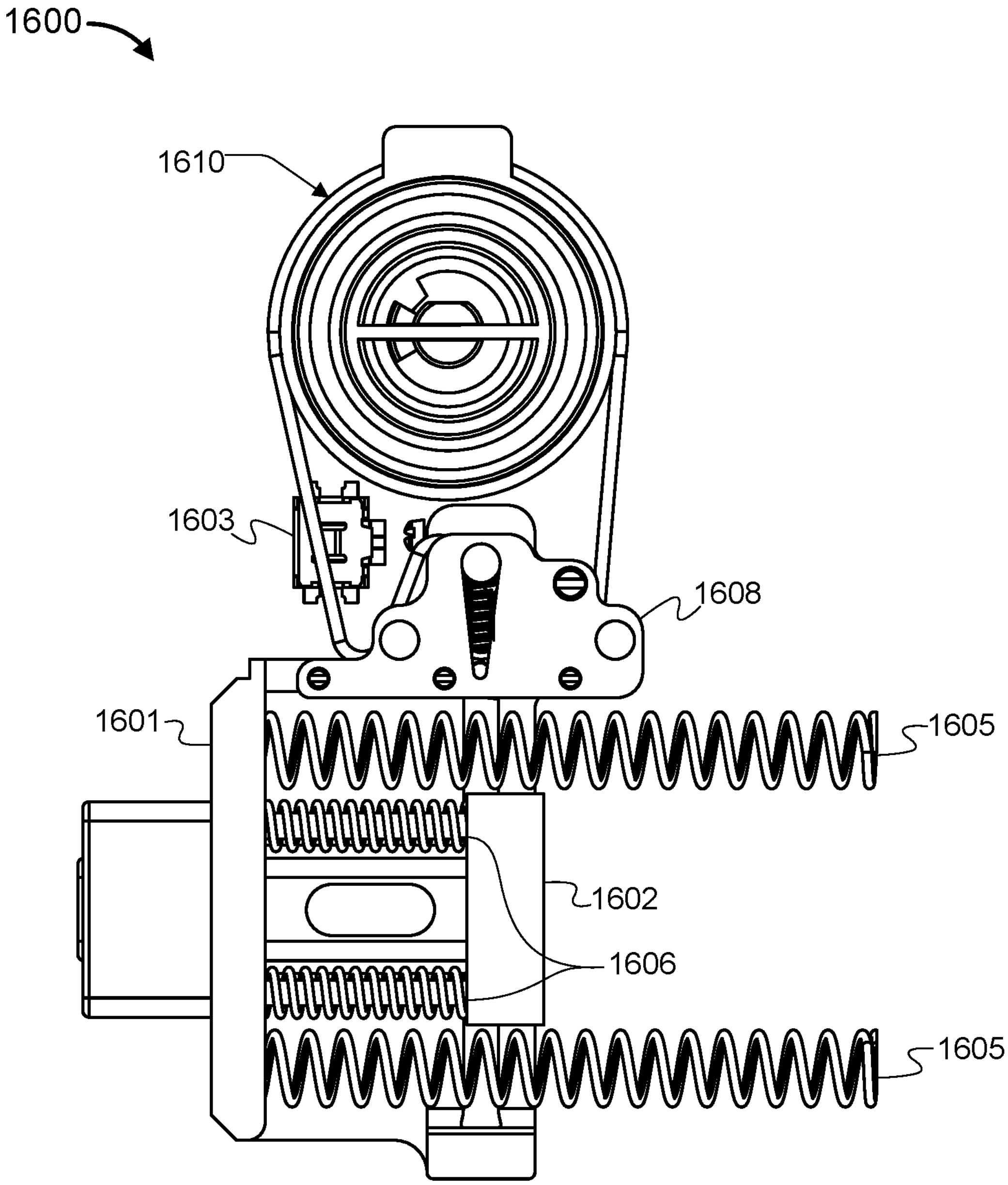
Figure 16C:
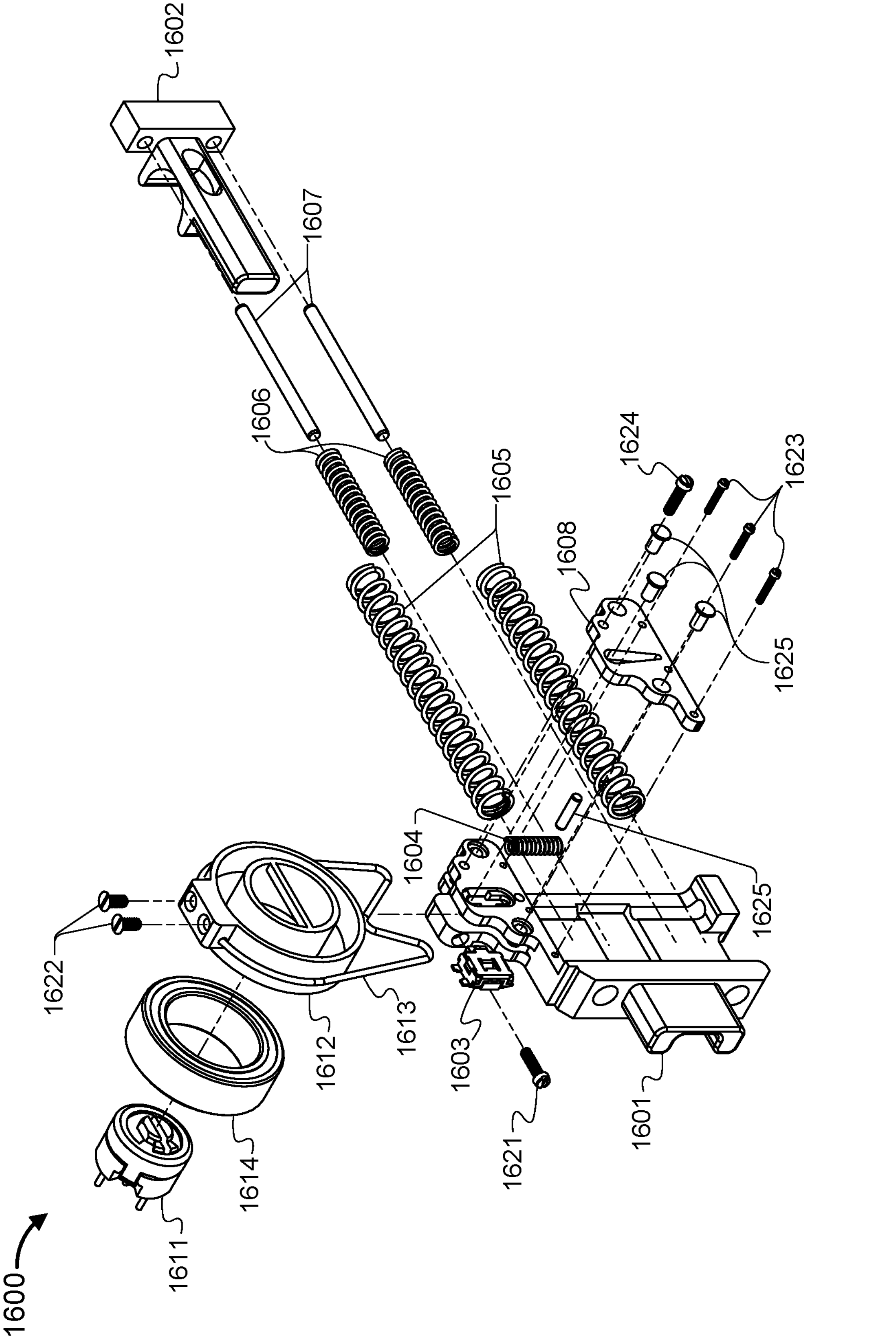

FIGS. 16A-16C illustrate an example power and airflow control assembly for a personal vaporizing unit. FIG. 16A is an isometric view of a power and airflow control assembly 1600. FIG. 16B is a side view of power and airflow control assembly 1600. FIG. 16C is an exploded view of power and airflow control assembly 1600.

In FIG. 16A, the parts of power and airflow control assembly 1600 illustrated include variable power button 1601, airflow control ring 1602, switch 1603, spring 1605, spring 1606, bridge for variable power button 1608, and potentiometer assembly 1610. In FIG. 16B, the parts of power and airflow control assembly 1600 illustrated include variable power button 1601, airflow control ring 1602, switch 1603, spring 1605, spring 1606, bridge for variable power button 1608, and potentiometer assembly 1610. In FIG. 16C, the parts of power and airflow control assembly 1600 illustrated include variable power button 1601, airflow control ring 1602, switch 1603, spring 1604, spring 1605, spring 1606, dowel 1607, bridge for variable power button 1608, potentiometer 1611, potentiometer knob 1612, wire 1613, ball bearing 1614, screw 1621, screw 1622, screw 1623, screw 1624, captive pin 1625, and dowel 1626.

Figure 17A:
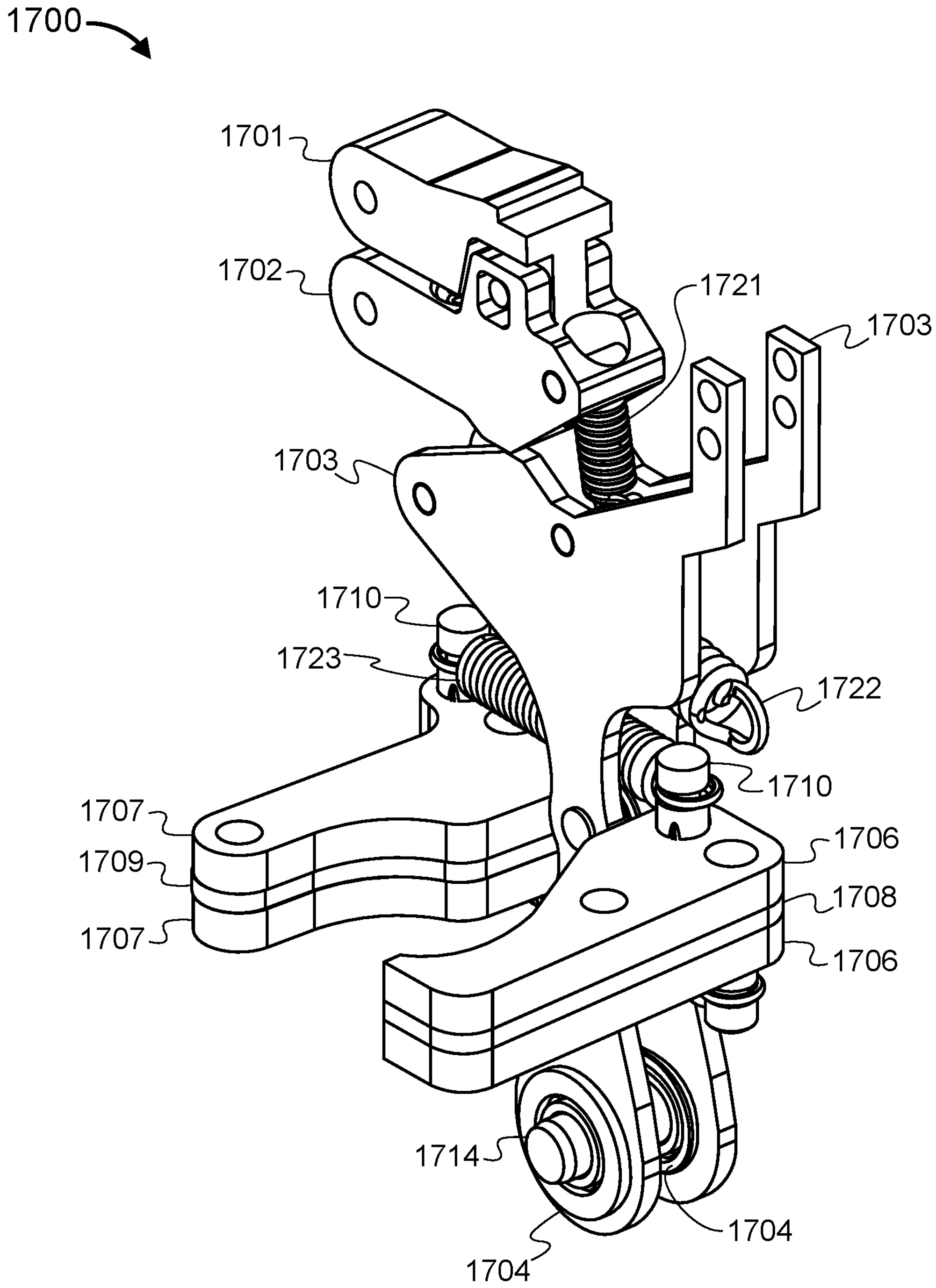
FIGS. 17A-17C illustrate an example airflow control component for a personal vaporizing unit.
Figure 17B:
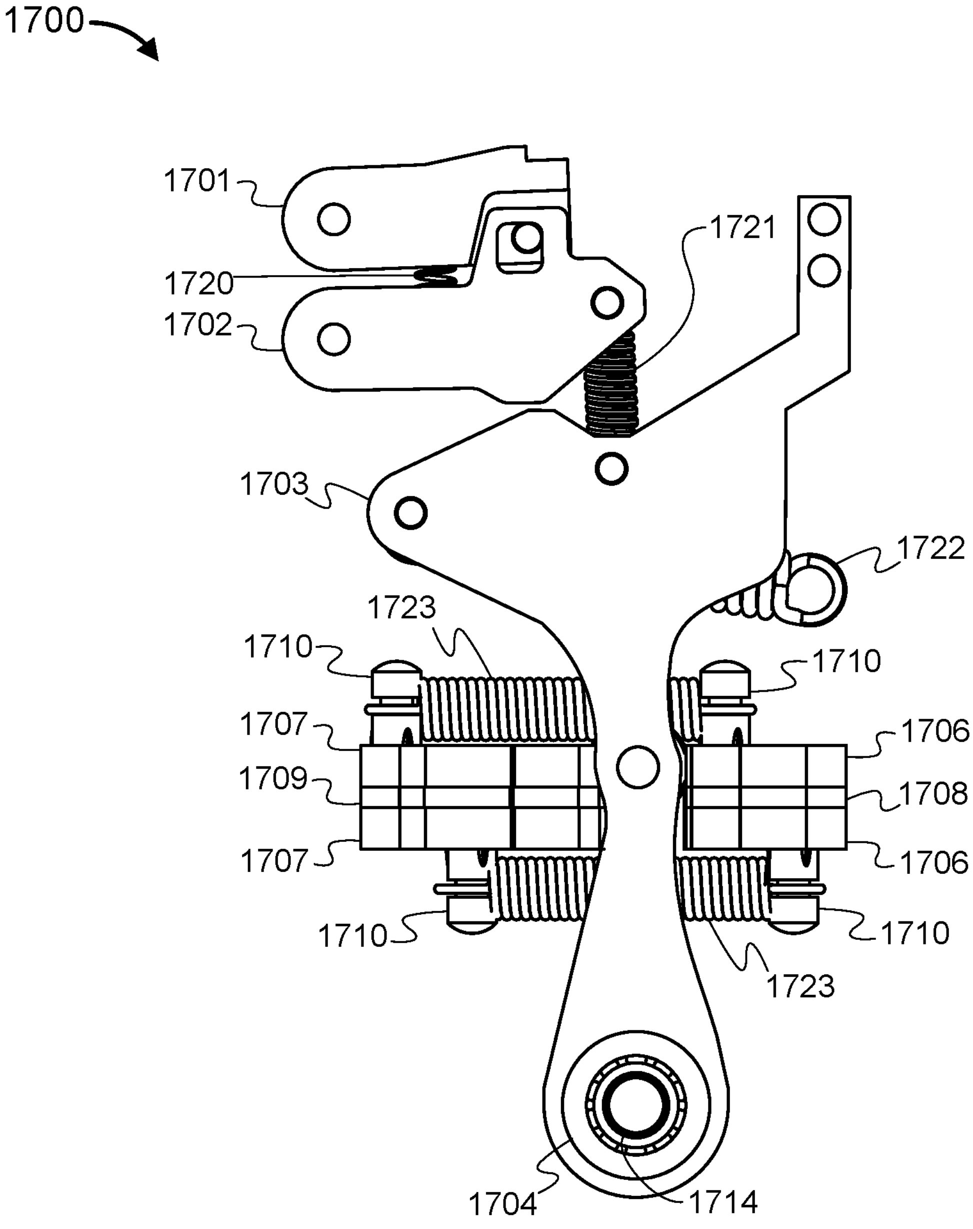
Figure 17C:
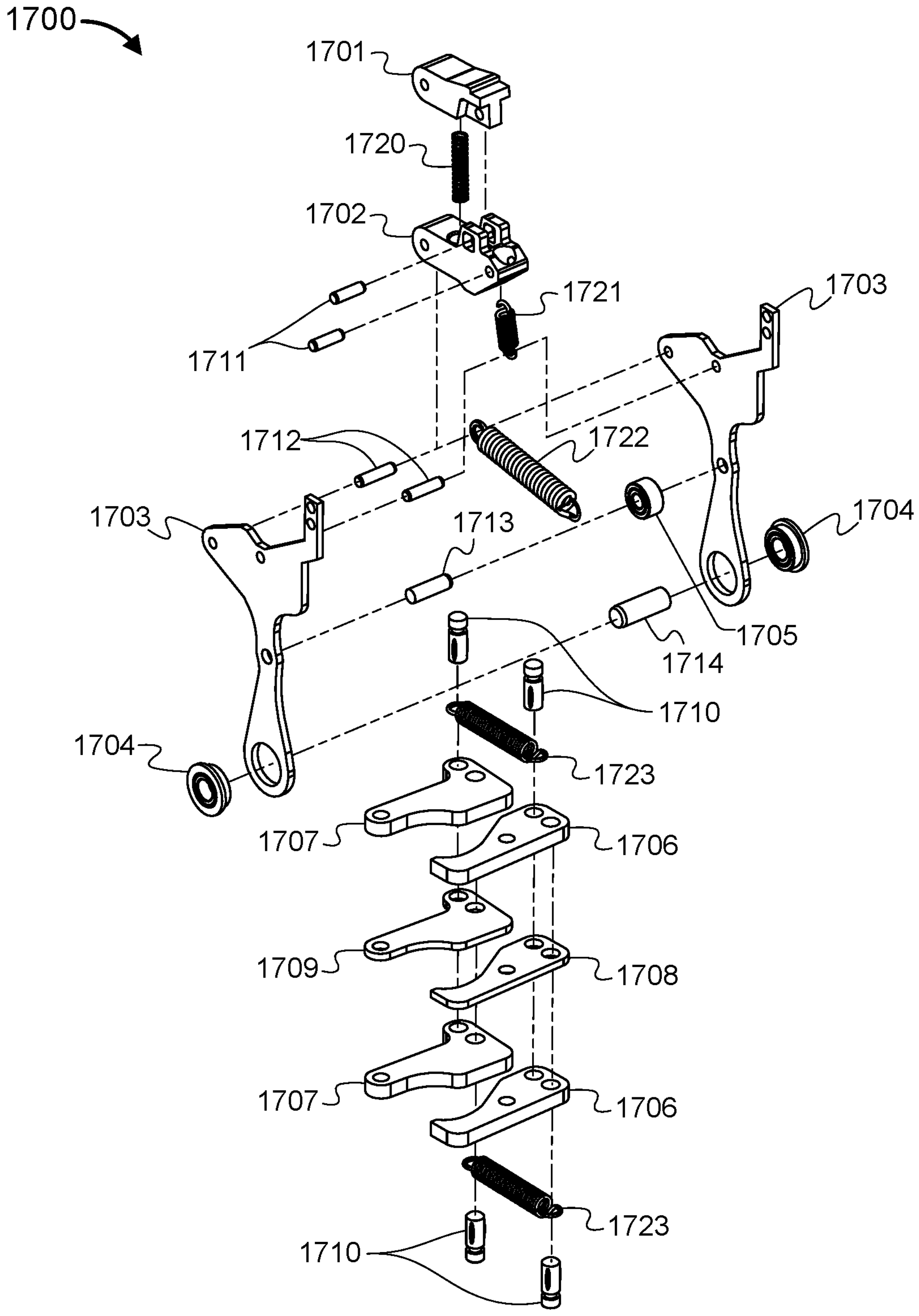

FIGS. 17A-17C illustrate an example airflow control component for a personal vaporizing unit. FIG. 17A is an isometric view of an airflow control component 1700. FIG. 16B is a side view of airflow control assembly 1700. FIG. 17C is an exploded view of airflow control component 1700.

In FIG. 17A, the parts of airflow control component 1700 illustrated include power lock out link 1701, break interlock link 1702, break lever 1703, ball bearing 1704, left break plate 1706, right break plate 1707, left break plate 1708, right break plate 1709, grooved dowel pin 1710, dowel 1714, spring 1721, spring 1722, and spring 1723. In FIG. 17B, the parts of airflow control component 1700 illustrated include power lock out link 1701, break interlock link 1702, break lever 1703, ball bearing 1704, left break plate 1706, right break plate 1707, left break plate 1708, right break plate 1709, grooved dowel pin 1710, spring 1720, spring 1721, spring 1722, and spring 1723. In FIG. 17C, the parts of airflow control component 1700 illustrated include power lock out link 1701, break interlock link 1702, break lever 1703, ball bearing 1704, ball bearing 1705, left break plate 1706, right break plate 1707, left break plate 1708, right break plate 1709, grooved dowel pin 1710, dowel 1711, dowel 1712, dowel 1713, dowel 1714, spring 1720, spring 1721, spring 1722, and spring 1723.

Figure 18A:
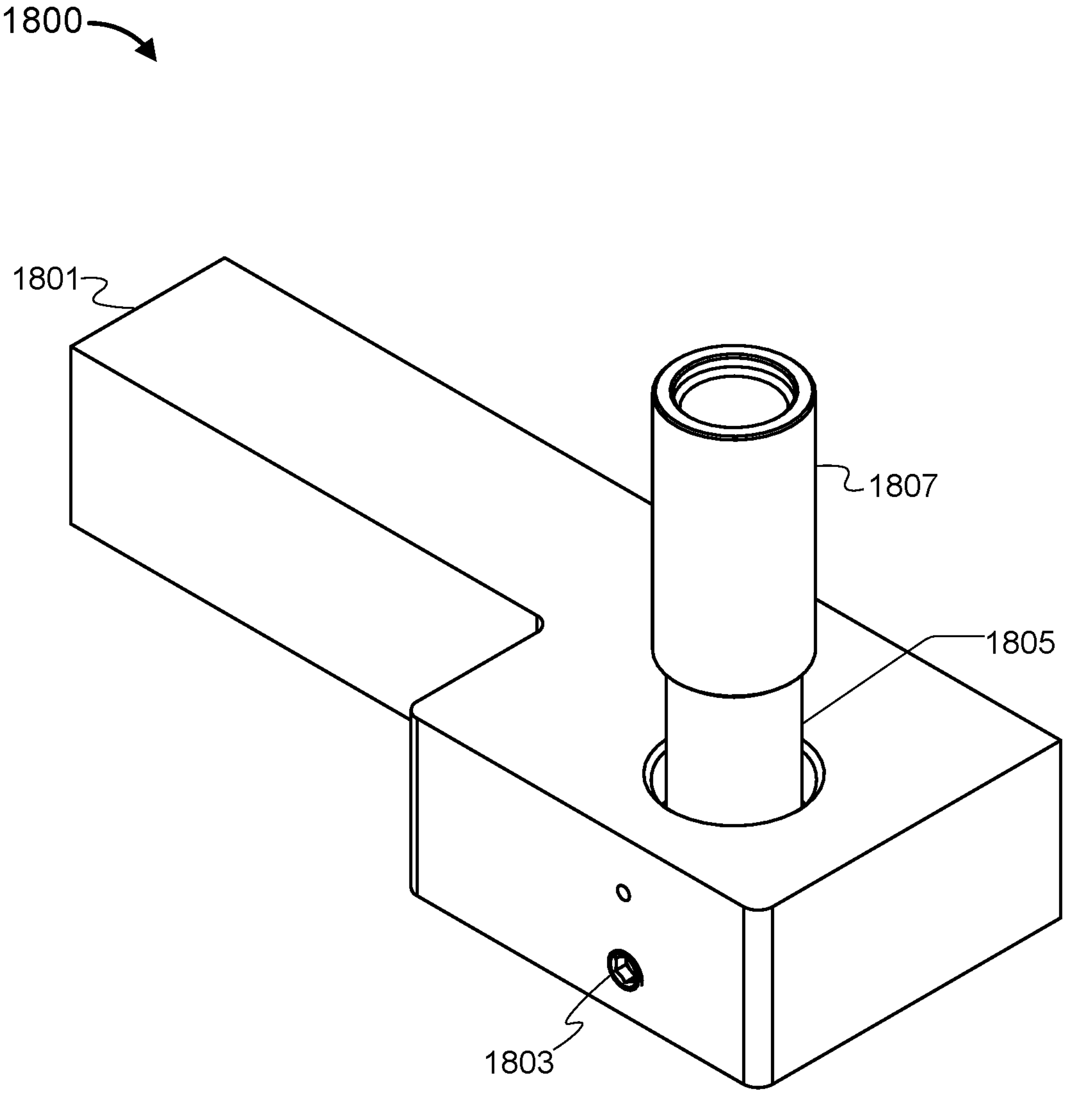
FIGS. 18A-18D illustrate an example air piston assembly for a personal vaporizing unit.
Figure 18B:
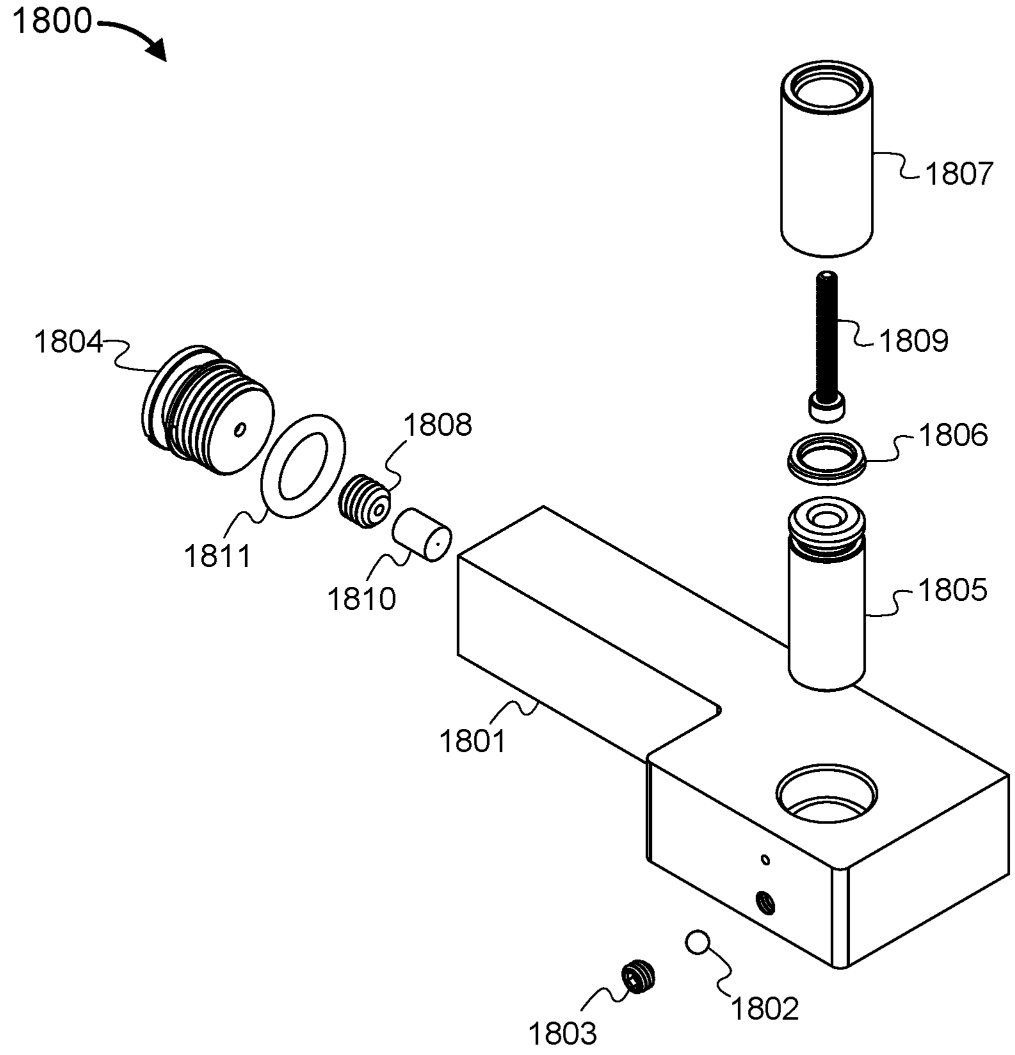
Figure 18C:
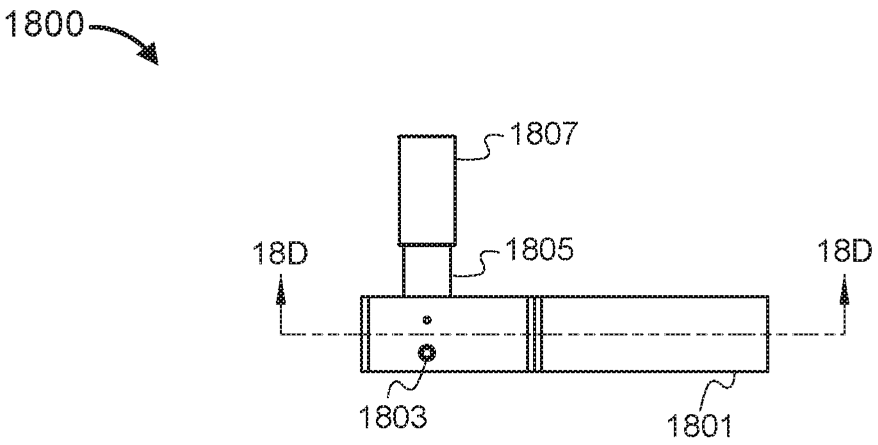
Figure 18D:
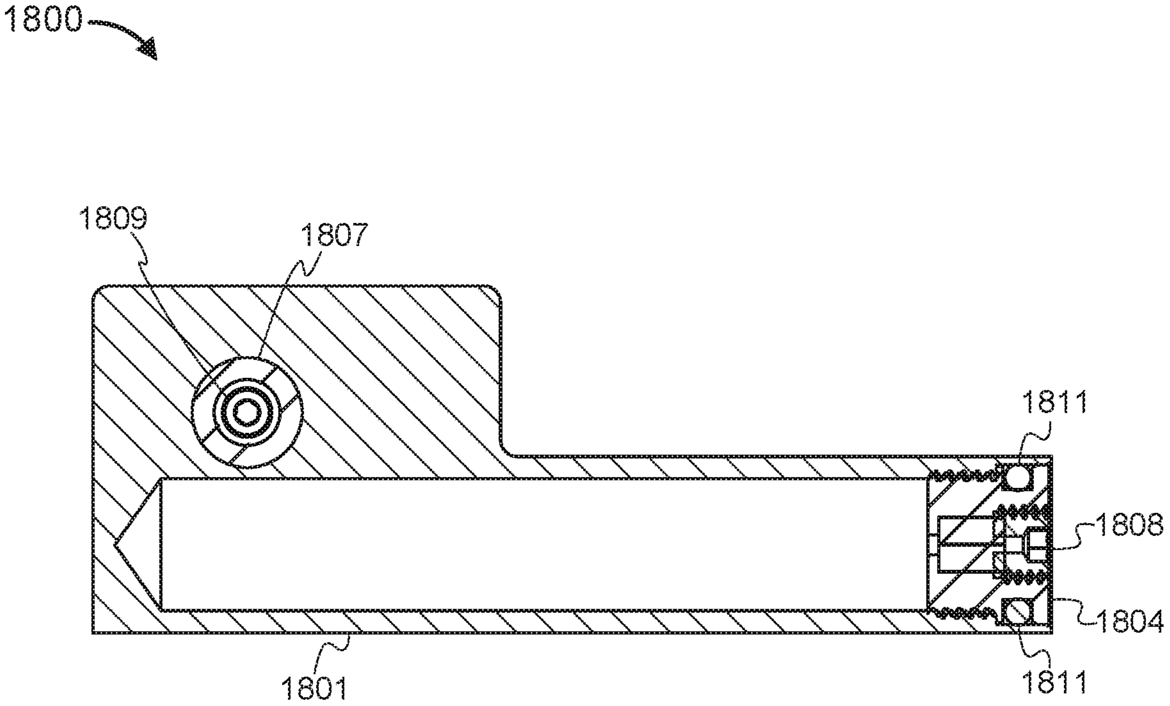

FIGS. 18A-18D illustrate an example air piston assembly for a personal vaporizing unit. FIG. 18A is an isometric view of an air piston assembly 1800. FIG. 18B is an is an exploded view of air piston assembly 1800. FIG. 18C is side view of air piston assembly 1800 that also illustrates the cut line of FIG. 18D. FIG. 18D is a cross-section of air piston assembly 1800 along the cutline illustrated in FIG. 18C.

In FIG. 18A, the parts of air piston assembly 1800 illustrated include base chamber 1801, cup-point set screw 1803, piston guide rod 1805, and pneumatic piston 1807. In FIG. 18B, the parts of air piston assembly 1800 illustrated include base chamber 1801, ball 1802, cup-point set screw

1803, fill port end plug 1804, piston guide rod 1805, x-profile O-ring 1806, pneumatic piston 1807, flat point set screw 1808, socket head cap screw 1809, O-ring section 1810, and O-ring 1811. In FIG. 18C, the parts of air piston assembly 1800 illustrated include base chamber 1801, cup-point set screw 1803, piston guide rod 1805, and pneumatic piston 1807. In FIG. 18D, the parts of air piston assembly 1800 illustrated include base chamber 1801, fill port end plug 1804, pneumatic piston 1807, flat point set screw 1808, socket head cap screw 1809, and O-ring 1811.

Figure 19A:
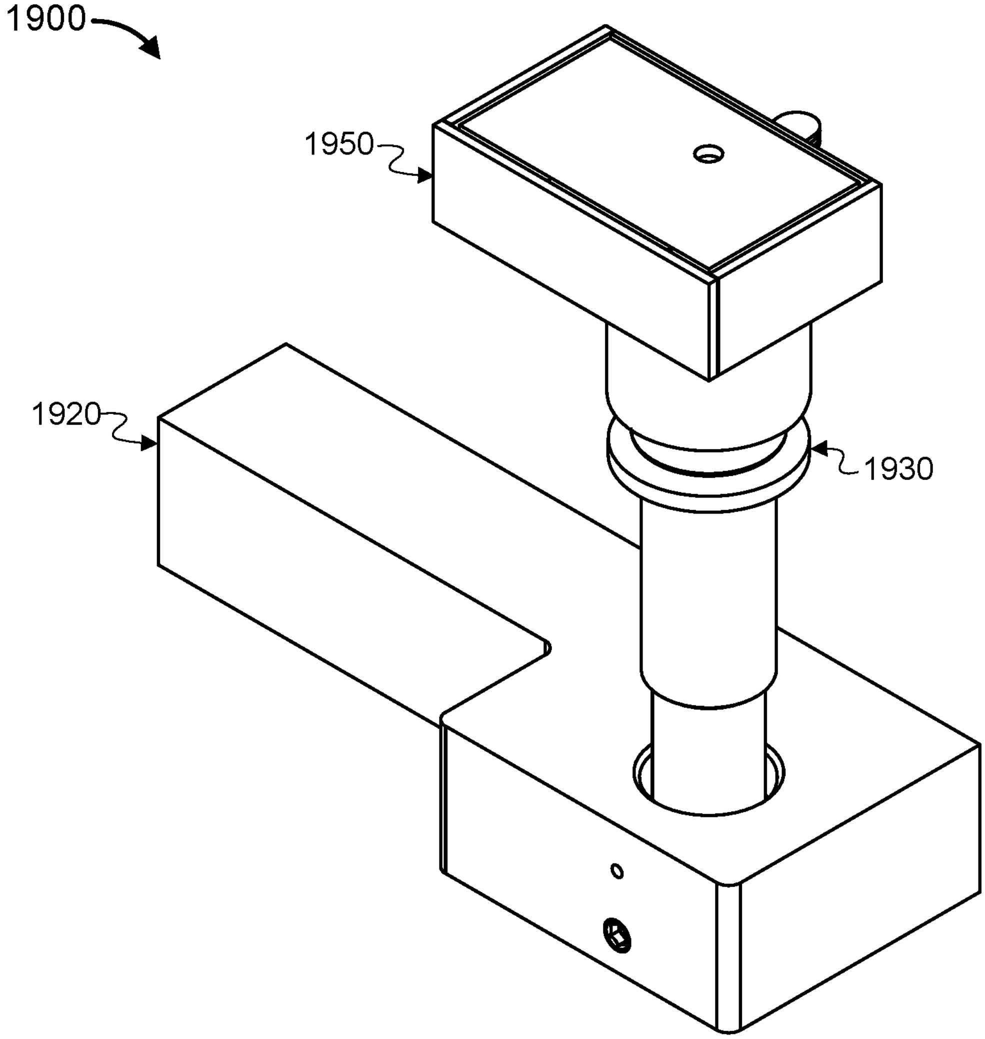
FIGS. 19A-19K illustrate an example pneumatic assembly for a personal vaporizing unit.
Figure 19B:
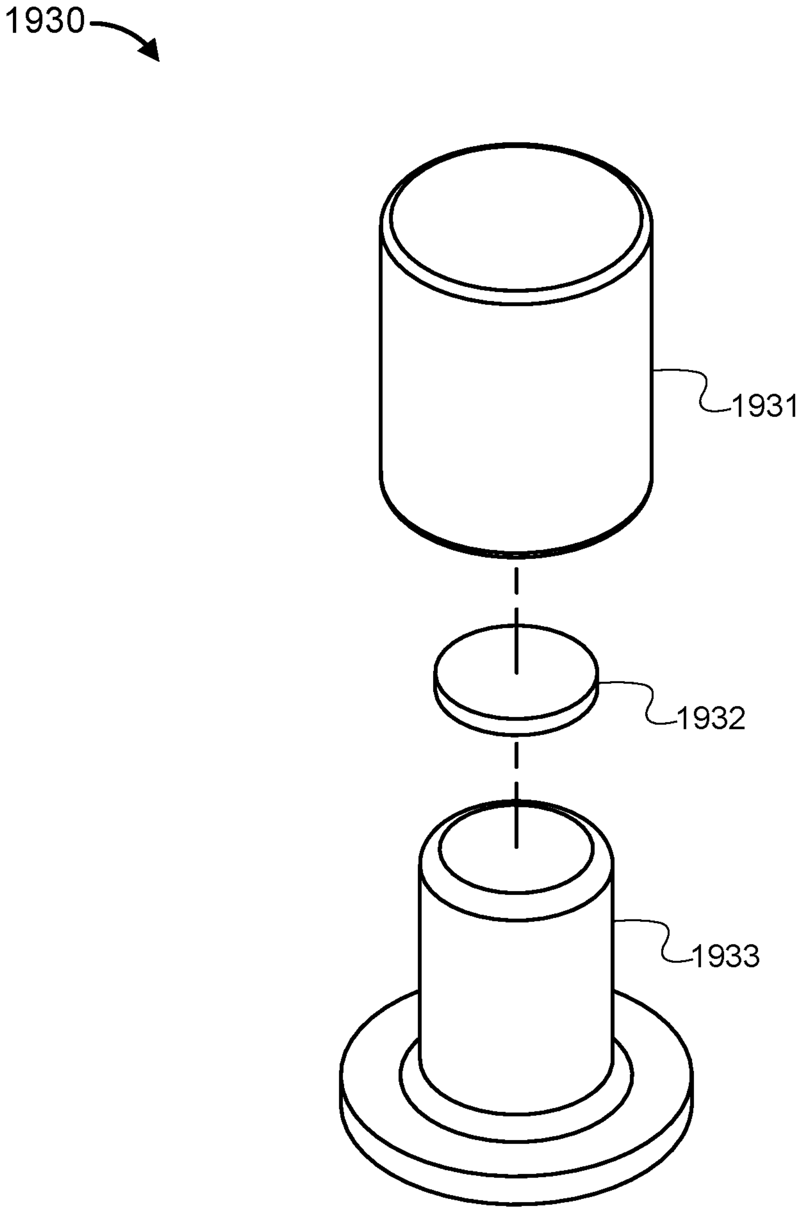
Figure 19D:
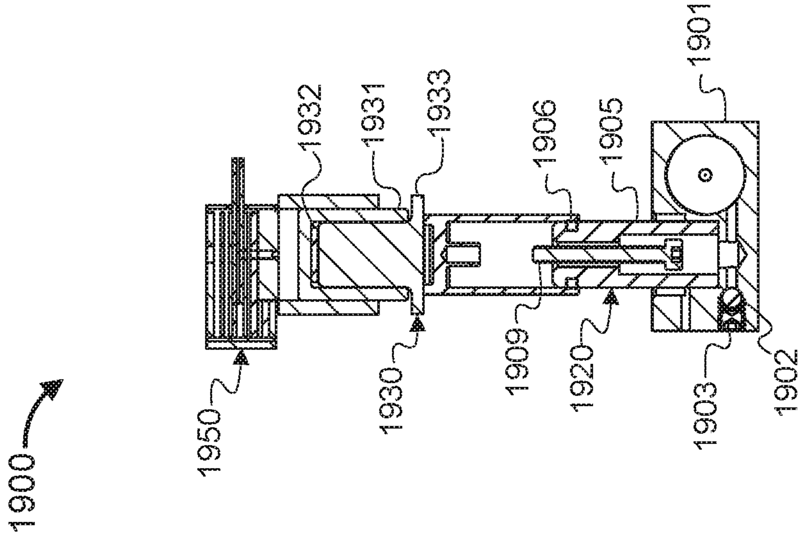
Figure 19C:
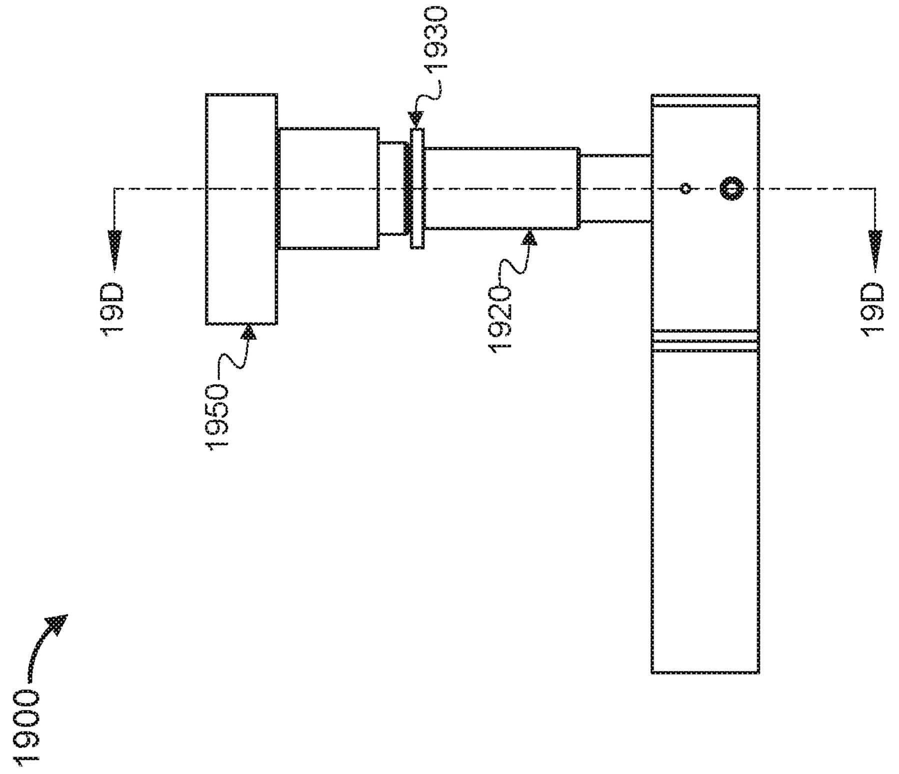
Figure 19F:
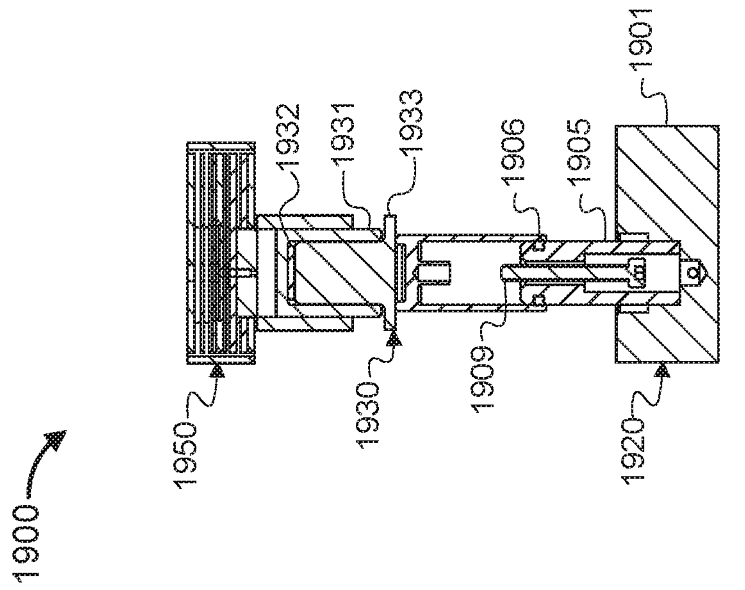
Figure 19E:
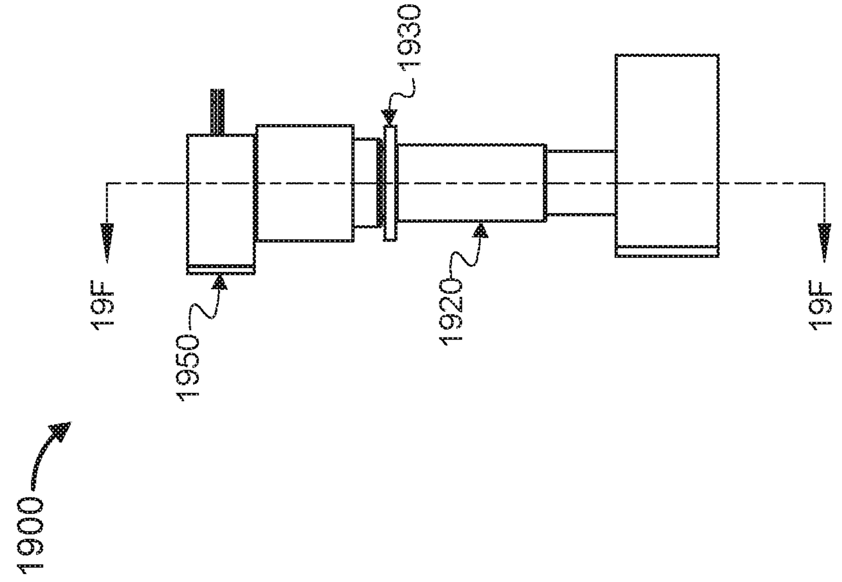
Figure 19G:
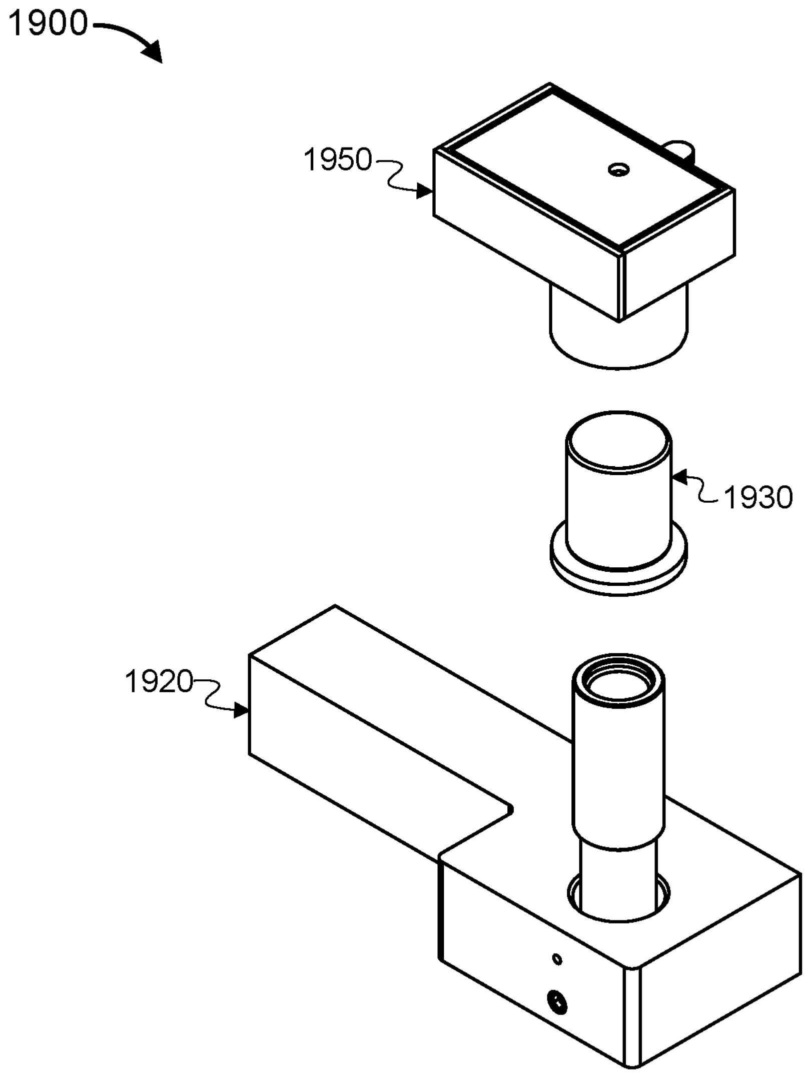
Figure 19H:
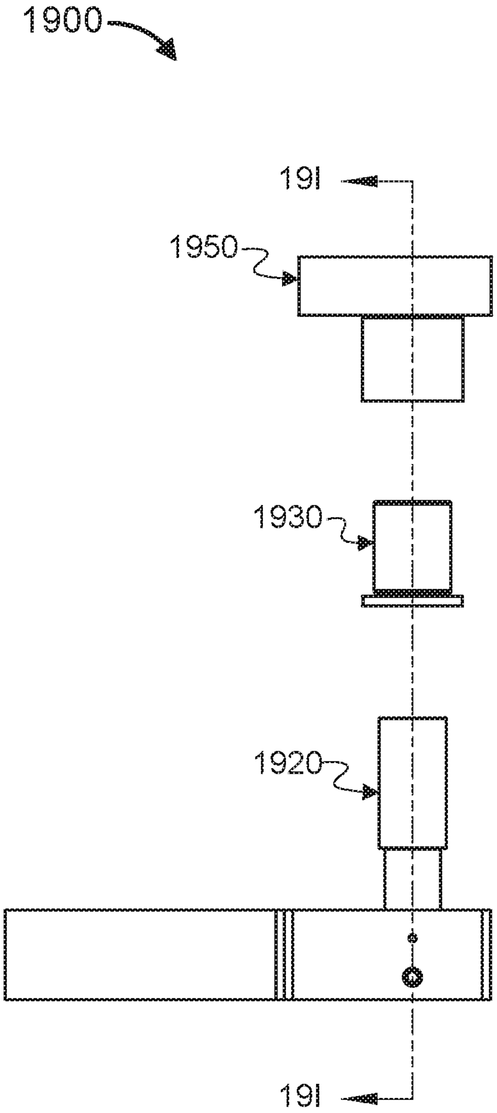
Figure 19I:
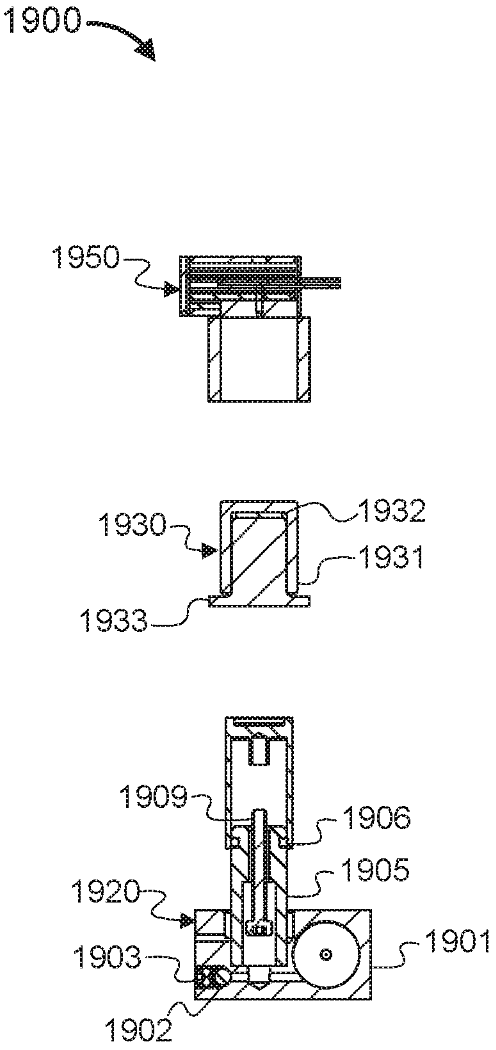
Figure 19J:
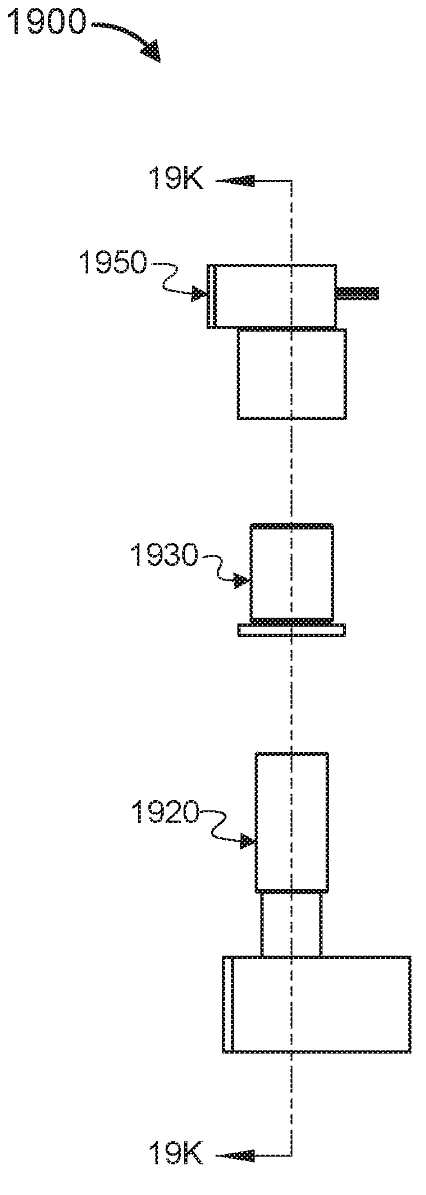
Figure 19K:
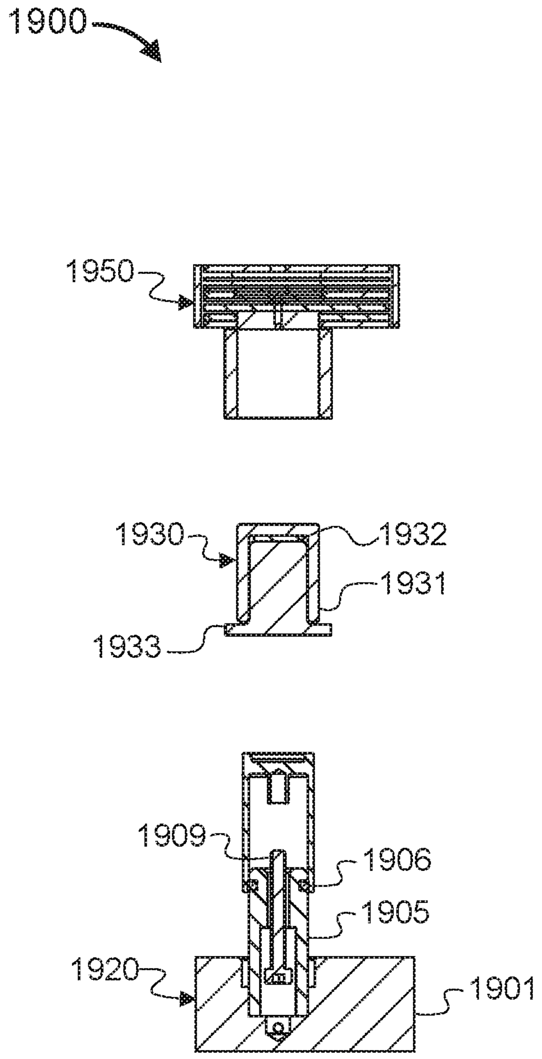

FIGS. 19A-19K illustrate an example pneumatic assembly for a personal vaporizing unit. FIG. 19A is an isometric view of a pneumatic assembly 1900. FIG. 19B is an exploded view of a syringe plunger assembly 1930. FIG. 19C is side view of pneumatic assembly 1900 that also illustrates the cut line of FIG. 19D. FIG. 19D is a cross-section of pneumatic assembly 1900 along the cutline illustrated in FIG. 19C. FIG. 19E is an end view of pneumatic assembly 1900 that also illustrates the cut line of FIG. 19F. FIG. 19F is a cross-section of pneumatic assembly 1900 along the cutline illustrated in FIG. 19E. FIG. 19G is an exploded view of pneumatic assembly 1900. FIG. 19H is an exploded side view of pneumatic assembly 1900 that also illustrates the cut line of FIG. 19I. FIG. 19I is an exploded cross-section of pneumatic assembly 1900 along the cutline illustrated in FIG. 19H. FIG. 19J is an exploded end view of pneumatic assembly 1900 that also illustrates the cut line of FIG. 19K. FIG. 19K is an exploded cross-section of pneumatic assembly 1900 along the cutline illustrated in FIG. 19J.

In FIG. 19A, the parts of air pneumatic assembly 1900 illustrated include air piston assembly 1920, syringe plunger assembly 1930, and flow control assembly 1950. In FIG. 19B, the parts of syringe plunger assembly 1930 illustrated include plunger 1931, disc 1932, and reservoir plunger insert 1933. In FIG. 19C, the parts of air pneumatic assembly 1900 illustrated include air piston assembly 1920, syringe plunger assembly 1930, and flow control assembly 1950. In FIG. 19D, the parts of air pneumatic assembly 1900 illustrated include base chamber 1901, ball 1902, cup-point set screw 1903, piston guide rod 1905, x-profile O-ring 1906, socket head cap screw 1909, air piston assembly 1920, syringe plunger assembly 1930, plunger 1931, disc 1932, reservoir plunger insert 1933, and flow control assembly 1950. In FIG. 19E, the parts of air pneumatic assembly 1900 illustrated include air piston assembly 1920, syringe plunger assembly 1930, and flow control assembly 1950. In FIG. 19F, the parts of air pneumatic assembly 1900 illustrated include base chamber 1901, piston guide rod 1905, x-profile O-ring 1906, socket head cap screw 1909, air piston assembly 1920, syringe plunger assembly 1930, plunger 1931, disc 1932, reservoir plunger insert 1933, and flow control assembly 1950. In FIG. 19G, the parts of air pneumatic assembly 1900 illustrated include air piston assembly 1920, syringe plunger assembly 1930, and flow control assembly 1950. In FIG. 19H, the parts of air pneumatic assembly 1900 illustrated include air piston assembly 1920, syringe plunger assembly 1930, and flow control assembly 1950. In FIG. 19I, the parts of air pneumatic assembly 1900 illustrated include base chamber 1901, ball 1902, cup-point set screw 1903, piston guide rod 1905, x-profile O-ring 1906, socket head cap screw 1909, air piston assembly 1920, syringe plunger assembly 1930, plunger 1931, disc 1932, reservoir plunger insert 1933, and flow control assembly 1950. In FIG. 19J, the parts of air pneumatic assembly 1900 illustrated include air piston assembly 1920, syringe plunger assembly 1930, and flow control assembly 1950. In FIG. 19K, the parts of air pneumatic assembly 1900 illustrated include base chamber 1901, piston guide rod 1905, x-profile O-ring 1906, socket head cap screw 1909, air piston assembly 1920, syringe plunger assembly 1930, plunger 1931, disc 1932, reservoir plunger insert 1933, and flow control assembly 1950.

Figure 20A:
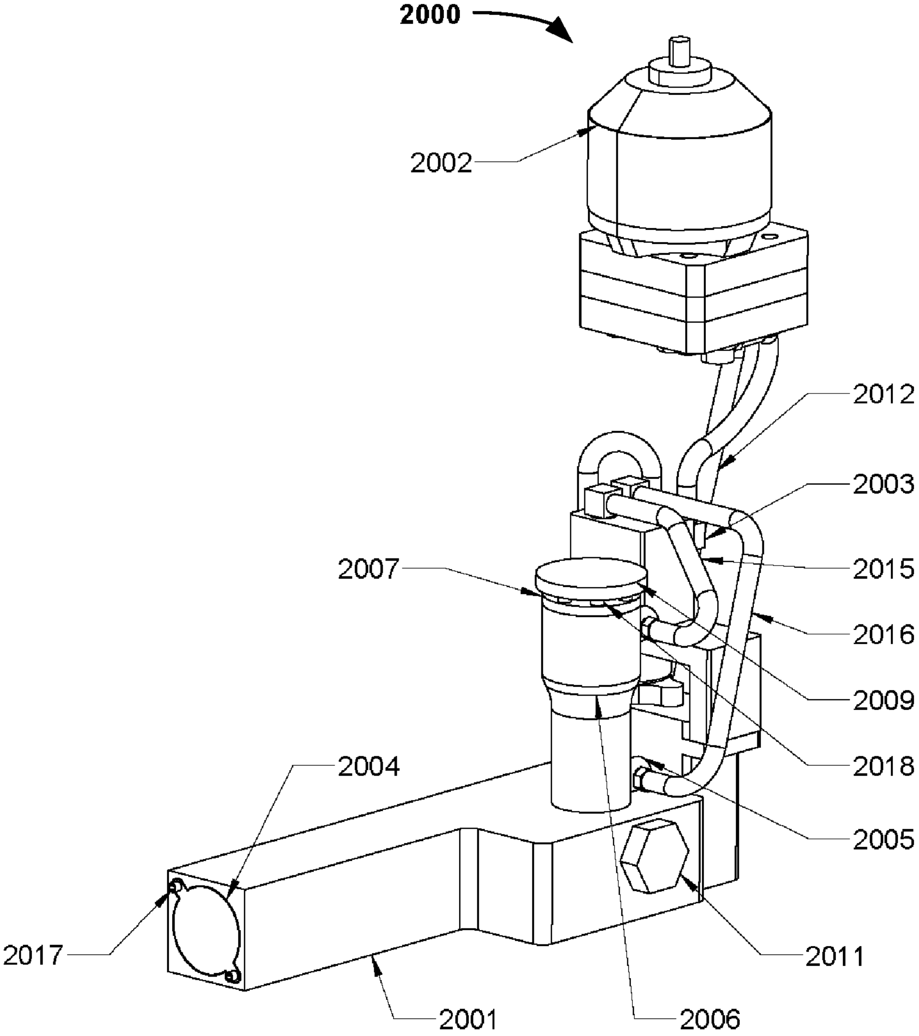
FIGS. 20A-20G illustrate an example hydraulic assembly for a personal vaporizing unit.
Figure 20B:
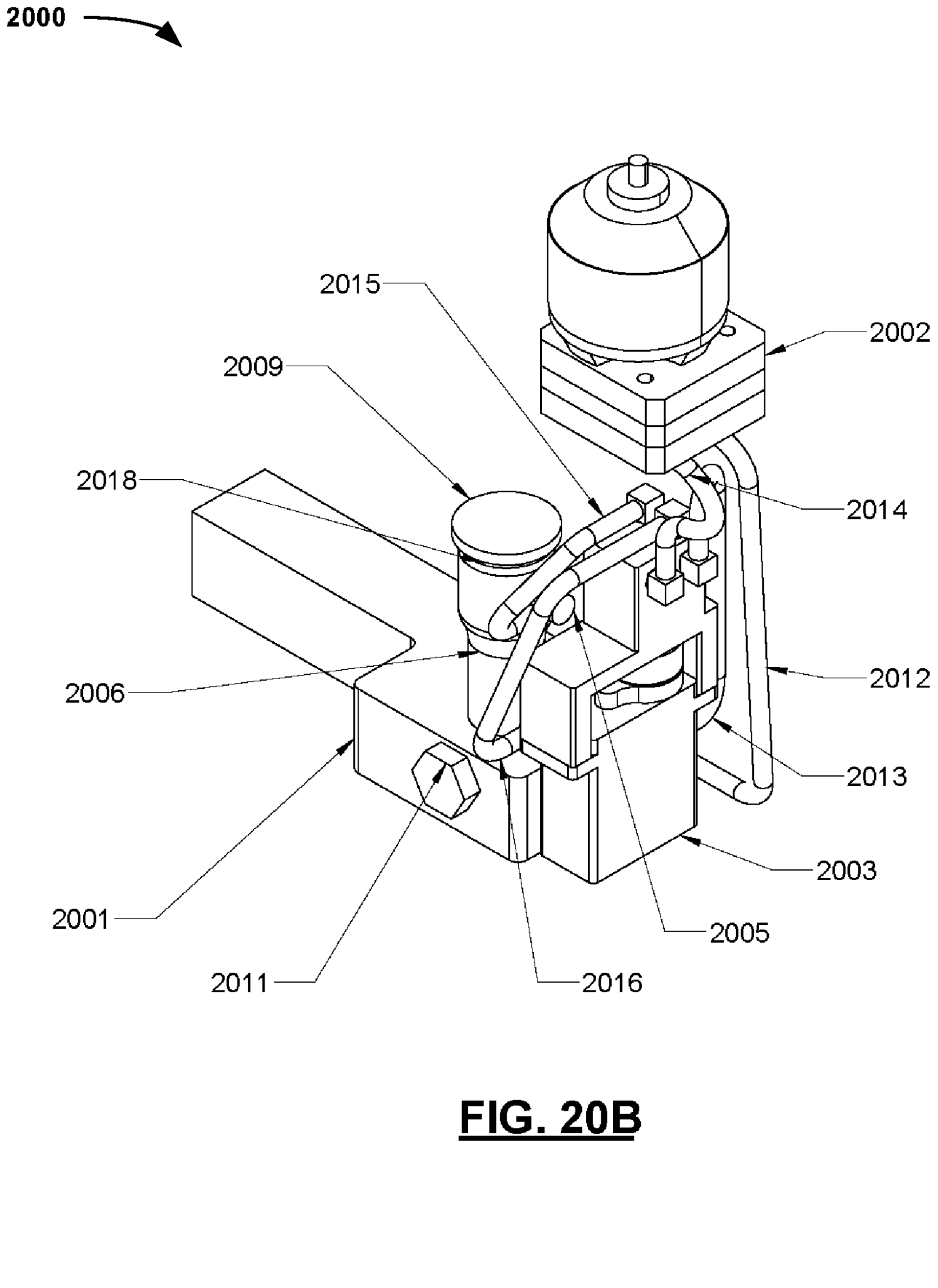
Figure 20C:
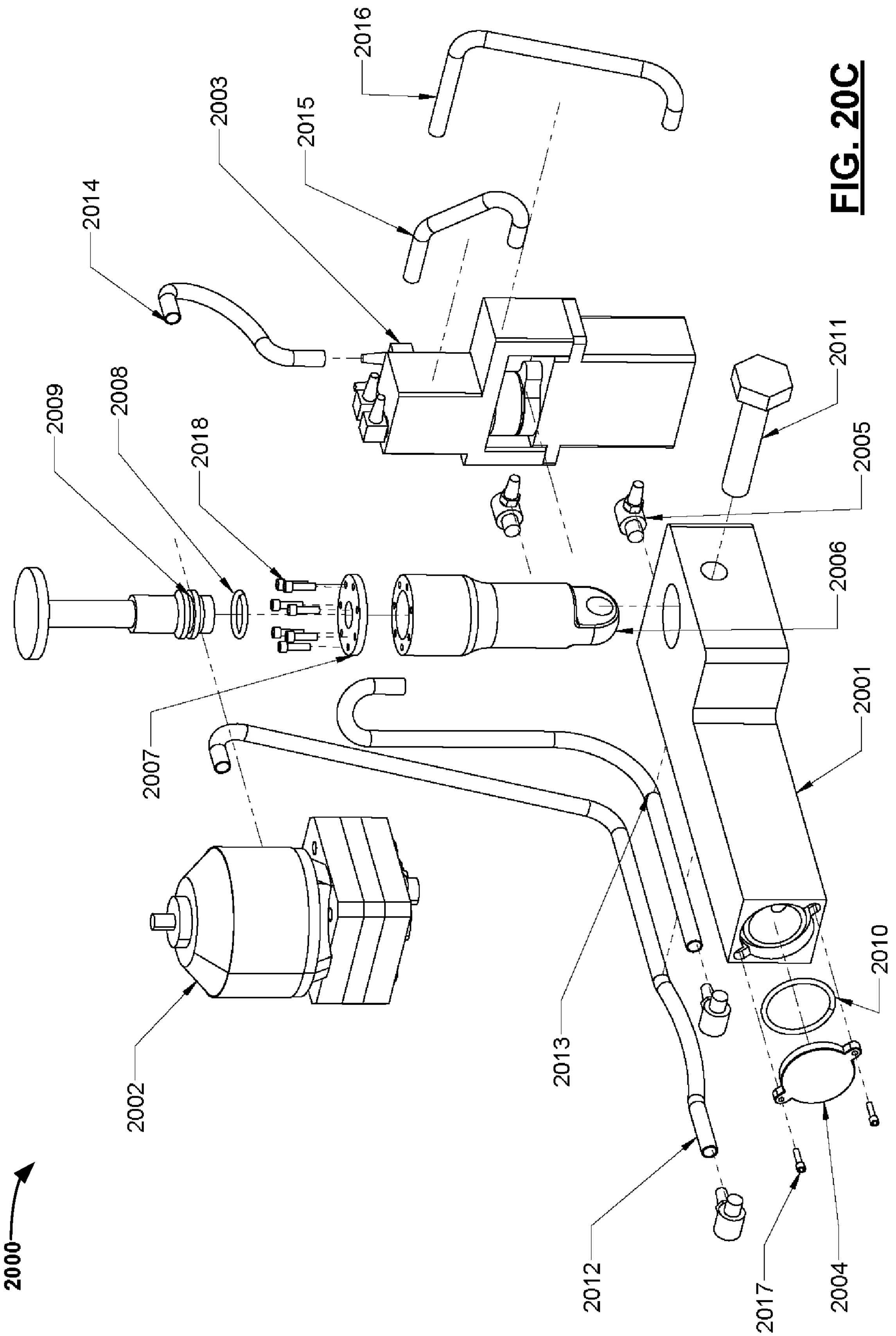
Figure 20D:
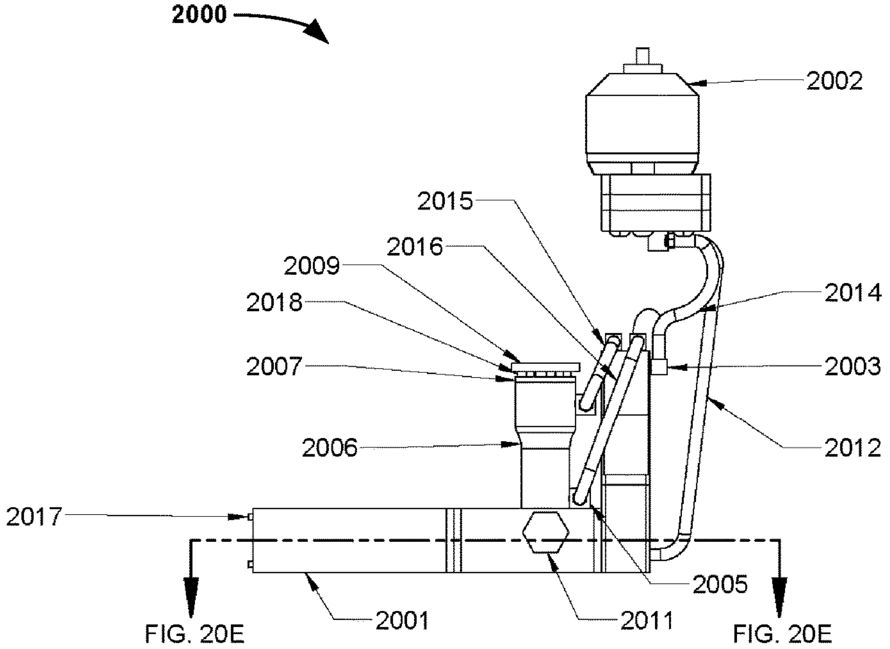
Figure 20E:
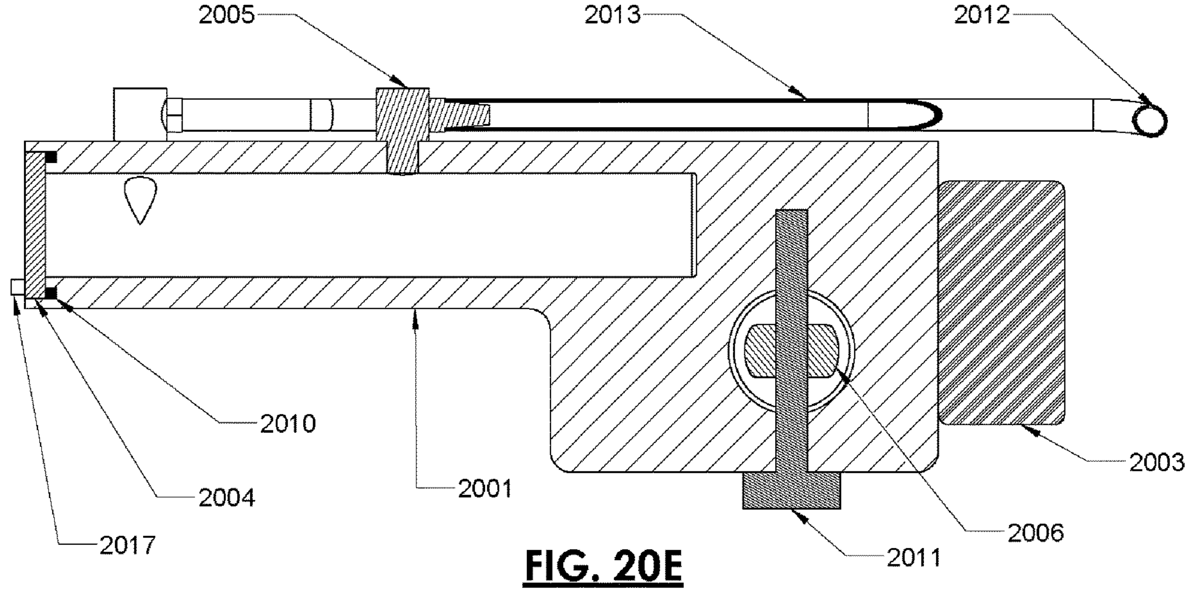
Figure 20G:
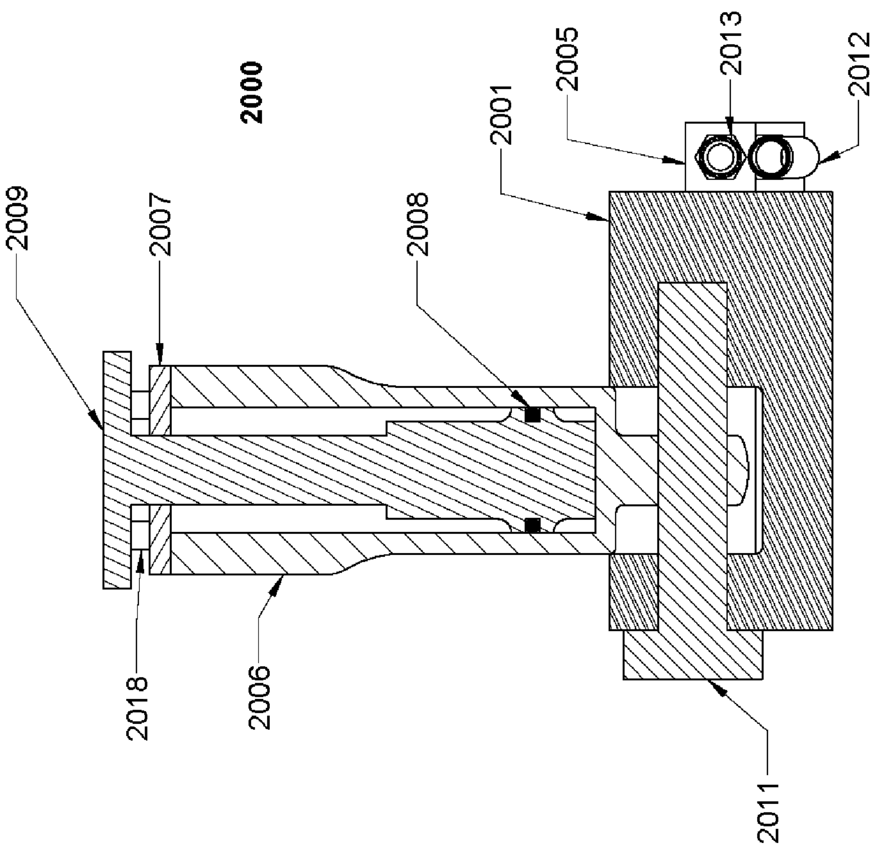
Figure 20F:
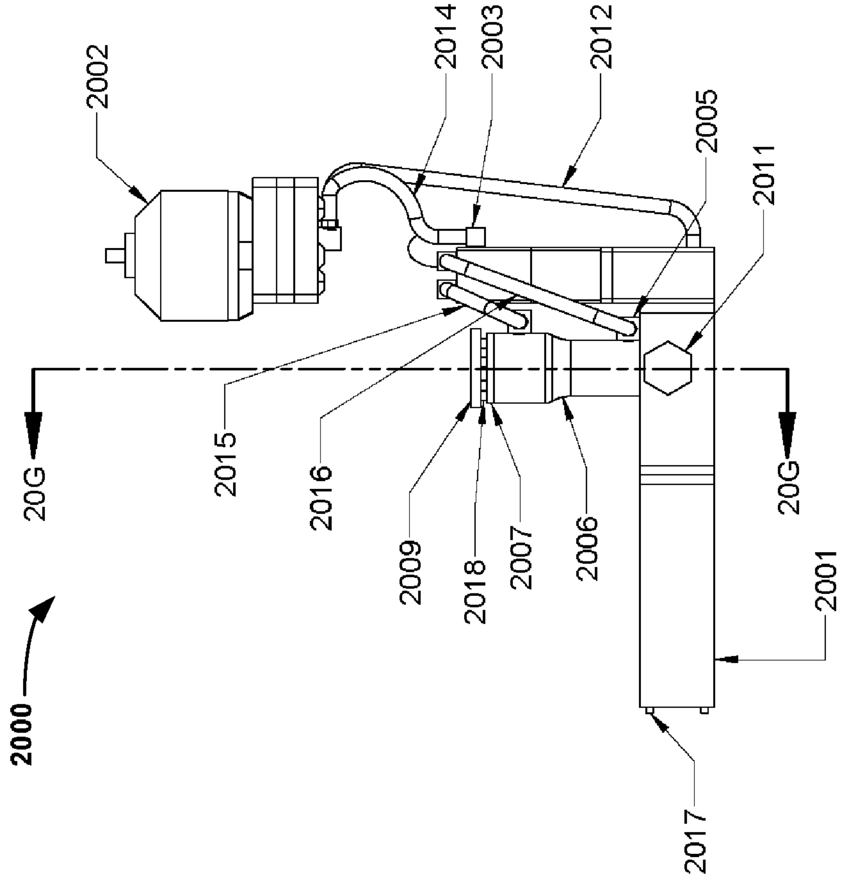

FIGS. 20A-20G illustrate an example hydraulic assembly for a personal vaporizing unit. FIG. 20A is a first isometric view of a hydraulic assembly 2000. FIG. 20B is a second isometric view of a hydraulic assembly 2000. FIG. 20C is an exploded view of hydraulic assembly 2000. FIG. 20D is a side view of hydraulic assembly 2000 that also illustrated the cutline of FIG. 20E. FIG. 20E is a cross-section of pneumatic assembly 2000 along the cutline illustrated in FIG. 20D. FIG. 20F is a side view of hydraulic assembly 2000 that also illustrated the cutline of FIG. 20G. FIG. 20G is a cross-section of pneumatic assembly 2000 along the cutline illustrated in FIG. 20F.

In FIG. 20A, the parts of hydraulic assembly 2000 illustrated include hydraulic tank 2001, hydraulic pump 2002, directional control valve 2003, hydraulic tank cover 2004, fitting 2005, piston body 2006, piston body cover 2007, piston head 2009, bolt 2011, tank outlet rubber tubing 2012, piston down inlet-outlet rubber tubing 2015, piston up inlet-outlet rubber tubing, socket head screw 2017, and socket head screw 2018. In FIG. 20B, the parts of hydraulic assembly 2000 illustrated include hydraulic tank 2001, hydraulic pump 2002, directional control valve 2003, hydraulic tank cover 2004, fitting 2005, piston body 2006, piston body cover 2007, piston head 2009, bolt 2011, tank outlet rubber tubing 2012, piston down inlet-outlet rubber tubing 2015, piston up inlet-outlet rubber tubing 2016, and socket head screw 2018. In FIG. 20C, the parts of hydraulic assembly 2000 illustrated include hydraulic tank 2001, hydraulic pump 2002, directional control valve 2003, hydraulic tank cover 2004, fitting 2005, piston body 2006, piston body cover 2007, rubber seal 2008, piston head 2009, rubber seal 2010, bolt 2011, tank outlet rubber tubing 2012, tank inlet rubber tubing 2013, pump outlet rubber tubing 2014, piston down inlet-outlet rubber tubing 2015, piston up inlet-outlet rubber tubing 2016, socket head screw 2017, and socket head screw 2018. In FIG. 20D, the parts of hydraulic assembly 2000 illustrated include hydraulic tank 2001, hydraulic pump 2002, directional control valve 2003, fitting 2005, piston body 2006, piston body cover 2007, piston head 2009, rubber seal 2010, bolt 2011, tank outlet rubber tubing 2012, pump outlet rubber tubing 2014, piston down inlet-outlet rubber tubing 2015, piston up inlet-outlet rubber tubing 2016, socket head screw 2017, and socket head screw 2018. In FIG. 20E, the parts of hydraulic assembly 2000 illustrated include hydraulic tank 2001, directional control valve 2003, hydraulic tank cover 2004, fitting 2005, piston body 2006, rubber seal 2010, bolt 2011, tank outlet rubber tubing 2012, tank inlet rubber tubing 2013, and socket head screw 2017. In FIG. 20F, the parts of hydraulic assembly 2000 illustrated include hydraulic tank 2001, hydraulic pump 2002, directional control valve 2003, fitting 2005, piston body 2006, piston body cover 2007, piston head 2009, rubber seal 2010, bolt 2011, tank outlet rubber tubing 2012, pump outlet rubber tubing 2014, piston down inlet-outlet rubber tubing 2015, piston up inlet-outlet rubber tubing 2016, socket head screw 2017, and socket head screw 2018. In FIG. 20G, the parts of hydraulic assembly 2000 illustrated include hydraulic tank 2001, fitting 2005, piston body 2006, piston body cover 2007, rubber seal 2008, piston head 2009, bolt 2011, tank outlet rubber tubing 2012, tank inlet rubber tubing 2013, and socket head screw 2018.

Figure 21A:
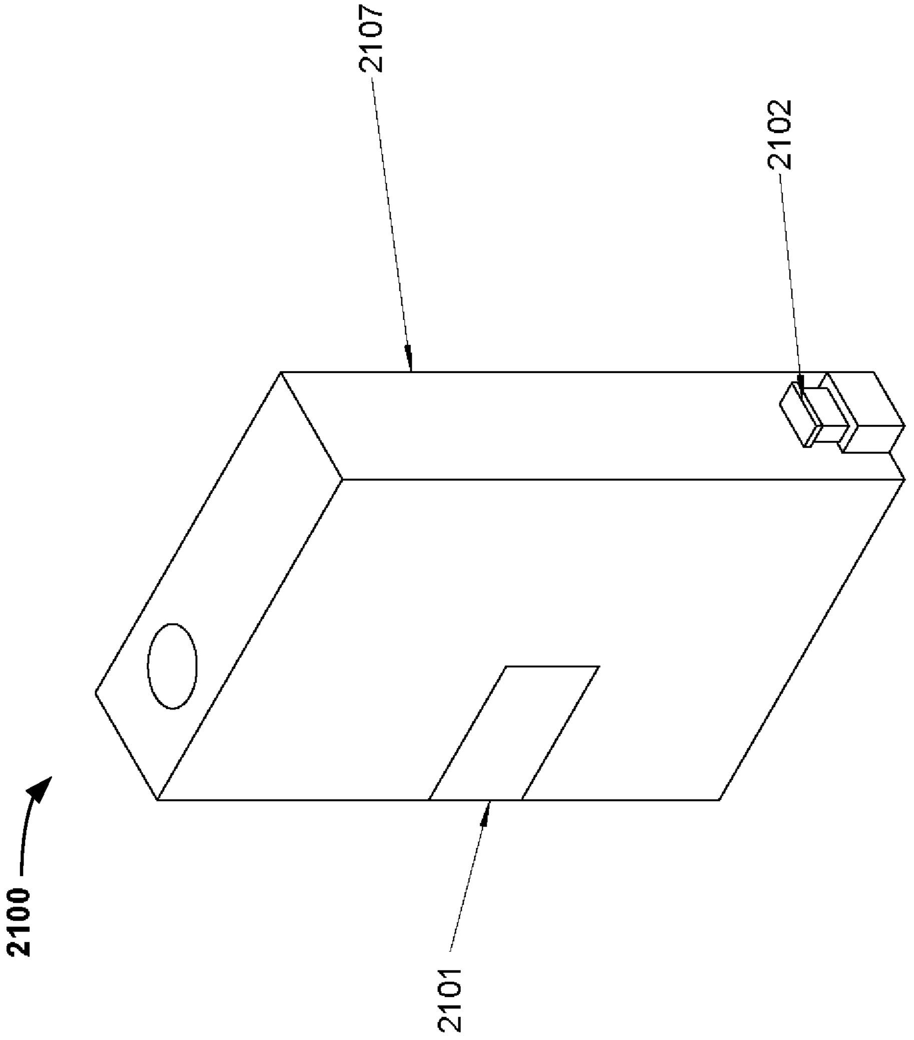
FIGS. 21A-21D illustrate an example charging and filling case for a personal vaporizing unit.
Figure 21B:
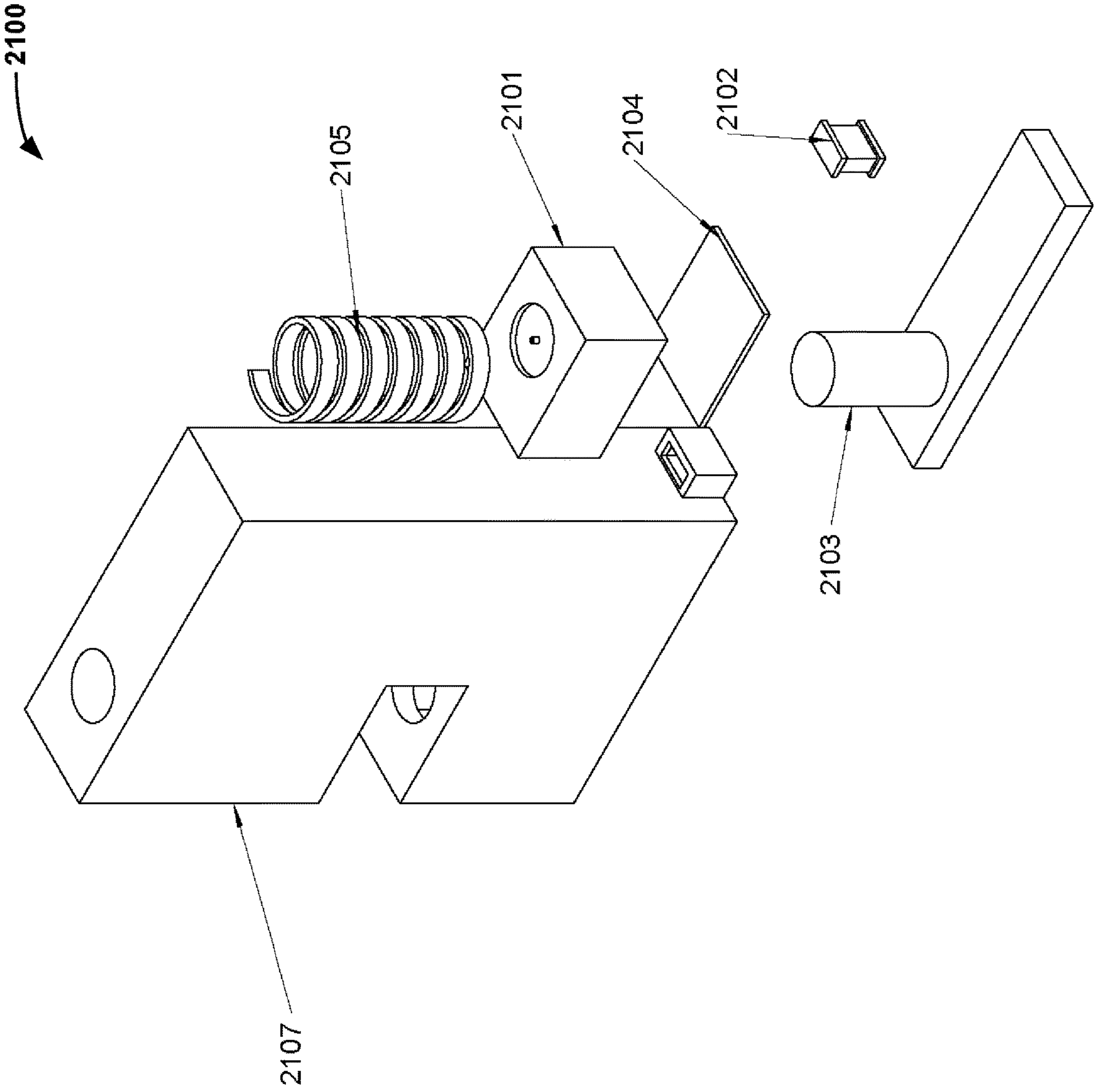
Figure 21D:
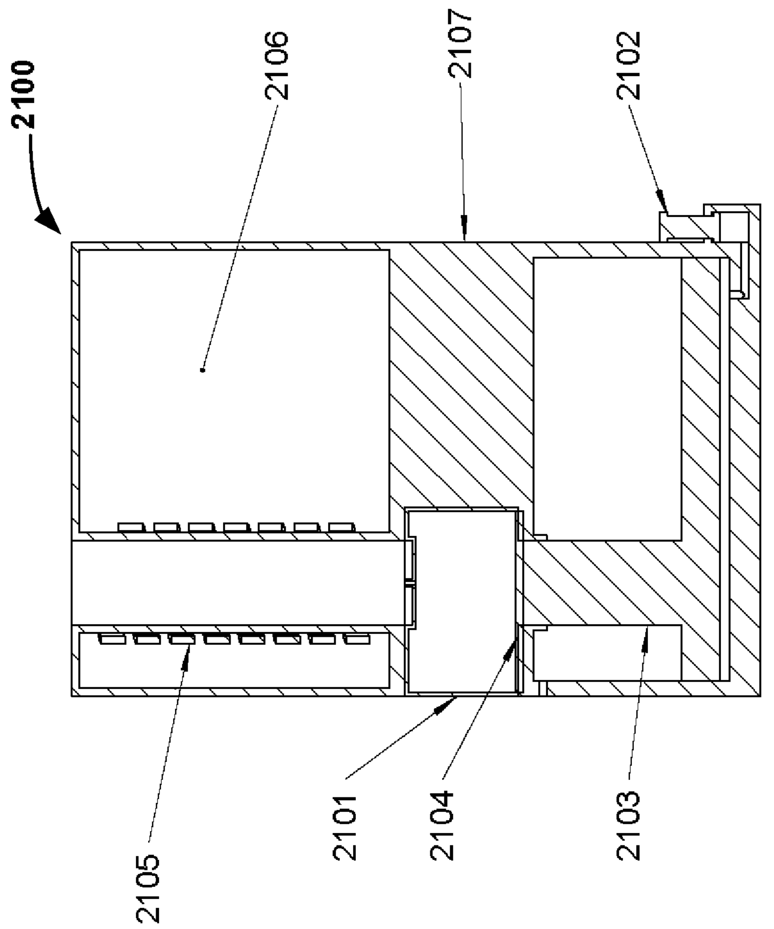
Figure 21C:
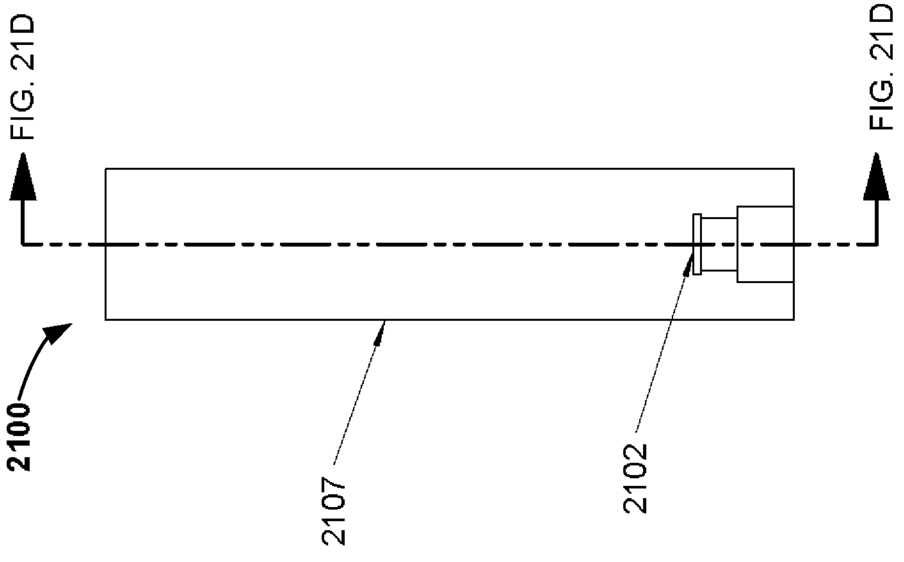

FIGS. 21A-21D illustrate an example charging and filling case for a personal vaporizing unit. FIG. 21A is an isometric view of the example charging and filling case. FIG. 21B is a first exploded view of the charging and filling case. FIG. 21C is a side view of the charging and filling case that also illustrates the cut line of FIG. 21D. FIG. 21D is a cross-section of the charging and filling case along the cutline illustrated in FIG. 21C.

In FIG. 21A, the parts of charging and filling case 2100 illustrated include refillable oil cartridge 2101, hydraulic press button 2102, and housing 2107. In FIG. 21B, the parts of charging and filling case 2100 illustrated include refillable oil cartridge 2101, hydraulic press button 2102, hydraulic piston 2103, pressure plate 2104, charging coil 2105, and housing 2107. In FIG. 21C, the parts of charging and filling case 2100 illustrated include refillable oil cartridge 2101, hydraulic press button 2102, and housing 2107. In FIG. 21D, the parts of charging and filling case 2100 illustrated include refillable oil cartridge 2101, hydraulic press button 2102, hydraulic piston 2103, pressure plate 2104, charging coil 2105, battery pack housing 2106, and housing 2107.

Figure 22A:
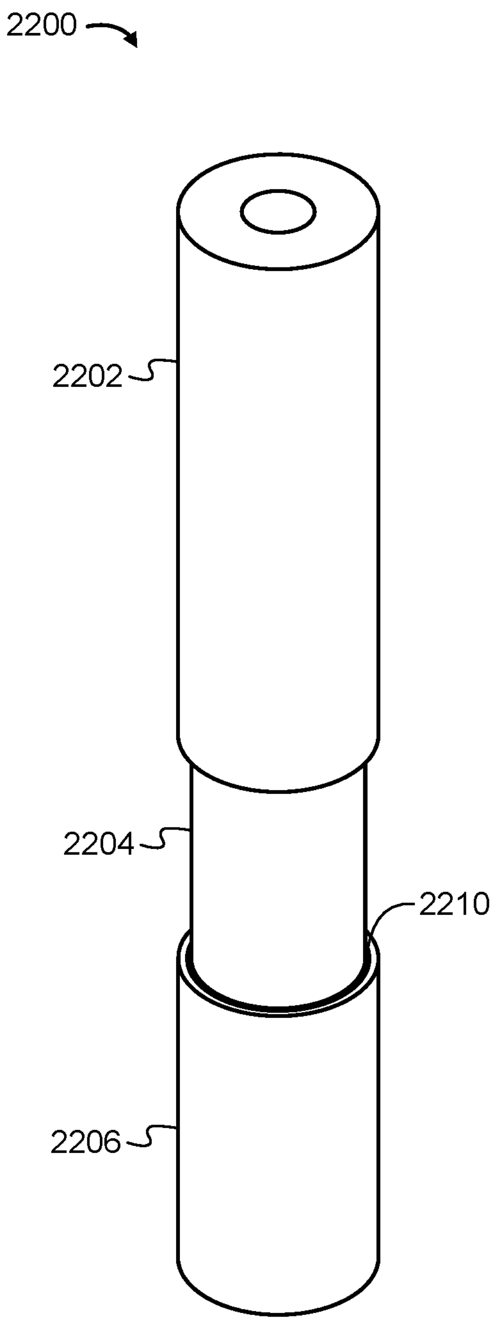
FIGS. 22A-22F illustrate an example chargeable and fillable personal vaporizing unit.
Figure 22B:
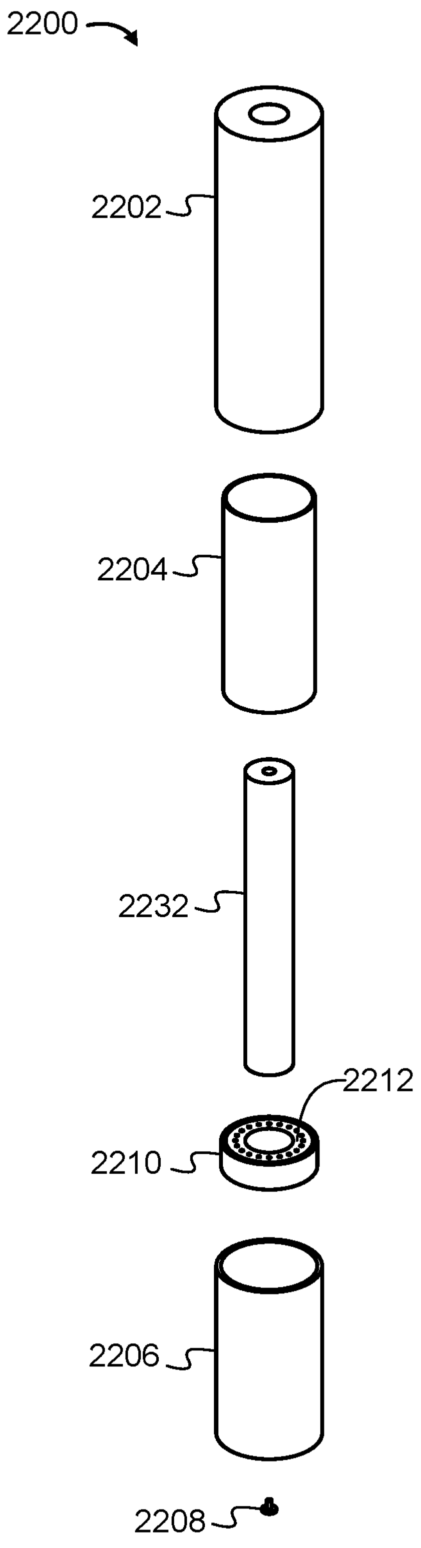
Figure 22C:
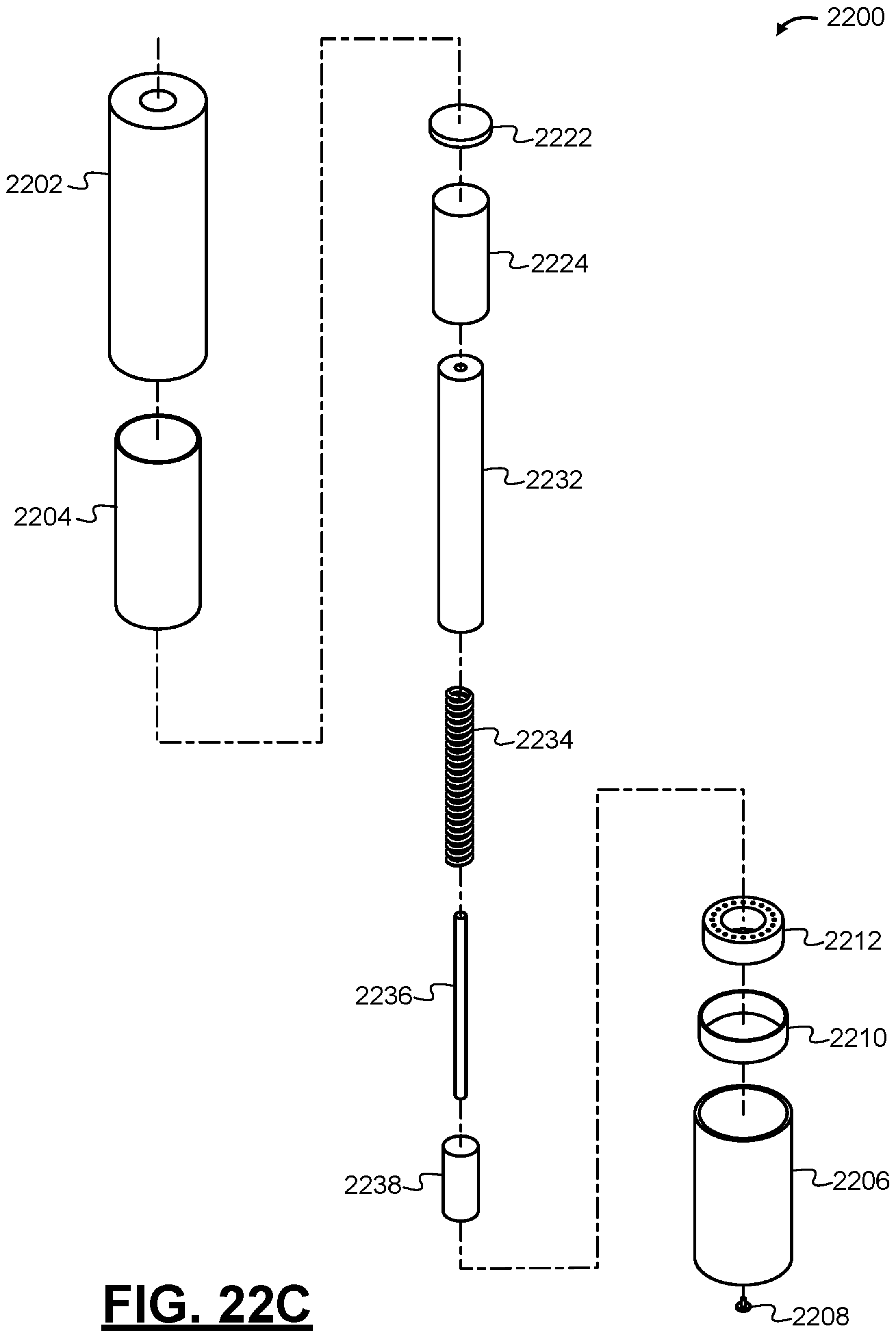
Figure 22D:
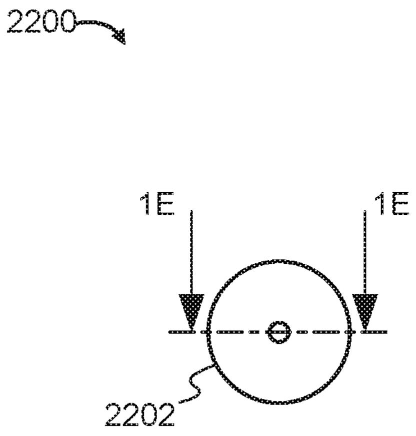
Figure 22E:
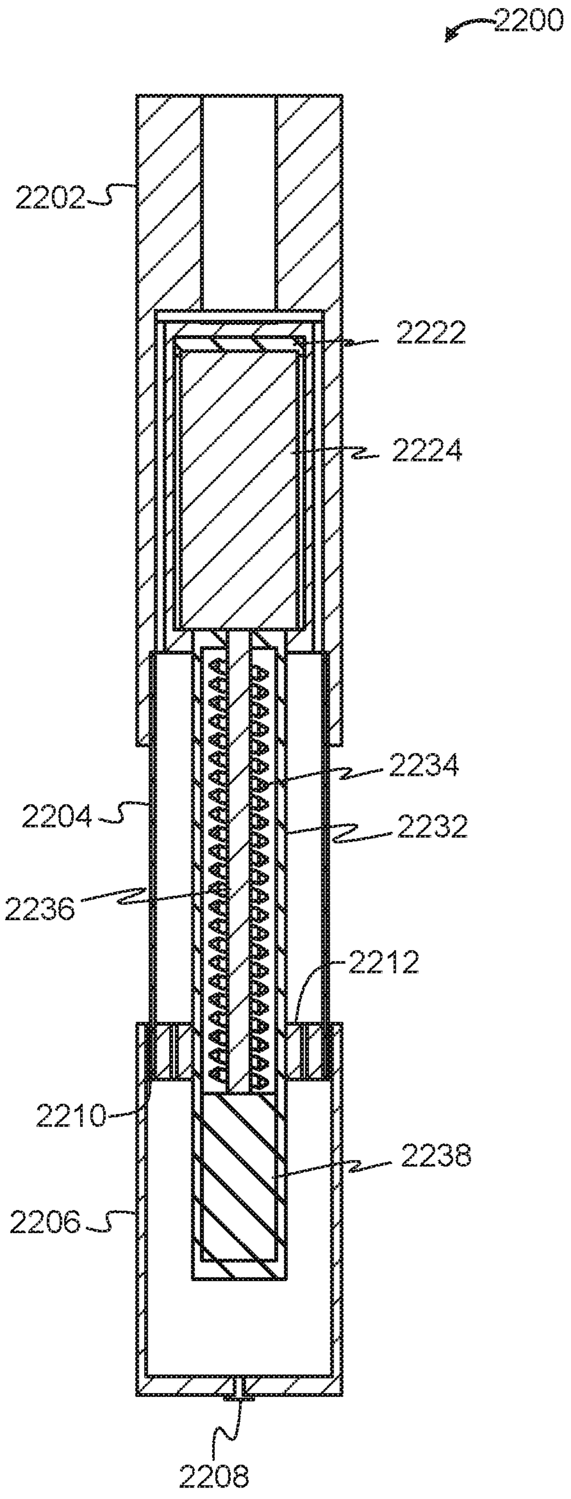
Figure 22F:
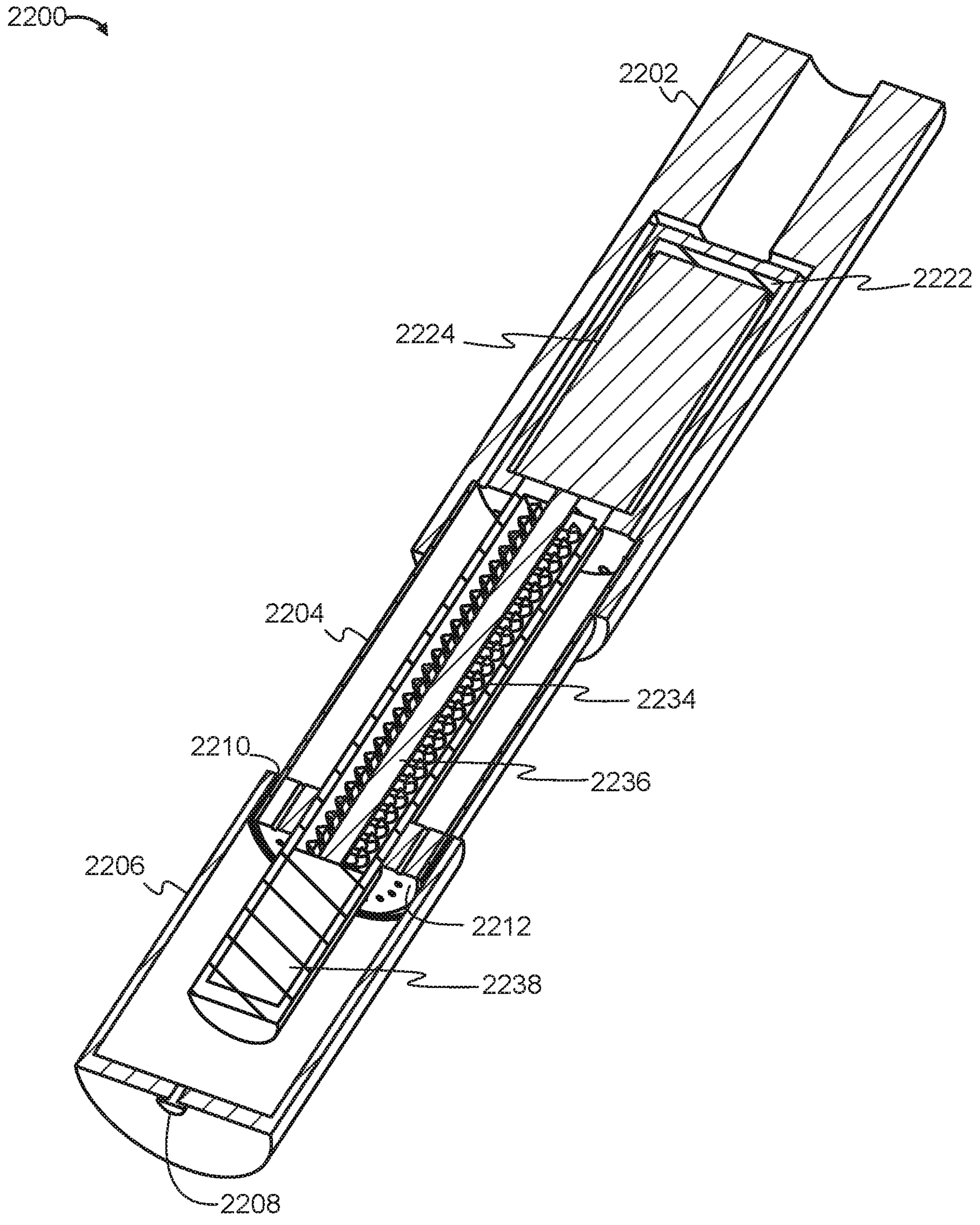

FIGS. 22A-22F illustrate an example personal vaporizing unit. FIG. 22A is an isometric view of the example personal vaporizing unit (PVU). FIG. 22B is a first exploded view of the PVU. FIG. 22C is a second exploded view of the PVU. FIG. 22D is an end view of the PVU that also illustrates the cut line of FIG. 22D. FIG. 22E is a cross-section of the PVU along the cutline illustrated in FIG. 22D. FIG. 22F is an isometric cross-section of the PVU along the cutline illustrated in FIG. 22D.

In FIG. 22A, the parts of vaporizing unit 2200 illustrated include mouthpiece 2202, top outer glass tube 2204, bottom outer glass tube 2206, and air intake outer tube 2210. In FIG. 22B, the parts of vaporizing unit 2200 illustrated include mouthpiece 2202, top outer glass tube 2204, bottom outer glass tube 2206, plug 2208, air intake outer tube 2210, air intake inner tube 2212, and inner glass tube 2232. In FIG. 22C, the parts of vaporizing unit 2200 illustrated include mouthpiece 2202, top outer glass tube 2204, bottom outer glass tube 2206, plug 2208, air intake outer tube 2210, air intake inner tube 2212, capacitor base 2222, ultracapacitor 2224, inner glass tube 2232, coil 2234, inner metal rod 2236, and iron target 2238. In FIG. 22D, the parts of vaporizing unit 2200 illustrated include mouthpiece 2202. In FIG. 22E, the parts of vaporizing unit 2200 illustrated include mouthpiece 2202, top outer glass tube 2204, bottom outer glass tube 2206, plug 2208, air intake outer tube 2210, air intake inner tube 2212, capacitor base 2222, ultracapacitor 2224, inner glass tube 2232, coil 2234, inner metal rod 2236, and iron target 2238. In FIG. 22F, the parts of vaporizing unit 2200 illustrated include mouthpiece 2202, top outer glass tube 2204, bottom outer glass tube 2206, plug 2208, air intake outer tube 2210, air intake inner tube 2212, capacitor base 2222, ultracapacitor 2224, inner glass tube 2232, coil 2234, inner metal rod 2236, and iron target 2238.

Figure 23A:
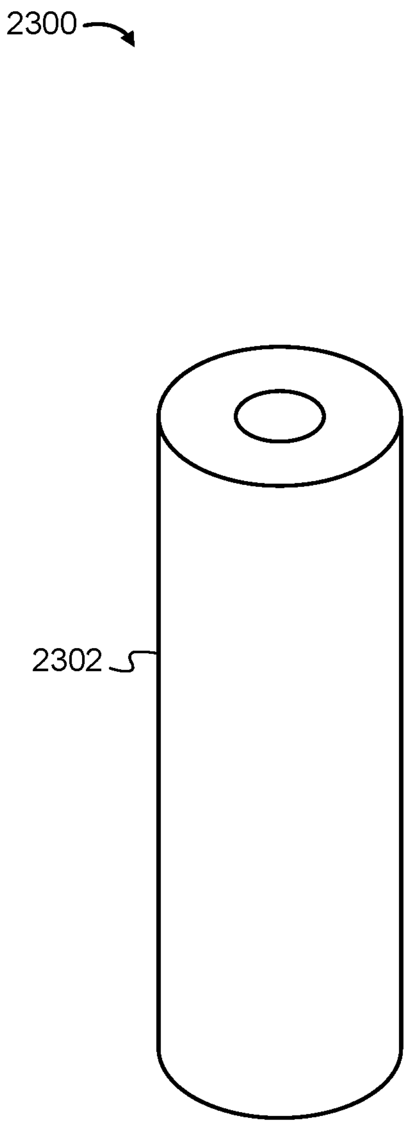
FIGS. 23A-23E illustrate an example mouthpiece assembly for a personal vaporizing unit.
Figure 23B:
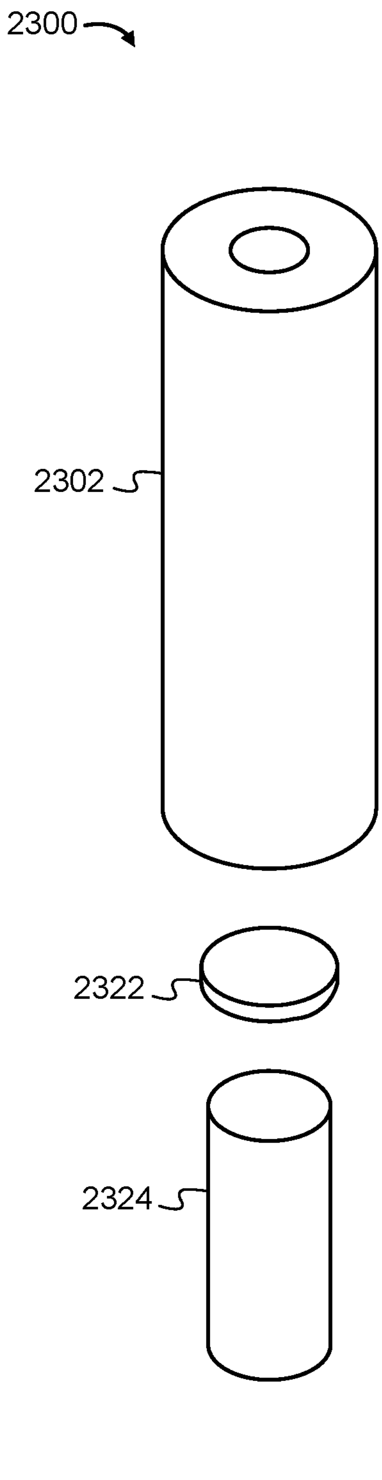
Figure 23C:
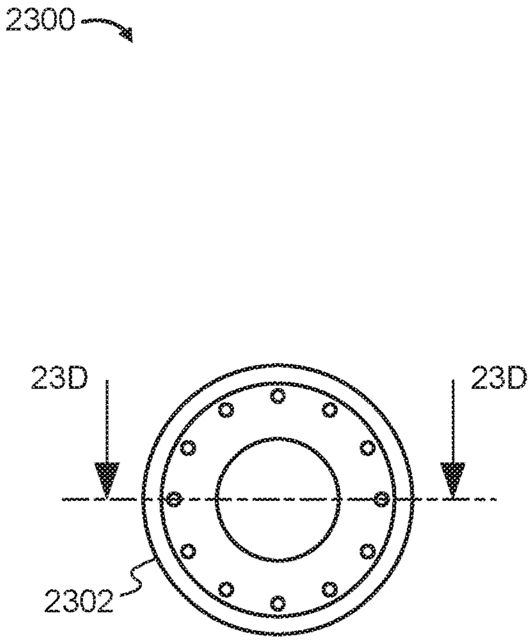
Figure 23D:
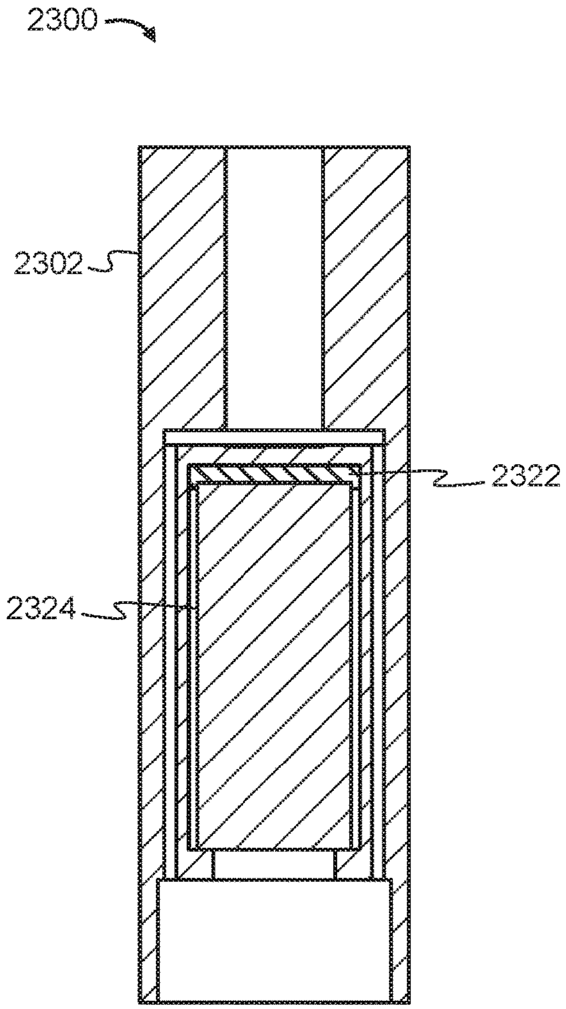
Figure 23E:
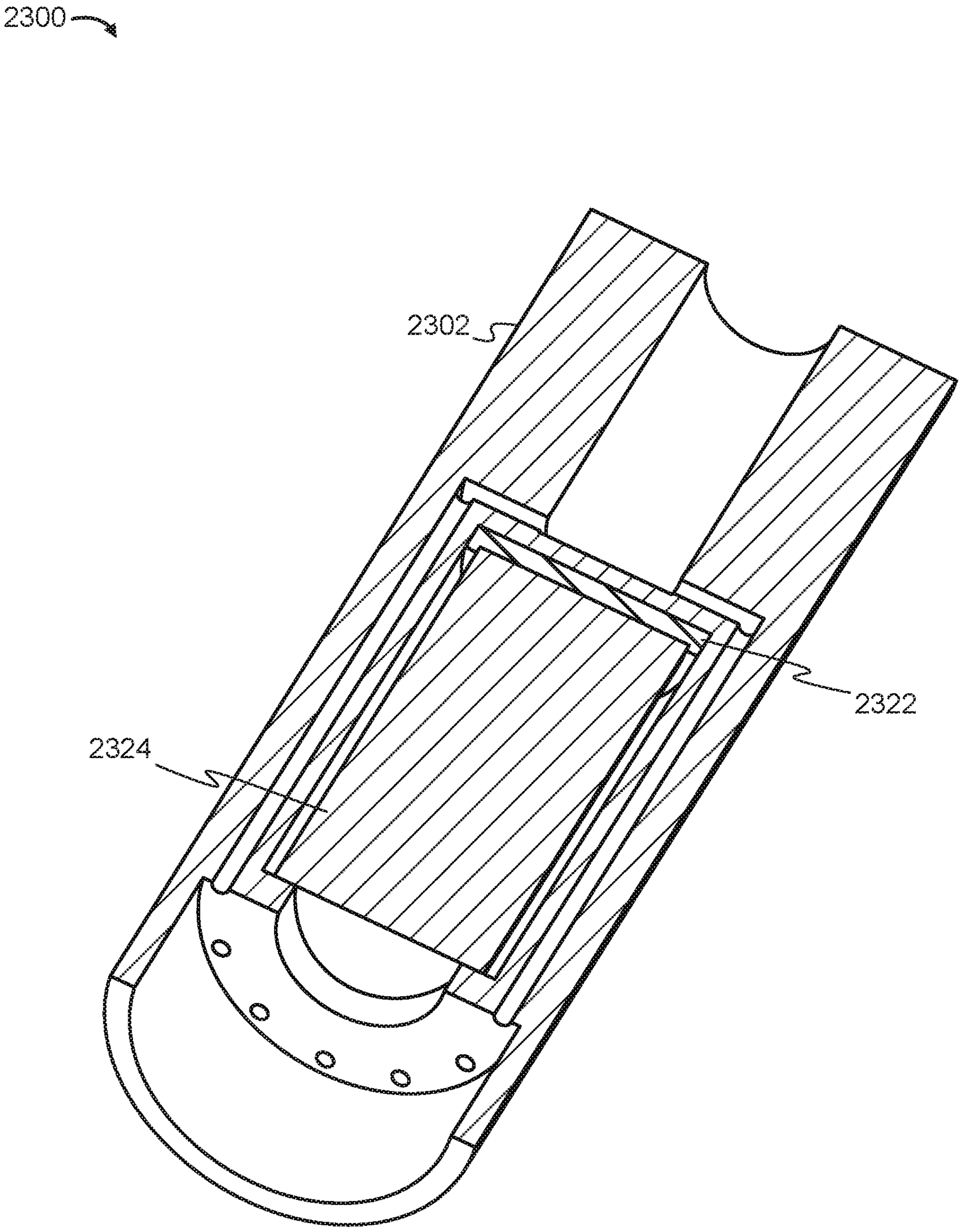

FIGS. 23A-23E illustrate an example mouthpiece assembly for a personal vaporizing unit. Mouthpiece assembly 2300 may be an example of the parts in and/or near mouthpiece 2202 illustrated in FIGS. 22A-22F. FIG. 23A is an isometric view of a mouthpiece assembly 2300. FIG. 23B is a first exploded view of mouthpiece assembly 2300. FIG. 23C is an end view of mouthpiece assembly 2300 that also illustrates the cut line of FIG. 23D. FIG. 23D is a cross-section of mouthpiece assembly along the cutline illustrated in FIG. 23C. FIG. 23E is an isometric cross-section of mouthpiece assembly along the cutline illustrated in FIG. 23C.

In FIG. 23A, the parts of mouthpiece assembly 2300 illustrated include mouthpiece 2302. In FIG. 23B, the parts of mouthpiece assembly 2300 illustrated include mouthpiece 2302, capacitor base 2322, and ultracapacitor 2304. In FIG. 23C, the parts of mouthpiece assembly 2300 illustrated include mouthpiece 2302. In FIG. 23D, the parts of mouthpiece assembly 2300 illustrated include mouthpiece 2302, capacitor base 2322, and ultracapacitor 2304. In FIG. 23E, the parts of mouthpiece assembly 2300 illustrated include mouthpiece 2302, capacitor base 2322, and ultracapacitor 2304.

Figure 24A:
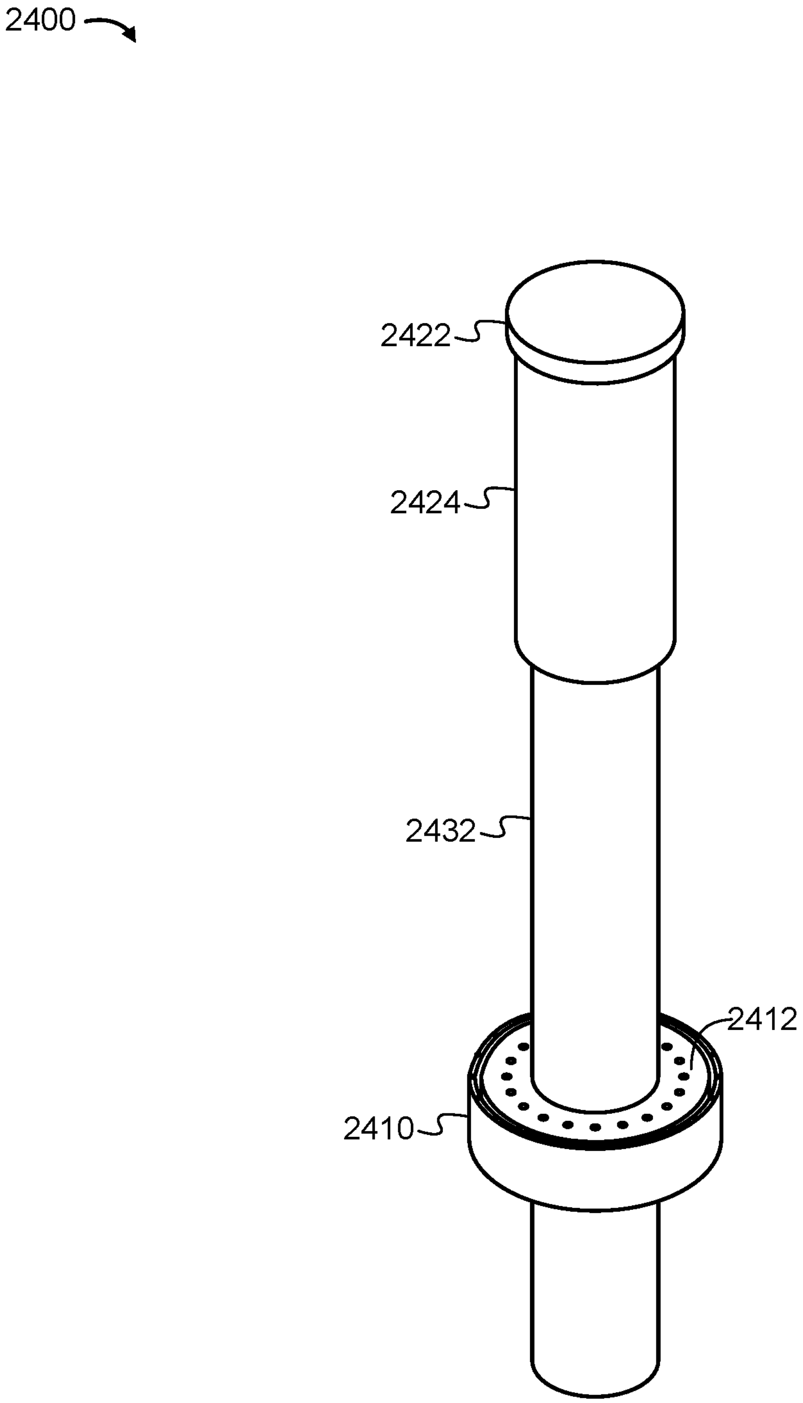
FIGS. 24A-24E illustrate an example heater assembly for a personal vaporizing unit.
Figure 24B:
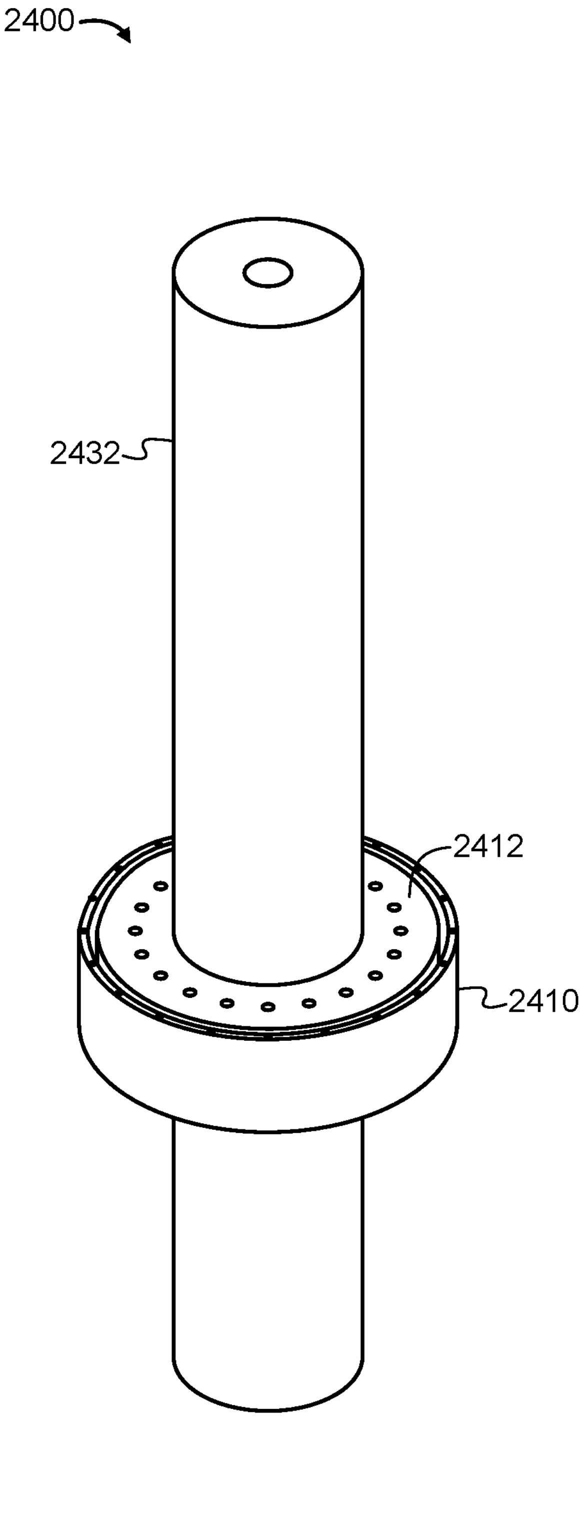
Figure 24C:
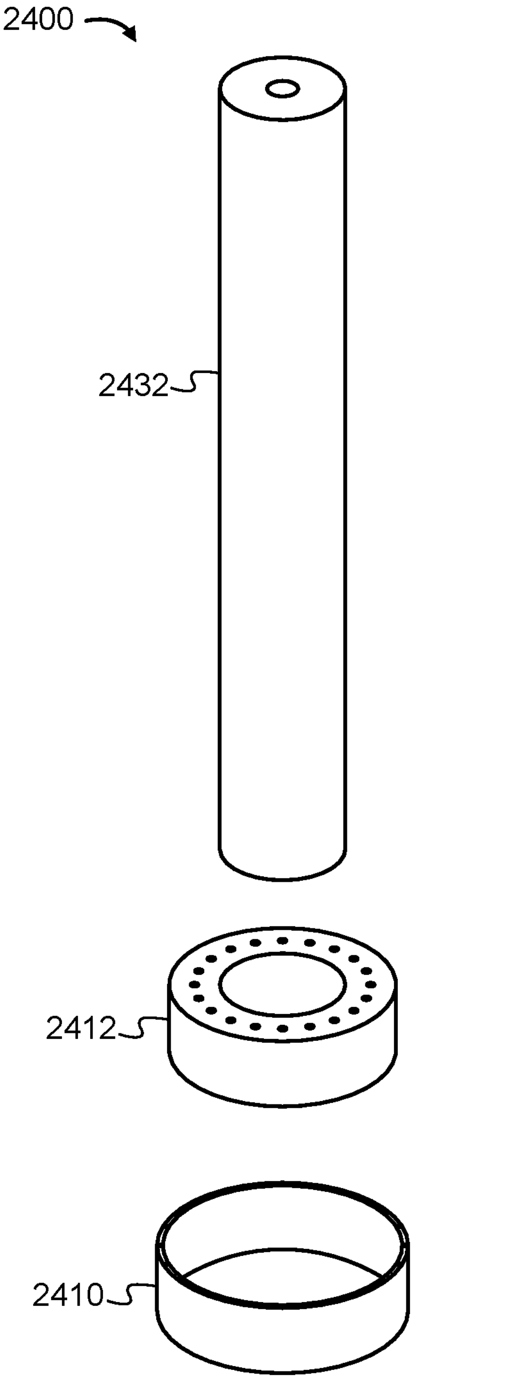
Figure 24D:
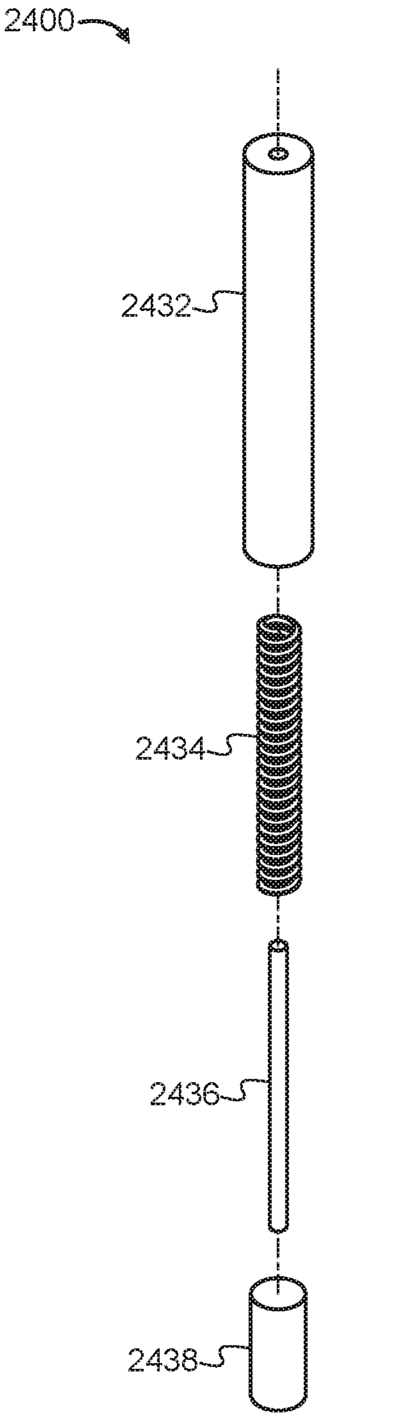
Figure 24E:
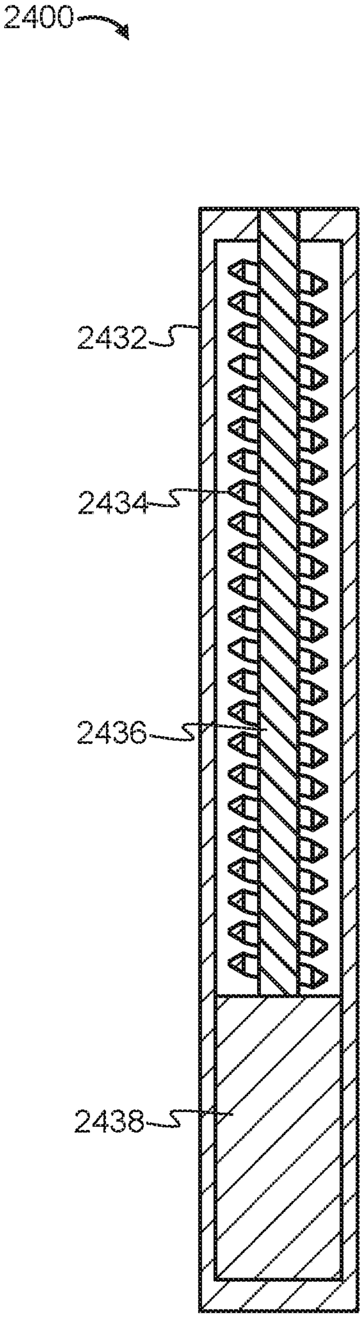

FIGS. 24A-24E illustrate an example heater assembly for a personal vaporizing unit. Heater assembly 2400 may be an example of components that are, or are in the vicinity of coil 2234, inner metal rod 2236, and iron target 2238 illustrated in FIGS. 22A-22F. FIG. 24A is an isometric view of a heater assembly 2400. FIG. 24B is an isometric view of heater assembly 2400 without the capacitor related components. FIG. 24C isometric view of heater assembly 2400 without the capacitor related components. FIG. 24D is an exploded view of the components that are, or are disposed inside inner glass tube 2432. FIG. 24E is cross-section of cartridge along a plane that passes through the axial centerline of inner glass tube 2432.

In FIG. 24A, the parts of heater assembly 2400 illustrated include air intake outer tube 2410, air intake inner tube 2412, capacitor base 2122, ultracapacitor 2424, and inner glass tube 2432. In FIG. 24B, the parts of heater assembly 2400 illustrated include air intake outer tube 2410, air intake inner tube 2412, and inner glass tube 2432. In FIG. 24C, the parts of heater assembly 2400 illustrated include air intake outer tube 2410, air intake inner tube 2412, and inner glass tube 2432. In FIG. 24D, the parts of heater assembly 2400 illustrated include inner glass tube 2432, coil 2434, inner metal rod 2436, and iron target 2438. In FIG. 24E, the parts of heater assembly 2400 illustrated include inner glass tube 2432, coil 2434, inner metal rod 2436, and iron target 2438.

Figure 25C:
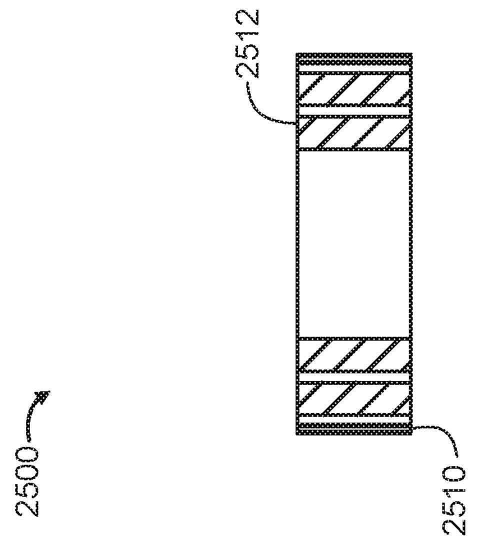
FIGS. 25A-25H illustrate an example air intake assembly for a personal vaporizing unit.
Figure 25B:
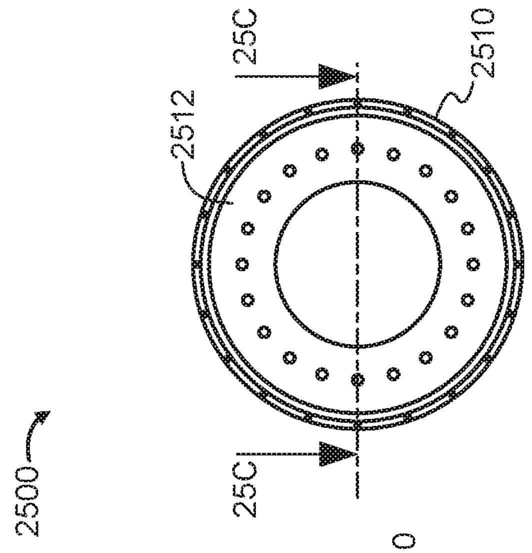
Figure 25A:
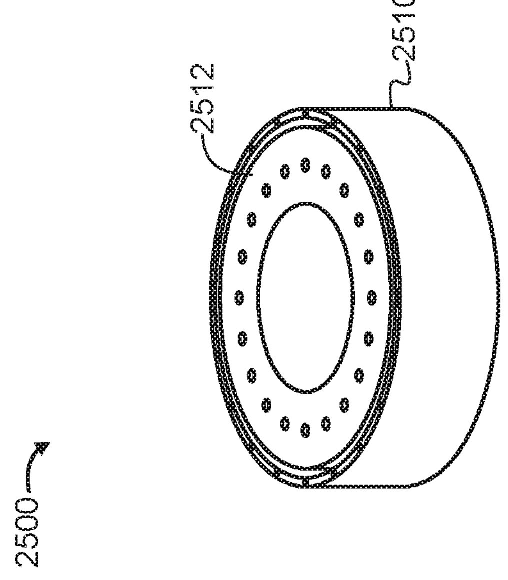
Figure 25D:
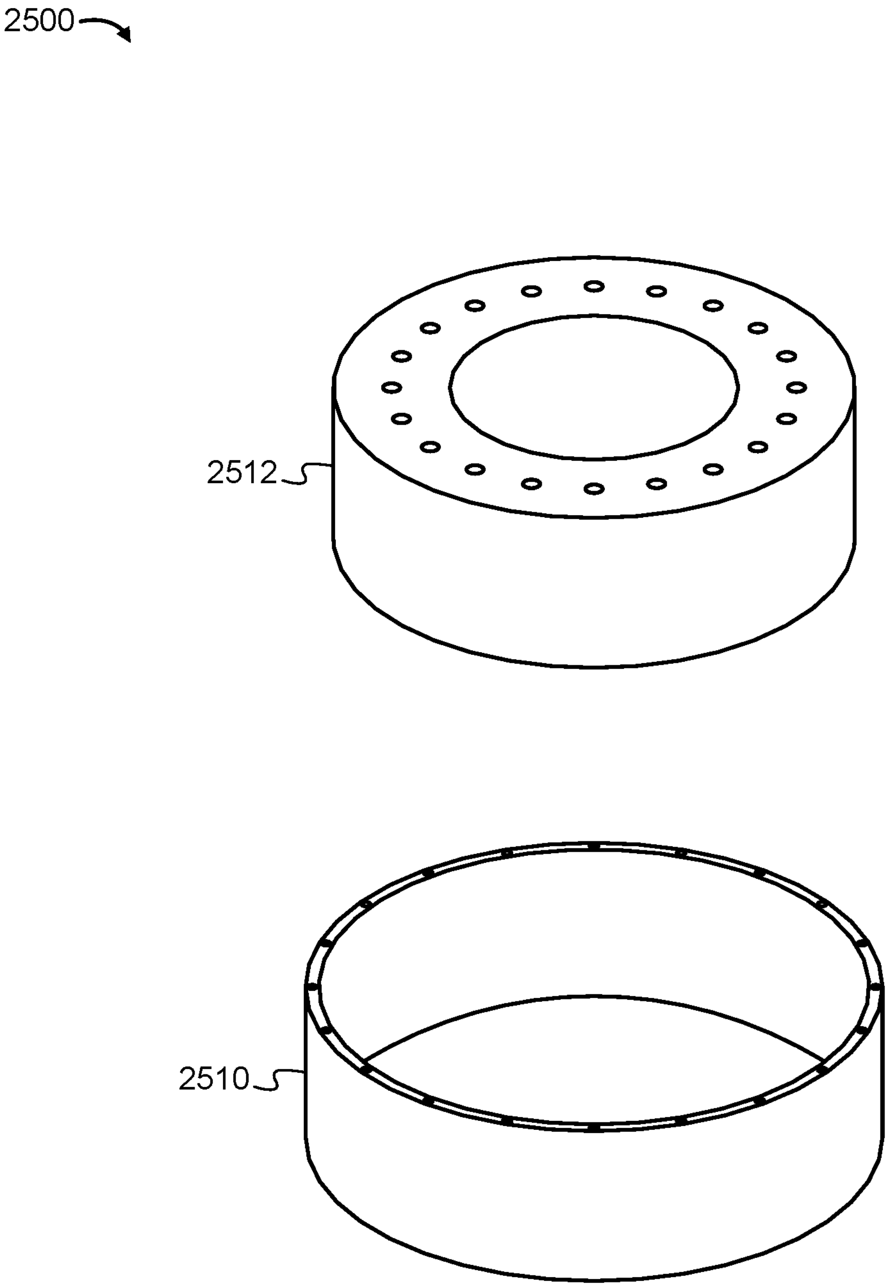
Figure 25E:
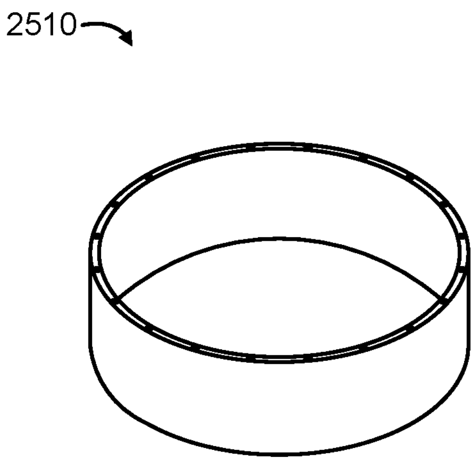
Figure 25G:
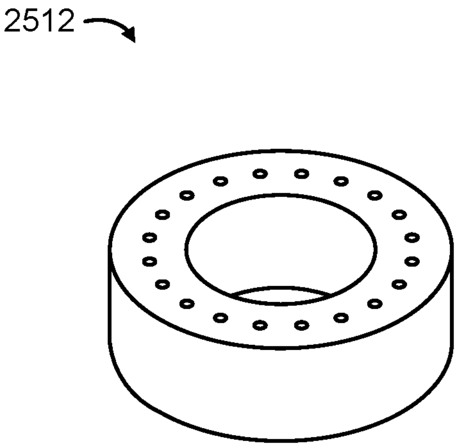
Figure 25F:
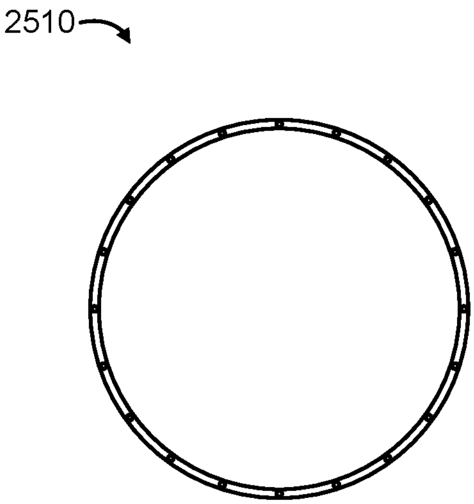
Figure 25H:
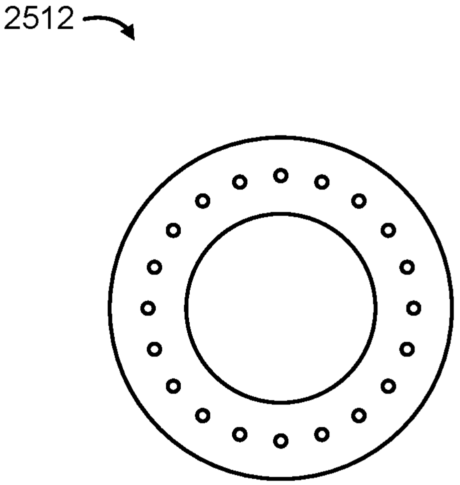

FIGS. 25A-25E illustrate an example air intake assembly for a personal vaporizing unit. Air intake assembly 2500 may be an example of components that are, or are in the vicinity of air intake outer tube 2210 and air intake inner tube 2232 illustrated in FIGS. 22A-22F. FIG. 25A is an isometric view of air intake assembly 2500. FIG. 25B is an end view of air intake assembly 2500 that also illustrates the cut line of FIG. 25B. FIG. 25C is a cross-section of mouthpiece assembly along the cutline illustrated in FIG. 21B. FIG. 25D is an isometric exploded view of the components that are, or are disposed inside air intake outer tube 2510. FIG. 25E is an isometric view of air intake outer tube 2510. FIG. 25F is an end view of air intake outer tube 2510. FIG. 25G is an isometric view of air intake inner tube 2512. FIG. 25H is an end view of air intake inner tube 2512.

In FIGS. 25A-25D, the parts of air intake assembly 2500 illustrated include air intake outer tube 2510, and air intake inner tube 2512. In FIGS. 25E-25F the parts of air intake assembly 2500 illustrated include air intake outer tube 2510. In FIGS. 25G-25H the parts of air intake assembly 2500 illustrated include air intake inner tube 2512.

Figure 26:
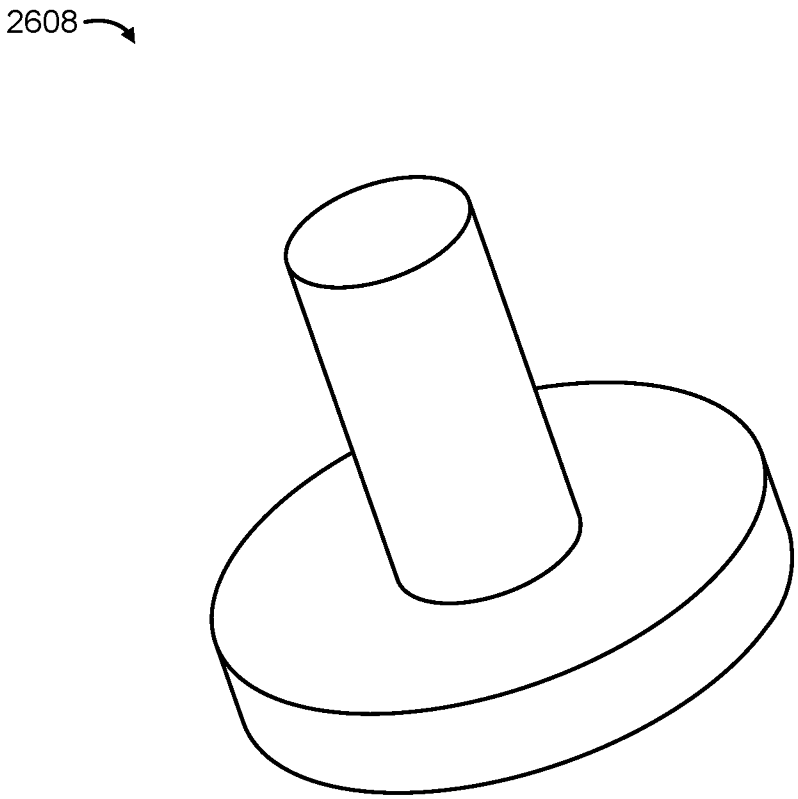
FIG. 26 illustrates an example plug.

FIG. 26 illustrates an example plug for a personal vaporizing unit. Plug 2408 may be an example of plug 2208 illustrated in FIGS. 22A-22F. FIG. 24 is an isometric view of plug 2408.

Figure 27:
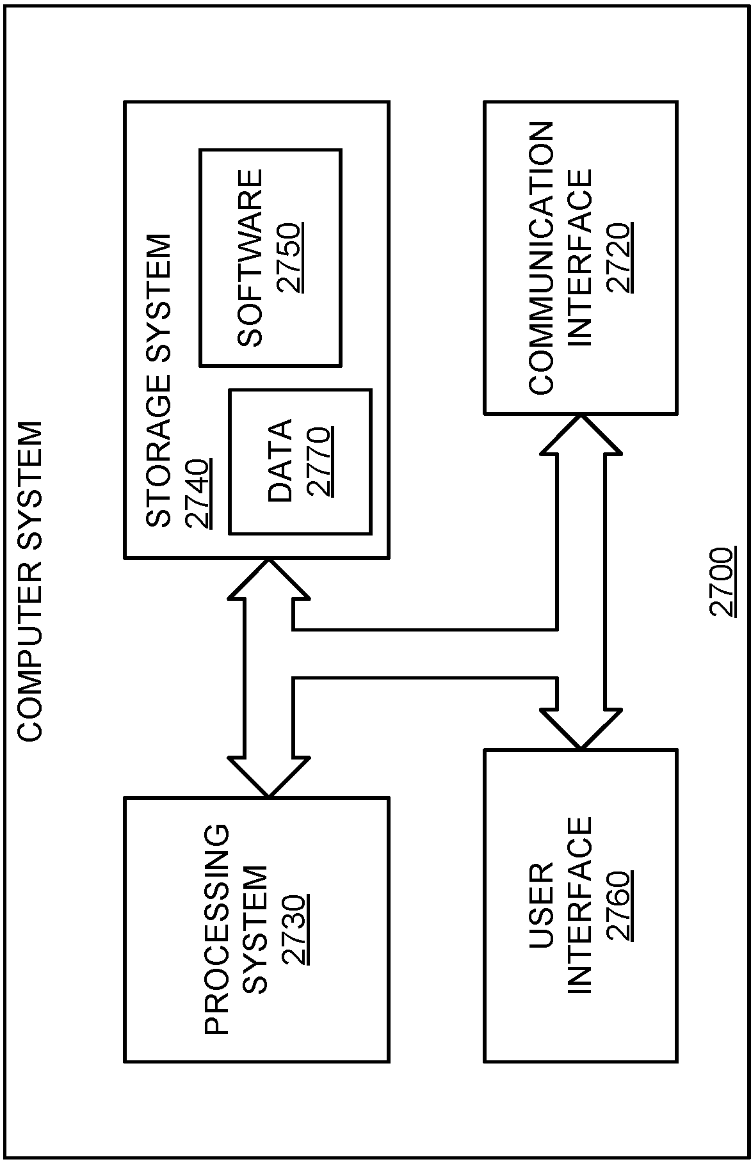
FIG. 27 is a block diagram of a computer system.

FIG. 27 illustrates a block diagram of a computer system. Electronics that modulate or control parts of a vaporizing unit may be or include computer a computer system. For example, electronics on PCB assembly 734 and/or PCB assembly 1100 that receive inputs from displacement sensors (e.g., button displacement sensor 565 and/or plunger displacement sensor 575), temperature sensors, and/or control LEDs, inductive heating coils, and/or heating coils may be or comprise a computer system. Computer software may implement one or more of the control functions and/or display functions described herein. Computer system 2700 includes communication interface 2720, processing system 2730, storage system 2740, and user interface 2760. Processing system 2730 is operatively coupled to storage system 2740. Storage system 2740 stores software 2750 and data 2770. Processing system 2730 is operatively coupled to communication interface 2720 and user interface 2760. Computer system 2700 may comprise a programmed general-purpose computer. Computer system 2700 may include a microprocessor. Computer system 2700 may comprise programmable or special purpose circuitry. Computer system 2700 may be distributed among multiple devices, processors, storage, and/or interfaces that together comprise elements 2720-2070.

Communication interface 2720 may comprise a network interface, modem, port, bus, link, transceiver, or other communication device. Communication interface 2720 may be distributed among multiple communication devices. Processing system 2730 may comprise a microprocessor, microcontroller, logic circuit, or other processing device. Processing system 2730 may be distributed among multiple processing devices. User interface 2760 may comprise a keyboard, mouse, voice recognition interface, microphone and speakers, graphical display, touch screen, or other type of user interface device. User interface 2760 may be distributed among multiple interface devices. Storage system 2740 may comprise a disk, tape, integrated circuit, RAM, ROM, EEPROM, flash memory, network storage, server, or other memory function. Storage system 2740 may include computer readable medium. Storage system 2740 may be distributed among multiple memory devices.

Processing system 2730 retrieves and executes software 2750 from storage system 2740. Processing system 2730 may retrieve and store data 2770. Processing system 2730 may also retrieve and store data via communication interface 2720. Processing system 2730 may create or modify software 2750 or data 2770 to achieve a tangible result. Processing system 2730 may control communication interface 2720 or user interface 2760 to achieve a tangible result. Processing system may retrieve and execute remotely stored software via communication interface 2720.

Software 2750 and remotely stored software may comprise an operating system, utilities, drivers, networking software, and other software typically executed by a computer system. Software 2750 may comprise an application program, applet, firmware, or other form of machine-readable processing instructions typically executed by a computer system. When executed by processing system 2730, software 2750 or remotely stored software may direct computer system 2700 to operate.

Implementations discussed herein include, but are not limited to, the following examples:

Example 1: A personal vaporizing unit, comprising: a capillary channel having a first end, a middle portion, and a second end, the first end configured to receive, under pressure, a fluid to be vaporized, the second end configured to expel the fluid as a heated aerosol; a low-pressure chamber to receive the heated aerosol; an infrared light source to irradiate the heated aerosol; an ultraviolet light source to irradiate the heated aerosol; and, an exit port to evacuate the heated aerosol after being irradiated by the infrared light source and the ultraviolet light source.

Example 2: The personal vaporizing unit of example 1, wherein the fluid is pressurized by a spring actuated plunger.

Example 3: The personal vaporizing unit of example 1, wherein the capillary channel is to be heated at least along the middle portion.

Example 4: The personal vaporizing unit of example 3, wherein the capillary channel is formed in a glass substrate.

Example 5: The personal vaporizing unit of example 4, wherein the glass substrate is substantially surrounded by an inductive target material configured to be heated via induction heating.

Example 6: The personal vaporizing unit of example 5, further comprising:

a thermally conductive interface material between the glass substrate and the electrically conductive material.

Example 7: The personal vaporizing unit of example 2, wherein the spring actuated plunger pressurizes a reservoir of the fluid and the first end and the electrically conductive material extend into the reservoir thereby heating at least a portion of the fluid before the fluid flows into the first end of the capillary tube.

Example 8: The personal vaporizing unit of example 7, wherein the spring actuated plunger pressurizes the reservoir of the fluid to a first pressure and the fluid is to have a viscosity at a maximum ambient temperature of a commercial device temperature range that prevents flow of the fluid through the capillary channel while under the first pressure.

Example 9: The personal vaporizing unit of example 8, wherein the maximum ambient temperature of a commercial device temperature range is substantially 40° C.

Example 10: The personal vaporizing unit of example 1, further comprising: a valve to selectively allow and disallow the second end to expel the fluid.

Example 11: The personal vaporizing unit of example 9, wherein the valve is mechanically actuated.

Example 12: The personal vaporizing unit of example 9, wherein the valve is thermally actuated.

Example 13: The personal vaporizing unit of example 9, wherein the low-pressure chamber is at a pressure below the ambient atmospheric pressure.

Example 14: The personal vaporizing unit of example 9, wherein the pressure below the ambient atmospheric pressure is created by a user.

Example 15: The personal vaporizing unit of example 9, wherein the pressure below the ambient atmospheric pressure is created by an inhalation made by a user.

Example 16: The personal vaporizing unit of example 9, wherein the pressure below the ambient atmospheric pressure is created by a mechanical action made by a hand of a user.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A personal vaporizing unit, comprising:

a capillary channel having a first end, a middle portion, and a second end, the first end configured to receive, under pressure, a fluid to be vaporized, the second end configured to expel the fluid as a heated aerosol, wherein a spring actuated plunger pressurizes a reservoir of the fluid and the first end and an inductive target material to be heated by a magnetic field extend into the reservoir to heat at least a portion of the fluid before the fluid flows into the first end of the capillary channel;

a low-pressure chamber to receive the heated aerosol;

an infrared light source to irradiate the heated aerosol;

an ultraviolet light source to irradiate the heated aerosol; and, an exit port to evacuate the heated aerosol after being irradiated by the infrared light source and the ultraviolet light source.

2. The personal vaporizing unit of claim 1, wherein the capillary channel is to be heated at least along the middle portion.

3. The personal vaporizing unit of claim 2, wherein the capillary channel is formed in a glass substrate.

4. The personal vaporizing unit of claim 3, wherein the glass substrate is substantially surrounded by the inductive target material, the personal vaporizing unit configured to heat the inductive target material via induction heating.

5. The personal vaporizing unit of claim 4, further comprising:

a thermally conductive interface material between the glass substrate and the inductive target material.

6. The personal vaporizing unit of claim 1, wherein the spring actuated plunger pressurizes the reservoir of the fluid to a first pressure and the fluid is to have a viscosity at an external ambient temperature of 40° C. that prevents flow of the fluid through the capillary channel while under the first pressure.

7. The personal vaporizing unit of claim 1, further comprising:

a valve to selectively allow and disallow the second end to expel the fluid.

8. The personal vaporizing unit of claim 7, wherein the valve is thermally actuated.

9. The personal vaporizing unit of claim 1, wherein the low-pressure chamber is to be at a pressure below an ambient atmospheric pressure when receiving the heated aerosol.

10. The personal vaporizing unit of claim 9, wherein the pressure below the ambient atmospheric pressure is created by a user.

11. The personal vaporizing unit of claim 9, wherein the pressure below the ambient atmospheric pressure is created by a mechanical action made by a hand of a user.

* * * * *